United States Patent
Peters et al.

(10) Patent No.: US 10,070,094 B2
(45) Date of Patent: Sep. 4, 2018

(54) SCREEN RELATED ADAPTATION OF HIGHER ORDER AMBISONIC (HOA) CONTENT

(71) Applicant: QUALCOMM Incorporated, San Diego, CA (US)

(72) Inventors: Nils Günther Peters, San Diego, CA (US); Martin James Morrell, San Diego, CA (US); Dipanjan Sen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/290,223

(22) Filed: Oct. 11, 2016

(65) Prior Publication Data
US 2017/0110139 A1    Apr. 20, 2017

Related U.S. Application Data

(60) Provisional application No. 62/241,709, filed on Oct. 14, 2015, provisional application No. 62/244,149, (Continued)

(51) Int. Cl.
*H04R 5/02* (2006.01)
*H04N 5/60* (2006.01)
(Continued)

(52) U.S. Cl.
CPC .......... *H04N 5/602* (2013.01); *G06F 3/165* (2013.01); *G10L 19/26* (2013.01); *H04S 7/30* (2013.01);
(Continued)

(58) Field of Classification Search
CPC .......... H04N 5/602; H04S 7/30; H04S 7/307; H04S 7/308; H04S 2420/11;
(Continued)

(56) References Cited

U.S. PATENT DOCUMENTS

2002/0070981 A1*  6/2002  Kida ................. G06F 17/30241
                                            715/833
2007/0005160 A1*  1/2007  Zaucha ..................... H03F 1/12
                                            700/94
(Continued)

FOREIGN PATENT DOCUMENTS

EP    2541547 A1   1/2013
EP    2637427 A1   9/2013
(Continued)

OTHER PUBLICATIONS

Response to Written Opinion dated Apr. 19, 2017, from International Application No. PCT/US2016/056606, filed on Aug. 14, 2017, 9 pp.
(Continued)

*Primary Examiner* — William A Jerez Lora
(74) *Attorney, Agent, or Firm* — Shumaker & Sieffert, P.A.

(57) ABSTRACT

Systems and techniques for rendering audio data are generally disclosed. An example device for rendering a higher order ambition (HOA) audio signal includes a memory configured to store the HOA audio signal, and one or more processors coupled to the memory. The one or more processors are configured to perform a loudness compensation process as part of generating an effect matrix. The one or more processors are further configured to render the HOA audio signal based on the effect matrix.

44 Claims, 28 Drawing Sheets

Related U.S. Application Data filed on Oct. 20, 2015, provisional application No. 62/255,353, filed on Nov. 13, 2015.

(51) Int. Cl.

| | | |
|---|---|---|
| *H04S 7/00* | (2006.01) | |
| *G06F 3/16* | (2006.01) | |
| *G10L 19/26* | (2013.01) | |
| *G10L 19/008* | (2013.01) | |

(52) U.S. Cl.
CPC .............. *H04S 7/307* (2013.01); *H04S 7/308* (2013.01); *G10L 19/008* (2013.01); *H04R 2499/15* (2013.01); *H04S 2420/11* (2013.01)

(58) Field of Classification Search
CPC ... H04R 2499/15; G10L 19/008; G10L 19/20; G06F 3/165
USPC ............................. 381/1, 124, 306, 307, 310
See application file for complete search history.

(56) References Cited

U.S. PATENT DOCUMENTS

| | | | | |
|---|---|---|---|---|
| 2010/0328423 A1* | 12/2010 | Etter | ...................... | H04N 7/142 348/14.16 |
| 2011/0249821 A1 | 10/2011 | Jaillet et al. | | |
| 2011/0305344 A1* | 12/2011 | Sole | ...................... | G10L 19/008 381/22 |
| 2013/0010971 A1* | 1/2013 | Batke | .................... | G10L 19/008 381/22 |
| 2013/0223658 A1* | 8/2013 | Betlehem | ................. | H04R 5/02 381/307 |
| 2013/0236039 A1 | 9/2013 | Jax et al. | | |
| 2015/0145944 A1* | 5/2015 | Stonefield | ................ | H04N 7/15 348/14.02 |
| 2015/0213803 A1 | 7/2015 | Peters et al. | | |
| 2016/0174008 A1* | 6/2016 | Boehm | ..................... | H04S 3/02 381/22 |

FOREIGN PATENT DOCUMENTS

| | | |
|---|---|---|
| EP | 2946468 A2 | 11/2015 |
| WO | 2012023864 A1 | 2/2012 |
| WO | 2014012945 A1 | 1/2014 |
| WO | 2014111308 | 7/2014 |
| WO | 2014194099 | 12/2014 |

OTHER PUBLICATIONS

"Information technology—High efficiency coding and media delivery in heterogeneous environments—Part 3: 3D Audio, Amendment 3: MPEG-H 3D Audio Phase 2," ISO/IEC JTC 1/SC 29, Jun. 3, 2016, 454 pp.

"Call for Proposals for 3D Audio," ISO/IEC JTC1/SC29/WG11/N13411, Jan. 2013, Geneva, CH, 20 pp.

Herre et al., "MPEG-H 3D Audio—The New Standard for Coding of Immersive Spatial Audio," IEEE Journal of Selected Topics in Signal Processing, vol. 9, No. 5, Aug. 2015, pp. 770-779.

Poletti, "Three-Dimensional Surround Sound Systems Based on Spherical Harmonics," J. Audio Eng. Soc., vol. 53, No. 11, Nov. 2005, pp. 1004-1025.

"Information technology—High efficiency coding and media delivery in heterogeneous environments—Part 3: Part 3: 3D audio, Amendment 3: MPEG-H 3D Audio Phase 2," ISO/IEC JTC 1/SC 29N, Jul. 25, 2015, 208 pp.

"Information technology—High efficiency coding and media delivery in heterogeneous environments—Part 3: 3D Audio," ISO/IEC JTC 1/SC 29N, Apr. 4, 2014, 337 pp.

"Information technology—High efficiency coding and media delivery in heterogeneous environments—Part 3: 3D Audio," ISO/IEC JTC 1/SC 29, Jul. 25, 2014, 311 pp.

Sen, et al., "RM1-HOA Working Draft Text," Qualcomm, ISO/IEC JTC1/SC29/WG11, MPEG2014, Jan. 2014, 83 pp.

"Information technology—High efficiency coding and media delivery in heterogeneous environments—Part 3: 3D Audio," ISO/IEC JTC 1/SC 29, Oct. 12, 2016, 797 pp.

Hollerweger, et al., "An Introduction to Higher Order Ambisonic," Oct. 2008, 13 pp.

Sen, et al., "Technical Description of the Qualcomm's HOA Coding Technology for Phase II," ISO/IEC JTC1/SC29/WG11 MPEG2014/M34104, Jul. 2014, 4 pp.

Schonefeld, "Sperical Harmonics," Jul. 1, 2005, 9 pp.

International Search Report and Written Opinion—PCT/US2016/056606—ISA/EPO, dated Apr. 19, 2017, 24 pp.

Peters et al., "Screen-related Adaptation of HOA Soundfields," 110. MPEG Meeting; Oct. 20-24, 2014; Strasbourg, FR (Motion Picture Expert Group or ISO/IEC JTC1/SC29/WG11), No. M35159, Oct. 24, 2014 (Oct. 24, 2014), 7 pp., XP030063531.

Schultz-Amling et al., "Acoustical Zooming Based on a Parametric Sound Field Representation," 128th Audio Engineering Society Convention 2010: London, UK, May 22-25, 2010 (AES Convention 128), Audio Engineering Society, GB, May 22, 2010 (May 22, 2010), XP008180938, pp. 1310-1318.

Shi et al., "Proposal to add new functions to output document N14464 on Metadata: Screen-related object," 109. MPEG Meeting; Jun. 2-3, 2014; Paris, FR (Motion Picture Expert Group or ISO/IEC JTC1/SC29/WG11), No. M133607, Jun. 2, 2014, XP030061980, 14 pp.

Shi et al., "Screen-Related Object Remapping for Zooming," MPEG Meeting; Jul. 7-11, 2014; Sapporo, JP (Motion Picture Expert Group or ISO/IEC JTC1/SC29/WG11), No. M34253, Jul. 3, 2014; XP030062626, 12 pp.

Second Written Opinion dated Oct. 24, 2017 from International Application No. PCT/US2016/056606, 10 pp.

International Preliminary Report on Patentability dated Jan. 22, 2018 from International Application No. PCT/US2016/056606, 31 pp.

\* cited by examiner

SCREEN RELATED ADAPTATION OF HIGHER ORDER AMBISONIC (HOA) CONTENT

This application claims the benefit of:
U.S. Provisional Application No. 62/241,709, filed 14 Oct. 2015;
U.S. Provisional Application No. 62/244,149, filed 20 Oct. 2015; and
U.S. Provisional Application No. 62/255,353, filed 13 Nov. 2015, the entire contents of each of which are incorporated herein by reference.

TECHNICAL FIELD

This disclosure relates to audio data and, more specifically, coding of higher-order ambition audio data.

BACKGROUND

A higher-order ambitions (HOA) signal (often represented by a plurality of spherical harmonic coefficients (SHC) or other hierarchical elements) is a three-dimensional representation of a sound field. The HOA or SHC representation may represent the sound field in a manner that is independent of the local speaker geometry used to playback a multi-channel audio signal rendered from the SHC signal. The SHC signal may also facilitate backwards compatibility as the SHC signal may be rendered to well-known and highly adopted multi-channel formats, such as a 5.1 audio channel format or a 7.1 audio channel format. The SHC representation may therefore enable a better representation of a sound field that also accommodates backward compatibility.

DETAILED DESCRIPTION

Figure 1:
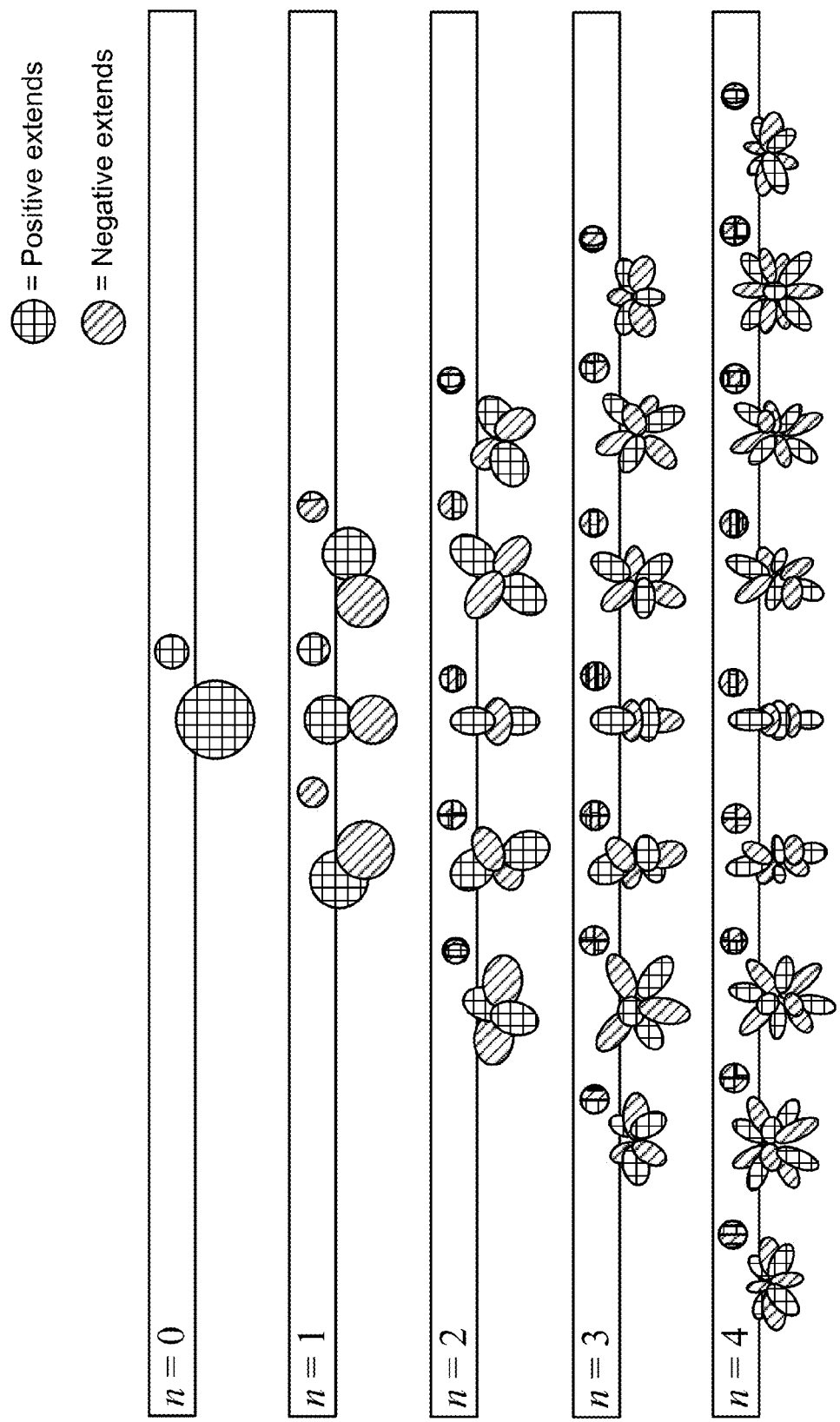
FIG. 1 is a diagram illustrating spherical harmonic basis functions of various orders and sub-orders.

The evolution of surround sound has made available many output formats for entertainment nowadays. Examples of such consumer surround sound formats are mostly 'channel' based in that they implicitly specify feeds to loudspeakers in certain geometrical coordinates. The consumer surround sound formats include the popular 5.1 format (which includes the following six channels: front left (FL), front right (FR), center or front center, back left or surround left, back right or surround right, and low frequency effects (LFE)), the growing 7.1 format, various formats that includes height speakers such as the 7.1.4 format and the 22.2 format (e.g., for use with the Ultra High Definition Television standard). Non-consumer formats can span any number of speakers (in symmetric and non-symmetric geometries) often termed 'surround arrays'. One example of such an array includes 32 loudspeakers positioned on coordinates on the corners of a truncated icosahedron.

The input to a future MPEG encoder is optionally one of three possible formats: (i) traditional channel-based audio (as discussed above), which is meant to be played through loudspeakers at pre-specified positions; (ii) object-based audio, which involves discrete pulse-code-modulation (PCM) data for single audio objects with associated metadata containing their location coordinates (amongst other information); and (iii) scene-based audio, which involves representing the sound field using coefficients of spherical harmonic basis functions (also called "spherical harmonic coefficients" or SHC, "Higher-order Ambitions" or HOA, and "HOA coefficients"). The future MPEG encoder may be described in more detail in a document entitled "Call for Proposals for 3D Audio," by the International Organization for Standardization/International Electrotechnical Commission (ISO)/(IEC) JTC1/SC29/WG11/N13411, released January 2013 in Geneva, Switzerland, and available at http://mpeg.chiariglione.org/sites/default/files/files/standards/parts/docs/w 13411.zip.

There are various 'surround-sound' channel-based formats in the market. They range, for example, from the 5.1 home theatre system (which has been the most successful in terms of making inroads into living rooms beyond stereo) to the 22.2 system developed by NHK (Nippon Hoso Kyokai or Japan Broadcasting Corporation). Content creators (e.g., Hollywood studios) would like to produce the soundtrack for a movie once, and not spend effort to remix it for each speaker configuration. Recently, Standards Developing Organizations have been considering ways in which to provide an encoding into a standardized bitstream and a subsequent decoding that is adaptable and agnostic to the speaker geometry (and number) and acoustic conditions at the location of the playback (involving a renderer).

To provide such flexibility for content creators, a hierarchical set of elements may be used to represent a sound field. The hierarchical set of elements may refer to a set of elements in which the elements are ordered such that a basic set of lower-ordered elements provides a full representation of the modeled sound field. As the set is extended to include higher-order elements, the representation becomes more detailed, increasing resolution.

One example of a hierarchical set of elements is a set of spherical harmonic coefficients (SHC). The following expression demonstrates a description or representation of a sound field using SHC:

$$p_i(t, r_r, \theta_r, \varphi_r) = \sum_{\omega=0}^{\infty} \left[ 4\pi \sum_{n=0}^{\infty} j_n(kr_r) \sum_{m=-n}^{n} A_n^m(k) Y_n^m(\theta_r, \varphi_r) \right] e^{j\omega t},$$

The expression shows that the pressure $p_i$ at any point $\{r_r, \theta_r, \varphi_r\}$ of the sound field, at time t, can be represented uniquely by the SHC, $A_n^m(k)$. Here, $$k = \frac{\omega}{c},$$

c is the speed of sound (~343 m/s), $\{r_r, \theta_r, \varphi_r\}$ is a point of reference (or observation point), $j_n(\cdot)$ is the spherical Bessel function of order n, and $Y_n^m(\theta_r, \varphi_r)$ are the spherical harmonic basis functions of order n and suborder m. It can be recognized that the term in square brackets is a frequency-domain representation of the signal (i.e., $S(\omega, r_r, \theta_r, \varphi_r)$) which can be approximated by various time-frequency transformations, such as the discrete Fourier transform (DFT), the discrete cosine transform (DCT), or a wavelet transform. Other examples of hierarchical sets include sets of wavelet transform coefficients and other sets of coefficients of multiresolution basis functions.

Video data is often displayed in conjunction with corresponding, synchronized audio data, with the audio data typically being generated to match the perspective of the video data. For example, during frames of video that show a close-up perspective of two people talking in a restaurant, the conversation of the two people may be loud and clear relative to any background noise at the restaurant such as the conversations of other diners, kitchen noise, background music, etc. During frames of video showing a more distant perspective of the two people talking, the conversation of the two people may be less loud and less clear relative to the background noises, the sources of which may now be in the frame of video.

Traditionally, decisions regarding perspective (e.g. zooming in and out of a scene or panning around a scene) are made by a content producer with an end consumer of the content having little or no ability to alter the perspective chosen by the original content producer. It is becoming more common, however, for users to have some level of control over the perspective they see when watching video. As one example, during a football broadcast, a user may receive a video feed showing a large section of the field but may have the ability to zoom in on a specific player or group of players. This disclosure introduces techniques for adapting the perception of an audio reproduction in a manner that matches a change in the perception of corresponding video. For example, if while watching a football game a user zooms in on the quarterback, the audio may also be adapted to produce an audio effect of zooming in on the quarterback.

A user's perception of video may also change depending on the size of the display being used to playback the video. For example, when watching a movie on a 10-inch tablet, the entire display may be within the viewer's central vision, while when watching the same movie on a 100-inch television, the outside portions of the display may only be within the viewer's peripheral vision. This disclosure introduces techniques for adapting the perception of an audio reproduction based on the size of a display being used for the corresponding video data.

The MPEG-H 3D audio bitstream contains new bitfields to signal information of a reference screen size used during the content production process. An MPEG-H 3D-compliant audio decoder, several examples of which will be described in this disclosure, may also be configured to determine an actual screen size of the display setup being used in conjunction with video corresponding to the audio being decoded. Consequently, according to the techniques of this disclosure, an audio decoder may adapt the HOA sound field, based on the reference screen size and the actual screen size, so that screen related audio content is being perceived from the same location being shown in the video.

This disclosure describes techniques for how HOA soundfields can be adjusted to ensure spatial alignment of the acoustic elements to the visual component in a mixed audio/video reproduction scenario. The techniques of this disclosure may be utilized to help create a coherent audio/video experience for HOA-only content or for content with a combination of HOA and audio objects where currently only screen-related audio objects are adjusted.

FIG. 1 is a diagram illustrating spherical harmonic basis functions from the zero order (n=0) to the fourth order (n=4). As can be seen, for each order, there is an expansion of suborders m which are shown but not explicitly noted in the example of FIG. 1 for ease of illustration purposes.

The SHC $A_n^m(k)$ can either be physically acquired (e.g., recorded) by various microphone array configurations or, alternatively, they can be derived from channel-based or object-based descriptions of the sound field. The SHC represent scene-based audio, where the SHC may be input to an audio encoder to obtain encoded SHC that may promote more efficient transmission or storage. For example, a fourth-order representation involving $(1+4)^2$ (25, and hence fourth order) coefficients may be used.

As noted above, the SHC may be derived from a microphone recording using a microphone array. Various examples of how SHC may be derived from microphone arrays are described in Poletti, M., "Three-Dimensional Surround Sound Systems Based on Spherical Harmonics," J. Audio Eng. Soc., Vol. 53, No. 11, 2005 November, pp. 1004-1025.

To illustrate how the SHCs may be derived from an object-based description, consider the following equation. The coefficients $A_n^m(k)$ for the sound field corresponding to an individual audio object may be expressed as:

$$A_n^m(k)=g(\omega)(-4\pi ik)h_n^{(2)}(kr_s)Y_n^{m*}(\theta_s,\varphi_s),$$

where i is $\sqrt{-1}$, $h_n^{(2)}(\cdot)$ is the spherical Hankel function (of the second kind) of order n, and $\{r_s, \theta_s, \varphi_s\}$ is the location of the object. Knowing the object source energy g ($\omega$) as a function of frequency (e.g., using time-frequency analysis techniques, such as performing a fast Fourier transform on the PCM stream) allows us to convert each PCM object and the corresponding location into the SHC $A_n^m(k)$. Further, it can be shown (since the above is a linear and orthogonal decomposition) that the $A_n^m(k)$ coefficients for each object are additive. In this manner, a multitude of PCM objects can be represented by the $A_n^m(k)$ coefficients (e.g., as a sum of the coefficient vectors for the individual objects). Essentially, the coefficients contain information about the sound field (the pressure as a function of 3D coordinates), and the above represents the transformation from individual objects to a representation of the overall sound field, in the vicinity of the observation point $\{r_r, \theta_r, \varphi_r\}$. The remaining figures are described below in the context of object-based and SHC-based audio coding.

Figure 2:
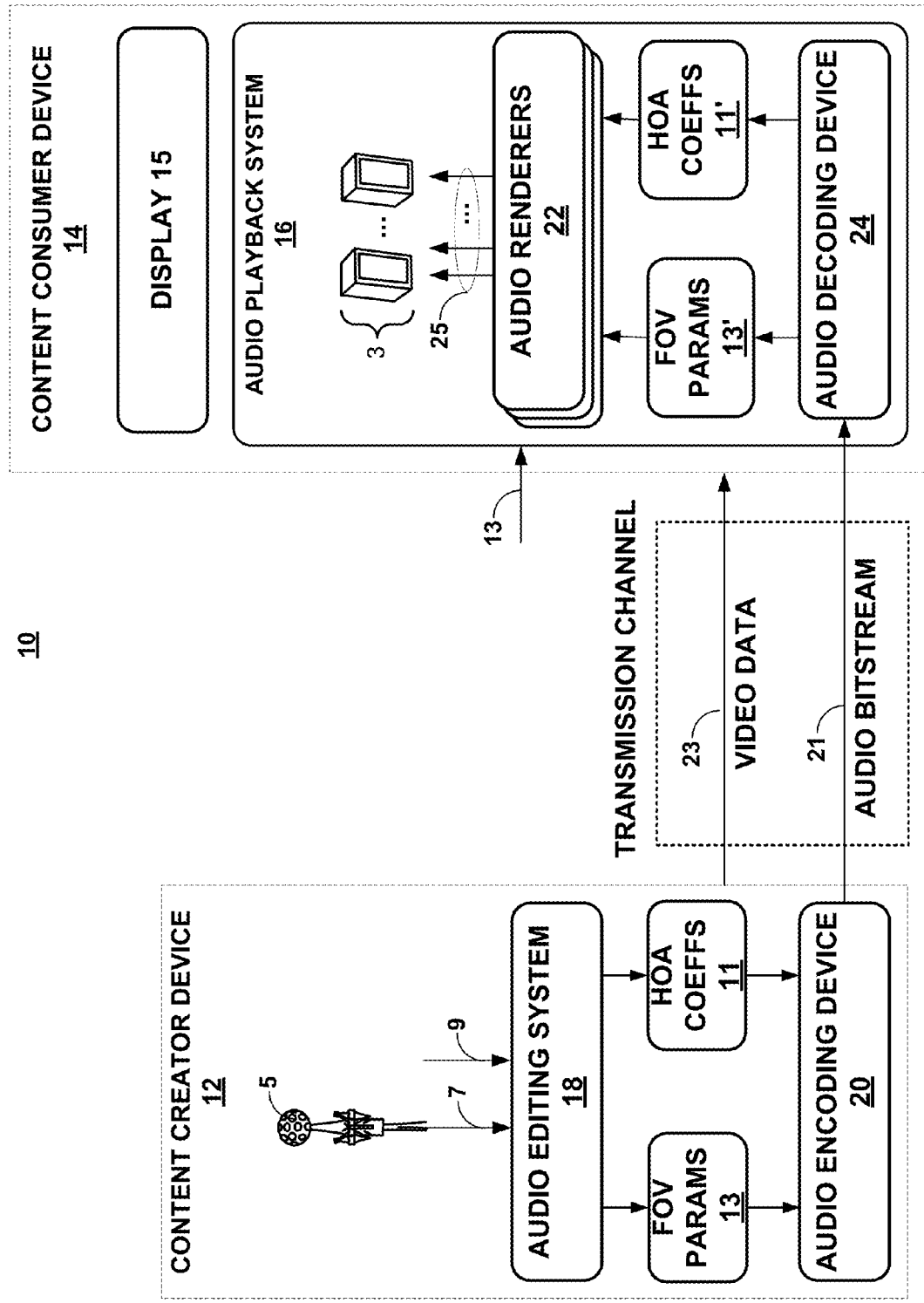
FIG. 2 is a diagram illustrating a system that may perform various aspects of the techniques described in this disclosure.

FIG. 2 is a diagram illustrating a system 10 that may perform various aspects of the techniques described in this disclosure. As shown in the example of FIG. 2, the system 10 includes a content creator device 12 and a content consumer device 14. While described in the context of the content creator device 12 and the content consumer device 14, the techniques may be implemented in any context in which SHCs (which may also be referred to as HOA coefficients) or any other hierarchical representation of a sound field are encoded to form a bitstream representative of the audio data. Moreover, the content creator device 12 may represent any form of computing device capable of implementing the techniques described in this disclosure, including a handset (or cellular phone), a tablet computer, a smart phone, or a desktop computer to provide a few examples. Likewise, the content consumer device 14 may represent any form of computing device capable of implementing the techniques described in this disclosure, including a handset (or cellular phone), a tablet computer, a smart phone, a set-top box, a standalone receiver (e.g., a "receiver device"), a television (e.g. a "smart TV") or a desktop computer to provide a few examples.

The content creator device 12 may be operated by a movie studio or other entity that may generate multi-channel audio content for consumption by operators of content consumer devices, such as the content consumer device 14. In some examples, the content creator device 12 may be operated by an individual user who would like to generate an audio signal with compress HOA coefficients 11 and also include in the audio signal, one or more field of view (FOV) parameters. Often, the content creator generates audio content in conjunction with video content. The FOV parameters may, for example, describe a reference screen size for the video content. The content consumer device 14 may be operated by an individual. The content consumer device 14 may include an audio playback system 16, which may refer to any form of audio playback system capable of rendering SHC for play back as multi-channel audio content.

The content creator device 12 includes an audio editing system 18. The content creator device 12 obtain live recordings 7 in various formats (including directly as HOA coefficients) and audio objects 9, which the content creator device 12 may edit using audio editing system 18. A microphone 5 may capture the live recordings 7. The content creator may, during the editing process, render HOA coefficients 11 from audio objects 9, listening to the rendered speaker feeds in an attempt to identify various aspects of the sound field that require further editing. The content creator device 12 may then edit HOA coefficients 11 (potentially indirectly through manipulation of different ones of the audio objects 9 from which the source HOA coefficients may be derived in the manner described above) and the FOV parameters 13. The content creator device 12 may employ the audio editing system 18 to generate the HOA coefficients 11 and FOV parameters 13. The audio editing system 18 represents any system capable of editing audio data and outputting the audio data as one or more source spherical harmonic coefficients.

When the editing process is complete, the content creator device 12 may generate audio bitstream 21 based on the HOA coefficients 11. That is, the content creator device 12 includes an audio encoding device 20 that represents a device configured to encode or otherwise compress HOA coefficients 11 in accordance with various aspects of the techniques described in this disclosure to generate the audio bitstream 21. Audio encoding device 20 may include, in the audio bitstream 21, values for signaling FOV parameters 13. The audio encoding device 20 may generate the audio bitstream 21 for transmission, as one example, across a transmission channel, which may be a wired or wireless channel, a data storage device, or the like. The audio bitstream 21 may represent an encoded version of the HOA coefficients 11 and may include a primary bitstream and another side bitstream, which may be referred to as side channel information. In some examples, audio encoding device 20 may include FOV parameters 13 in the side channel, while in other examples, audio encoding device 20 may include FOV parameters 13 elsewhere. In still other examples, audio encoding device 20 may not encode FOV parameters 13, and instead, audio playback system 16 may assign default values to FOV parameters 13'.

While shown in FIG. 2 as being directly transmitted to the content consumer device 14, the content creator device 12 may output the audio bitstream 21 to an intermediate device positioned between the content creator device 12 and the content consumer device 14. The intermediate device may store the audio bitstream 21 for later delivery to the content consumer device 14, which may request the bitstream. The intermediate device may comprise a file server, a web server, a desktop computer, a laptop computer, a tablet computer, a mobile phone, a smart phone, a standalone receiver (such as a receiver device), a set-top box, a television (e.g., an integrated display and speaker device, which may, in some examples, be a "smart TV") or any other device capable of storing the audio bitstream 21 for later retrieval by an audio decoder. The intermediate device may reside in a content delivery network capable of streaming the audio bitstream 21 (and possibly in conjunction with transmitting a corresponding video data bitstream) to subscribers, such as the content consumer device 14, requesting the audio bitstream 21.

Alternatively, the content creator device 12 may store the audio bitstream 21 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to the channels by which content stored to the mediums are transmitted (and may include retail stores and other store-based delivery mechanism). In any event, the techniques of this disclosure should not therefore be limited in this respect to the example of FIG. 2.

Content creator device 12 may further be configured to generate and encode video data 23, and content consumer device 14 may be configured to receive and decode video data 23. Video data 23 may be associated with and transmitted with audio bitstream 21. In this regard, content creator device 12 and content consumer device 14 may include additional hardware and software not explicitly shown in FIG. 2. Content creator device 12 may, for example, include cameras for acquiring video data, a video editing system for editing the video data, and a video encoder for encoding the video data, and content consumer device 14 may also include a video decoder and video renderer.

As further shown in the example of FIG. 2, the content consumer device 14 includes the audio playback system 16. The audio playback system 16 may represent any audio playback system capable of playing back multi-channel audio data. The audio playback system 16 may include a number of different renderers 22. The renderers 22 may each provide for a different form of rendering, where the different forms of rendering may include one or more of the various ways of performing vector-base amplitude panning (VBAP), and/or one or more of the various ways of performing sound field synthesis. As used herein, "A and/or B" means "A or B", or both "A and B".

The audio playback system 16 may further include an audio decoding device 24. The audio decoding device 24 may represent a device configured to decode HOA coefficients 11' and FOV parameters 13' from the audio bitstream 21, where the HOA coefficients 11' may be similar to the HOA coefficients 11 but differ due to lossy operations (e.g., quantization) and/or transmission via the transmission channel. FOV parameters 13, by contrast, may be losslessly coded. The audio playback system 16 may, after decoding the audio bitstream 21 to obtain the HOA coefficients 11' and render the HOA coefficients 11' to output loudspeaker feeds 25. As will be explained in more detail below, the manner in which audio playback system 16 renders HOA coefficients 11' may be, in some instances, modified based on FOV parameters 13' in conjunction with FOV parameters of display 15. The loudspeaker feeds 25 may drive one or more loudspeakers (which are not shown in the example of FIG. 2 for ease of illustration purposes). The loudspeakers may be configured to output a rendered audio signal, such as a rendered audio signal represented by loudspeaker feeds 25.

To select the appropriate renderer or, in some instances, generate an appropriate renderer, the audio playback system 16 may obtain loudspeaker information 13 indicative of a number of loudspeakers and/or a spatial geometry of the loudspeakers. In some instances, the audio playback system 16 may obtain the loudspeaker information 13 using a reference microphone and driving the loudspeakers in such a manner as to dynamically determine the loudspeaker information 13. In other instances or in conjunction with the dynamic determination of the loudspeaker information 13, the audio playback system 16 may prompt a user to interface with the audio playback system 16 and input the loudspeaker information 13.

The audio playback system 16 may then select one of the audio renderers 22 based on the loudspeaker information 13. In some instances, the audio playback system 16 may, when none of the audio renderers 22 are within some threshold similarity measure (in terms of the loudspeaker geometry) to the loudspeaker geometry specified in the loudspeaker information 13, generate the one of audio renderers 22 based on the loudspeaker information 13. The audio playback system 16 may, in some instances, generate one of the audio renderers 22 based on the loudspeaker information 13 without first attempting to select an existing one of the audio renderers 22. One or more speakers 3 may then playback the rendered loudspeaker feeds 25.

As shown in FIG. 2, content consumer device 14 also has an associated display device, display 15. In the example of FIG. 2, display 15 is shown as being incorporated into content consumer device 14; however, in other examples, display 15 may be external to content consumer device 14. As will be explained in more detail below, display 15 may have one or more associated FOV parameters that are separate from FOV parameters 13'. FOV parameters 13' represent parameters associated with a reference screen at the time of content creation, while the FOV parameters of display 15 are FOV parameters of a viewing window used for playback. Audio playback system 16 may modify or generate one of audio renderer 22 based on both FOV parameters 13' and the FOV parameters associated with display 15.

Figure 3:
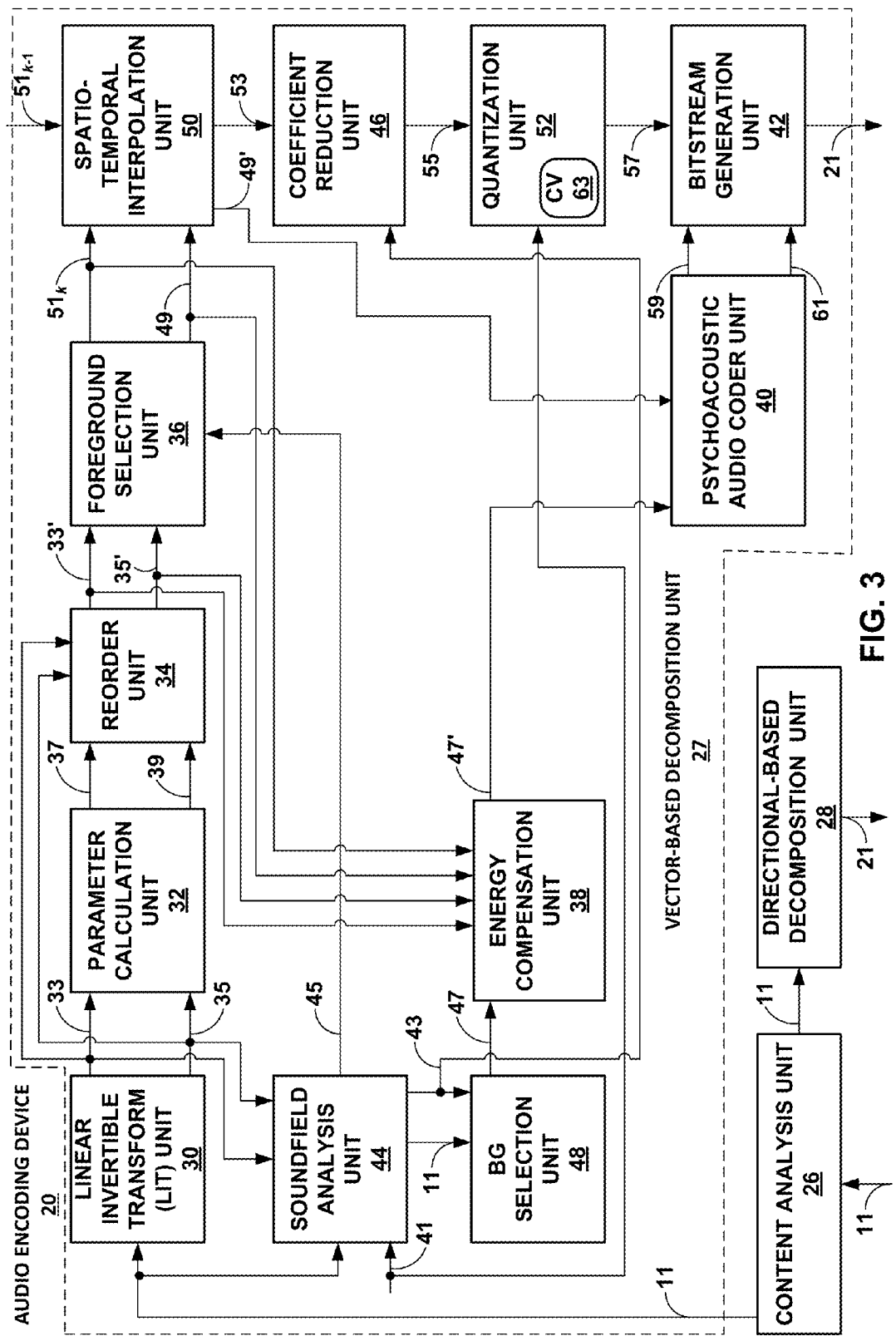
FIG. 3 is a block diagram illustrating, in more detail, one example of the audio encoding device shown in the example of FIG. 2 that may perform various aspects of the techniques described in this disclosure.

FIG. 3 is a block diagram illustrating, in more detail, one example of the audio encoding device 20 shown in the example of FIG. 2 that may perform various aspects of the techniques described in this disclosure. The audio encoding device 20 includes a content analysis unit 26, a vector-based decomposition unit 27 and a directional-based decomposition unit 28. Although described briefly below, more information regarding the audio encoding device 20 and the various aspects of compressing or otherwise encoding HOA coefficients is available in International Patent Application Publication No. WO 2014/194099, entitled "INTERPOLATION FOR DECOMPOSED REPRESENTATIONS OF A SOUND FIELD," filed 29 May 2014.

The content analysis unit 26 represents a unit configured to analyze the content of the HOA coefficients 11 to identify whether the HOA coefficients 11 represent content generated from a live recording or an audio object. The content analysis unit 26 may determine whether the HOA coefficients 11 were generated from a recording of an actual sound field or from an artificial audio object. In some instances, when the framed HOA coefficients 11 were generated from a recording, the content analysis unit 26 passes the HOA coefficients 11 to the vector-based decomposition unit 27. In some instances, when the framed HOA coefficients 11 were generated from a synthetic audio object, the content analysis unit 26 passes the HOA coefficients 11 to the directional-based decomposition unit 28. The directional-based decomposition unit 28 may represent a unit configured to perform a directional-based synthesis of the HOA coefficients 11 to generate a directional-based bitstream 21.

As shown in the example of FIG. 3, the vector-based decomposition unit 27 may include a linear invertible transform (LIT) unit 30, a parameter calculation unit 32, a reorder unit 34, a foreground selection unit 36, an energy compensation unit 38, a psychoacoustic audio coder unit 40, a bitstream generation unit 42, a sound field analysis unit 44, a coefficient reduction unit 46, a background (BG) selection unit 48, a spatio-temporal interpolation unit 50, and a quantization unit 52.

The linear invertible transform (LIT) unit 30 receives the HOA coefficients 11 in the form of HOA channels, each channel representative of a block or frame of a coefficient associated with a given order, sub-order of the spherical basis functions (which may be denoted as HOA[k], where k may denote the current frame or block of samples). The matrix of HOA coefficients 11 may have dimensions D: M×(N+1)$^2$.

The LIT unit 30 may represent a unit configured to perform a form of analysis referred to as singular value decomposition. While described with respect to SVD, the techniques described in this disclosure may be performed with respect to any similar transformation or decomposition that provides for sets of linearly uncorrelated, energy compacted output. Also, reference to "sets" in this disclosure is generally intended to refer to non-zero sets unless specifically stated to the contrary and is not intended to refer to the classical mathematical definition of sets that includes the so-called "empty set." An alternative transformation may comprise a principal component analysis, which is often referred to as "PCA." Depending on the context, PCA may be referred to by a number of different names, such as discrete Karhunen-Loeve transform, the Hotelling transform, proper orthogonal decomposition (POD), and eigenvalue decomposition (EVD) to name a few examples. Properties of such operations that are conducive to the underlying goal of compressing audio data are 'energy compaction' and 'decorrelation' of the multichannel audio data.

In any event, assuming the LIT unit 30 performs a singular value decomposition (which, again, may be referred to as "SVD") for purposes of example, the LIT unit 30 may transform the HOA coefficients 11 into two or more sets of transformed HOA coefficients. The "sets" of transformed HOA coefficients may include vectors of transformed HOA coefficients. In the example of FIG. 3, the LIT unit 30 may perform the SVD with respect to the HOA coefficients 11 to generate a so-called V matrix, an S matrix, and a U matrix. SVD, in linear algebra, may represent a factorization of a y-by-z real or complex matrix X (where X may represent multi-channel audio data, such as the HOA coefficients 11) in the following form:

$$X=USV*$$

U may represent a y-by-y real or complex unitary matrix, where the y columns of U are known as the left-singular vectors of the multi-channel audio data. S may represent a y-by-z rectangular diagonal matrix with non-negative real numbers on the diagonal, where the diagonal values of S are known as the singular values of the multi-channel audio data. V* (which may denote a conjugate transpose of V) may represent a z-by-z real or complex unitary matrix, where the z columns of V* are known as the right-singular vectors of the multi-channel audio data.

In some examples, the V* matrix in the SVD mathematical expression referenced above is denoted as the conjugate transpose of the V matrix to reflect that SVD may be applied to matrices comprising complex numbers. When applied to matrices comprising only real-numbers, the complex conjugate of the V matrix (or, in other words, the V* matrix) may be considered to be the transpose of the V matrix. Below it is assumed, for ease of illustration purposes, that the HOA coefficients 11 comprise real-numbers with the result that the V matrix is output through SVD rather than the V* matrix. Moreover, while denoted as the V matrix in this disclosure, reference to the V matrix should be understood to refer to the transpose of the V matrix where appropriate. While assumed to be the V matrix, the techniques may be applied in a similar fashion to HOA coefficients 11 having complex coefficients, where the output of the SVD is the V* matrix. Accordingly, the techniques should not be limited in this respect to only provide for application of SVD to generate a V matrix, but may include application of SVD to HOA coefficients 11 having complex components to generate a V* matrix.

In this way, the LIT unit 30 may perform SVD with respect to the HOA coefficients 11 to output US[k] vectors 33 (which may represent a combined version of the S vectors and the U vectors) having dimensions D: M×(N+1)$^2$, and V[k] vectors 35 having dimensions D: (N+1)$^2$×(N+1)$^2$. Individual vector elements in the US[k] matrix may also be termed $X_{PS}(k)$ while individual vectors of the V[k] matrix may also be termed v(k).

An analysis of the U, S and V matrices may reveal that the matrices carry or represent spatial and temporal characteristics of the underlying sound field represented above by X. Each of the N vectors in U (of length M samples) may represent normalized separated audio signals as a function of time (for the time period represented by M samples), that are orthogonal to each other and that have been decoupled from any spatial characteristics (which may also be referred to as directional information). The spatial characteristics, representing spatial shape and position (r, theta, phi) may instead be represented by individual $i^{th}$ vectors, $v^{(i)}(k)$, in the V matrix (each of length $(N+1)^2$). The individual elements of each of $v^{(i)}(k)$ vectors may represent an HOA coefficient describing the shape (including width) and position of the sound field for an associated audio object. Both the vectors in the U matrix and the V matrix are normalized such that their root-mean-square energies are equal to unity. The energy of the audio signals in U are thus represented by the diagonal elements in S. Multiplying U and S to form US[k] (with individual vector elements $X_{PS}(k)$), thus represent the audio signal with energies. The ability of the SVD decomposition to decouple the audio time-signals (in U), their energies (in S) and their spatial characteristics (in V) may support various aspects of the techniques described in this disclosure. Further, the model of synthesizing the underlying HOA[k] coefficients, X, by a vector multiplication of US[k] and V[k] gives rise the term "vector-based decomposition," which is used throughout this document.

Although described as being performed directly with respect to the HOA coefficients 11, the LIT unit 30 may apply the linear invertible transform to derivatives of the HOA coefficients 11. For example, the LIT unit 30 may apply SVD with respect to a power spectral density matrix derived from the HOA coefficients 11. By performing SVD with respect to the power spectral density (PSD) of the HOA coefficients rather than the coefficients themselves, the LIT unit 30 may potentially reduce the computational complexity of performing the SVD in terms of one or more of processor cycles and storage space, while achieving the same source audio encoding efficiency as if the SVD were applied directly to the HOA coefficients.

The parameter calculation unit 32 represents a unit configured to calculate various parameters, such as a correlation parameter (R), directional properties parameters ($\theta$, $\varphi$, r), and an energy property (e). Each of the parameters for the current frame may be denoted as R[k], $\theta$[k], $\varphi$[k], r[k] and e[k]. The parameter calculation unit 32 may perform an energy analysis and/or correlation (or so-called cross-correlation) with respect to the US[k] vectors 33 to identify the parameters. The parameter calculation unit 32 may also determine the parameters for the previous frame, where the previous frame parameters may be denoted R[k−1], $\theta$[k−1], $\varphi$[k−1], r[k−1] and e[k−1], based on the previous frame of US[k−1] vector and V[k−1] vectors. The parameter calculation unit 32 may output the current parameters 37 and the previous parameters 39 to reorder unit 34.

The parameters calculated by the parameter calculation unit 32 may be used by the reorder unit 34 to re-order the audio objects to represent their natural evaluation or continuity over time. The reorder unit 34 may compare each of the parameters 37 from the first US[k] vectors 33 turn-wise against each of the parameters 39 for the second US[k−1] vectors 33. The reorder unit 34 may reorder (using, as one example, a Hungarian algorithm) the various vectors within the US[k] matrix 33 and the V[k] matrix 35 based on the current parameters 37 and the previous parameters 39 to output a reordered US[k] matrix 33' (which may be denoted mathematically as $\overline{US[k]}$) and a reordered V[k] matrix 35' (which may be denoted mathematically as $\overline{V[k]}$) to a foreground sound (or predominant sound—PS) selection unit 36 ("foreground selection unit 36") and an energy compensation unit 38.

The sound field analysis unit 44 may represent a unit configured to perform a sound field analysis with respect to the HOA coefficients 11 so as to potentially achieve a target bitrate 41. The sound field analysis unit 44 may, based on the analysis and/or on a received target bitrate 41, determine the total number of psychoacoustic coder instantiations (which may be a function of the total number of ambient or background channels ($BG_{TOT}$) and the number of foreground channels or, in other words, predominant channels. The total number of psychoacoustic coder instantiations can be denoted as numHOATransportChannels.

The sound field analysis unit 44 may also determine, again to potentially achieve the target bitrate 41, the total number of foreground channels (nFG) 45, the minimum order of the background (or, in other words, ambient) sound field ($N_{BG}$ or, alternatively, MinAmbHOAorder), the corresponding number of actual channels representative of the minimum order of background sound field (nBGa=(MinAmbHOAorder+1)$^2$), and indices (i) of additional BG HOA channels to send (which may collectively be denoted as background channel information 43 in the example of FIG. 3). The background channel information 42 may also be referred to as ambient channel information 43. Each of the channels that remains from numHOATransportChannels—nBGa, may either be an "additional background/ambient channel", an "active vector-based predominant channel", an "active directional based predominant signal" or "completely inactive". In one aspect, the channel types may be indicated (as a "ChannelType") syntax element by two bits (e.g. 00: directional based signal; 01: vector-based predominant signal; 10: additional ambient signal; 11: inactive signal). The total number of background or ambient signals, nBGa, may be given by (MinAmbHOAorder+1)$^2$+ the number of times the index 10 (in the above example) appears as a channel type in the bitstream for that frame.

The sound field analysis unit 44 may select the number of background (or, in other words, ambient) channels and the number of foreground (or, in other words, predominant) channels based on the target bitrate 41, selecting more background and/or foreground channels when the target bitrate 41 is relatively higher (e.g., when the target bitrate 41 equals or is greater than 512 Kbps). In one aspect, the numHOATransportChannels may be set to 8 while the MinAmbHOAorder may be set to 1 in the header section of the bitstream. In this scenario, at every frame, four channels may be dedicated to represent the background or ambient portion of the sound field while the other 4 channels can, on a frame-by-frame basis vary on the type of channel—e.g., either used as an additional background/ambient channel or a foreground/predominant channel. The foreground/predominant signals can be one of either vector-based or directional based signals, as described above.

In some instances, the total number of vector-based predominant signals for a frame, may be given by the number of times the ChannelType index is 01 in the bitstream of that frame. In the above aspect, for every additional background/ambient channel (e.g., corresponding to a ChannelType of 10), corresponding information of which of the possible HOA coefficients (beyond the first four) may be represented in that channel. The information, for fourth order HOA content, may be an index to indicate the HOA coefficients 5-25. The first four ambient HOA coefficients 1-4 may be sent all the time when minAmbHOAorder is set to 1, hence the audio encoding device may only need to indicate one of the additional ambient HOA coefficient having an index of 5-25. The information could thus be sent using a 5 bits syntax element (for $4^{th}$ order content), which may be denoted as "CodedAmbCoeffIdx." In any event, the sound field analysis unit 44 outputs the background channel information 43 and the HOA coefficients 11 to the background (BG) selection unit 36, the background channel information 43 to coefficient reduction unit 46 and the bitstream generation unit 42, and the nFG 45 to a foreground selection unit 36.

The background selection unit 48 may represent a unit configured to determine background or ambient HOA coefficients 47 based on the background channel information (e.g., the background sound field ($N_{BG}$) and the number (nBGa) and the indices (i) of additional BG HOA channels to send). For example, when $N_{BG}$ equals one, the background selection unit 48 may select the HOA coefficients 11 for each sample of the audio frame having an order equal to or less than one. The background selection unit 48 may, in this example, then select the HOA coefficients 11 having an index identified by one of the indices (i) as additional BG HOA coefficients, where the nBGa is provided to the bitstream generation unit 42 to be specified in the audio bitstream 21 so as to enable the audio decoding device, such as the audio decoding device 24 shown in the example of FIGS. 2 and 4, to parse the background HOA coefficients 47 from the audio bitstream 21. The background selection unit 48 may then output the ambient HOA coefficients 47 to the energy compensation unit 38. The ambient HOA coefficients 47 may have dimensions D: $M \times [(N_{BG}+1)^2+nBGa]$. The ambient HOA coefficients 47 may also be referred to as "ambient HOA coefficients 47," where each of the ambient HOA coefficients 47 corresponds to a separate ambient HOA channel 47 to be encoded by the psychoacoustic audio coder unit 40.

The foreground selection unit 36 may represent a unit configured to select the reordered US[k] matrix 33' and the reordered V[k] matrix 35' that represent foreground or distinct components of the sound field based on nFG 45 (which may represent a one or more indices identifying the foreground vectors). The foreground selection unit 36 may output nFG signals 49 (which may be denoted as a reordered US[k]$_{1, \ldots, nFG}$ 49, FG$_{1, \ldots, nFG}$[k] 49, or $X_{PS}^{(1 \cdots nFG)}(k)$ 49) to the psychoacoustic audio coder unit 40, where the nFG signals 49 may have dimensions D: M×nFG and each represent mono-audio objects. The foreground selection unit 36 may also output the reordered V[k] matrix 35' (or $v^{(1 \cdots nFG)}(k)$ 35') corresponding to foreground components of the sound field to the spatio-temporal interpolation unit 50, where a subset of the reordered V[k] matrix 35' corresponding to the foreground components may be denoted as foreground V[k] matrix $51_k$ (which may be mathematically denoted as $\overline{V}_{1, \ldots, nFG}[k]$) having dimensions D: $(N+1)^2 \times nFG$.

The energy compensation unit 38 may represent a unit configured to perform energy compensation with respect to the ambient HOA coefficients 47 to compensate for energy loss due to removal of various ones of the HOA channels by the background selection unit 48. The energy compensation unit 38 may perform an energy analysis with respect to one or more of the reordered US[k] matrix 33', the reordered V[k] matrix 35', the nFG signals 49, the foreground V[k] vectors $51_k$ and the ambient HOA coefficients 47 and then perform energy compensation based on the energy analysis to generate energy compensated ambient HOA coefficients 47'. The energy compensation unit 38 may output the energy compensated ambient HOA coefficients 47' to the psychoacoustic audio coder unit 40.

The spatio-temporal interpolation unit 50 may represent a unit configured to receive the foreground V[k] vectors $51_k$ for the $k^{th}$ frame and the foreground V[k−1] vectors $51_{k-1}$ for the previous frame (hence the k−1 notation) and perform spatio-temporal interpolation to generate interpolated foreground V[k] vectors. The spatio-temporal interpolation unit 50 may recombine the nFG signals 49 with the foreground V[k] vectors $51_k$ to recover reordered foreground HOA coefficients. The spatio-temporal interpolation unit 50 may then divide the reordered foreground HOA coefficients by the interpolated V[k] vectors to generate interpolated nFG signals 49'. The spatio-temporal interpolation unit 50 may also output the foreground V[k] vectors $51_k$ that were used to generate the interpolated foreground V[k] vectors so that an audio decoding device, such as the audio decoding device 24, may generate the interpolated foreground V[k] vectors and thereby recover the foreground V[k] vectors $51_k$. The foreground V[k] vectors $51_k$ used to generate the interpolated foreground V[k] vectors are denoted as the remaining foreground V[k] vectors 53. In order to ensure that the same V[k] and V[k−1] are used at the encoder and decoder (to create the interpolated vectors V[k]) quantized/dequantized versions of the vectors may be used at the encoder and decoder. The spatio-temporal interpolation unit 50 may output the interpolated nFG signals 49' to the psychoacoustic audio coder 46 and the interpolated foreground V[k] vectors $51_k$ to the coefficient reduction unit 46.

The coefficient reduction unit 46 may represent a unit configured to perform coefficient reduction with respect to the remaining foreground V[k] vectors 53 based on the background channel information 43 to output reduced foreground V[k] vectors 55 to the quantization unit 52. The reduced foreground V[k] vectors 55 may have dimensions D: $[(N+1)^2-(N_{BG}+1)^2-BG_{TOT}] \times nFG$. The coefficient reduction unit 46 may, in this respect, represent a unit configured to reduce the number of coefficients in the remaining foreground V[k] vectors 53. In other words, coefficient reduction unit 46 may represent a unit configured to eliminate the coefficients in the foreground V[k] vectors (that form the remaining foreground V[k] vectors 53) having little to no directional information. In some examples, the coefficients of the distinct or, in other words, foreground V[k] vectors corresponding to a first and zero order basis functions (which may be denoted as $N_{BG}$) provide little directional information and therefore can be removed from the foreground V-vectors (through a process that may be referred to as "coefficient reduction"). In this example, greater flexibility may be provided to not only identify the coefficients that correspond $N_{BG}$ but to identify additional HOA channels (which may be denoted by the variable TotalOfAddAmbHOAChan) from the set of $[(N_{BG}+1)^2+1, (N+1)^2]$.

The quantization unit 52 may represent a unit configured to perform any form of quantization to compress the reduced foreground V[k] vectors 55 to generate coded foreground V[k] vectors 57, outputting the coded foreground V[k] vectors 57 to the bitstream generation unit 42. In operation, the quantization unit 52 may represent a unit configured to compress a spatial component of the sound field, i.e., one or more of the reduced foreground V[k] vectors 55 in this example. The quantization unit 52 may perform any one of the following 12 quantization modes, as indicated by a quantization mode syntax element denoted "NbitsQ":

| NbitsQ value | Type of Quantization Mode |
| --- | --- |
| 0-3: | Reserved |
| 4: | Vector Quantization |
| 5: | Scalar Quantization without Huffman Coding |
| 6: | 6-bit Scalar Quantization with Huffman Coding |
| 7: | 7-bit Scalar Quantization with Huffman Coding |
| 8: | 8-bit Scalar Quantization with Huffman Coding |
| ... | ... |
| 16: | 16-bit Scalar Quantization with Huffman Coding |

The quantization unit 52 may also perform predicted versions of any of the foregoing types of quantization modes, where a difference is determined between an element of (or a weight when vector quantization is performed) of the V-vector of a previous frame and the element (or weight when vector quantization is performed) of the V-vector of a current frame is determined. The quantization unit 52 may then quantize the difference between the elements or weights of the current frame and previous frame rather than the value of the element of the V-vector of the current frame itself.

The quantization unit 52 may perform multiple forms of quantization with respect to each of the reduced foreground V[k] vectors 55 to obtain multiple coded versions of the reduced foreground V[k] vectors 55. The quantization unit 52 may select the one of the coded versions of the reduced foreground V[k] vectors 55 as the coded foreground V[k] vector 57. The quantization unit 52 may, in other words, select one of the non-predicted vector-quantized V-vector, predicted vector-quantized V-vector, the non-Huffman-coded scalar-quantized V-vector, and the Huffman-coded scalar-quantized V-vector to use as the output switched-quantized V-vector based on any combination of the criteria discussed in this disclosure. In some examples, the quantization unit 52 may select a quantization mode from a set of quantization modes that includes a vector quantization mode and one or more scalar quantization modes, and quantize an input V-vector based on (or according to) the selected mode. The quantization unit 52 may then provide the selected one of the non-predicted vector-quantized V-vector (e.g., in terms of weight values or bits indicative thereof), predicted vector-quantized V-vector (e.g., in terms of error values or bits indicative thereof), the non-Huffman-coded scalar-quantized V-vector and the Huffman-coded scalar-quantized V-vector to the bitstream generation unit 52 as the coded foreground V[k] vectors 57. The quantization unit 52 may also provide the syntax elements indicative of the quantization mode (e.g., the NbitsQ syntax element) and any other syntax elements used to dequantize or otherwise reconstruct the V-vector.

The psychoacoustic audio coder unit 40 included within the audio encoding device 20 may represent multiple instances of a psychoacoustic audio coder, each of which is used to encode a different audio object or HOA channel of each of the energy compensated ambient HOA coefficients 47' and the interpolated nFG signals 49' to generate encoded ambient HOA coefficients 59 and encoded nFG signals 61. The psychoacoustic audio coder unit 40 may output the encoded ambient HOA coefficients 59 and the encoded nFG signals 61 to the bitstream generation unit 42.

The bitstream generation unit 42 included within the audio encoding device 20 represents a unit that formats data to conform to a known format (which may refer to a format known by a decoding device), thereby generating the vector-based bitstream 21. The audio bitstream 21 may, in other words, represent encoded audio data, having been encoded in the manner described above. The bitstream generation unit 42 may represent a multiplexer in some examples, which may receive the coded foreground V[k] vectors 57, the encoded ambient HOA coefficients 59, the encoded nFG signals 61 and the background channel information 43. The bitstream generation unit 42 may then generate audio bitstream 21 based on the coded foreground V[k] vectors 57, the encoded ambient HOA coefficients 59, the encoded nFG signals 61 and the background channel information 43. In this way, the bitstream generation unit 42 may thereby specify the vectors 57 in the audio bitstream 21 to obtain the audio bitstream 21. The audio bitstream 21 may include a primary or main bitstream and one or more side channel bitstreams.

Although not shown in the example of FIG. 3, the audio encoding device 20 may also include a bitstream output unit that switches the bitstream output from the audio encoding device 20 (e.g., between the directional-based bitstream 21 and the vector-based bitstream 21) based on whether a current frame is to be encoded using the directional-based synthesis or the vector-based synthesis. The bitstream output unit may perform the switch based on the syntax element output by the content analysis unit 26 indicating whether a directional-based synthesis was performed (as a result of detecting that the HOA coefficients 11 were generated from a synthetic audio object) or a vector-based synthesis was performed (as a result of detecting that the HOA coefficients were recorded). The bitstream output unit may specify the correct header syntax to indicate the switch or current encoding used for the current frame along with the respective one of the audio bitstreams 21.

Moreover, as noted above, the sound field analysis unit 44 may identify $BG_{TOT}$ ambient HOA coefficients 47, which may change on a frame-by-frame basis (although at times $BG_{TOT}$ may remain constant or the same across two or more adjacent (in time) frames). The change in $BG_{TOT}$ may result in changes to the coefficients expressed in the reduced foreground V[k] vectors 55. The change in $BG_{TOT}$ may result in background HOA coefficients (which may also be referred to as "ambient HOA coefficients") that change on a frame-by-frame basis (although, again, at times $BG_{TOT}$ may remain constant or the same across two or more adjacent (in time) frames). The changes often result in a change of energy for the aspects of the sound field represented by the addition or removal of the additional ambient HOA coefficients and the corresponding removal of coefficients from or addition of coefficients to the reduced foreground V[k] vectors 55.

As a result, the sound field analysis unit 44 may further determine when the ambient HOA coefficients change from frame to frame and generate a flag or other syntax element indicative of the change to the ambient HOA coefficient in terms of being used to represent the ambient components of the sound field (where the change may also be referred to as a "transition" of the ambient HOA coefficient or as a "transition" of the ambient HOA coefficient). In particular, the coefficient reduction unit 46 may generate the flag (which may be denoted as an AmbCoeffTransition flag or an AmbCoeffIdxTransition flag), providing the flag to the bitstream generation unit 42 so that the flag may be included in the audio bitstream 21 (possibly as part of side channel information).

The coefficient reduction unit 46 may, in addition to specifying the ambient coefficient transition flag, also modify how the reduced foreground V[k] vectors 55 are generated. In one example, upon determining that one of the ambient HOA ambient coefficients is in transition during the current frame, the coefficient reduction unit 46 may specify, a vector coefficient (which may also be referred to as a "vector element" or "element") for each of the V-vectors of the reduced foreground V[k] vectors 55 that corresponds to the ambient HOA coefficient in transition. Again, the ambient HOA coefficient in transition may add or remove from the $BG_{TOT}$ total number of background coefficients. Therefore, the resulting change in the total number of background coefficients affects whether the ambient HOA coefficient is included or not included in the bitstream, and whether the corresponding element of the V-vectors are included for the V-vectors specified in the bitstream in the second and third configuration modes described above. More information regarding how the coefficient reduction unit 46 may specify the reduced foreground V[k] vectors 55 to overcome the changes in energy is provided in U.S. application Ser. No. 14/594,533, entitled "TRANSITIONING OF AMBIENT HIGHER-ORDER AMBITION COEFFICIENTS," filed Jan. 12, 2015.

Figure 4:
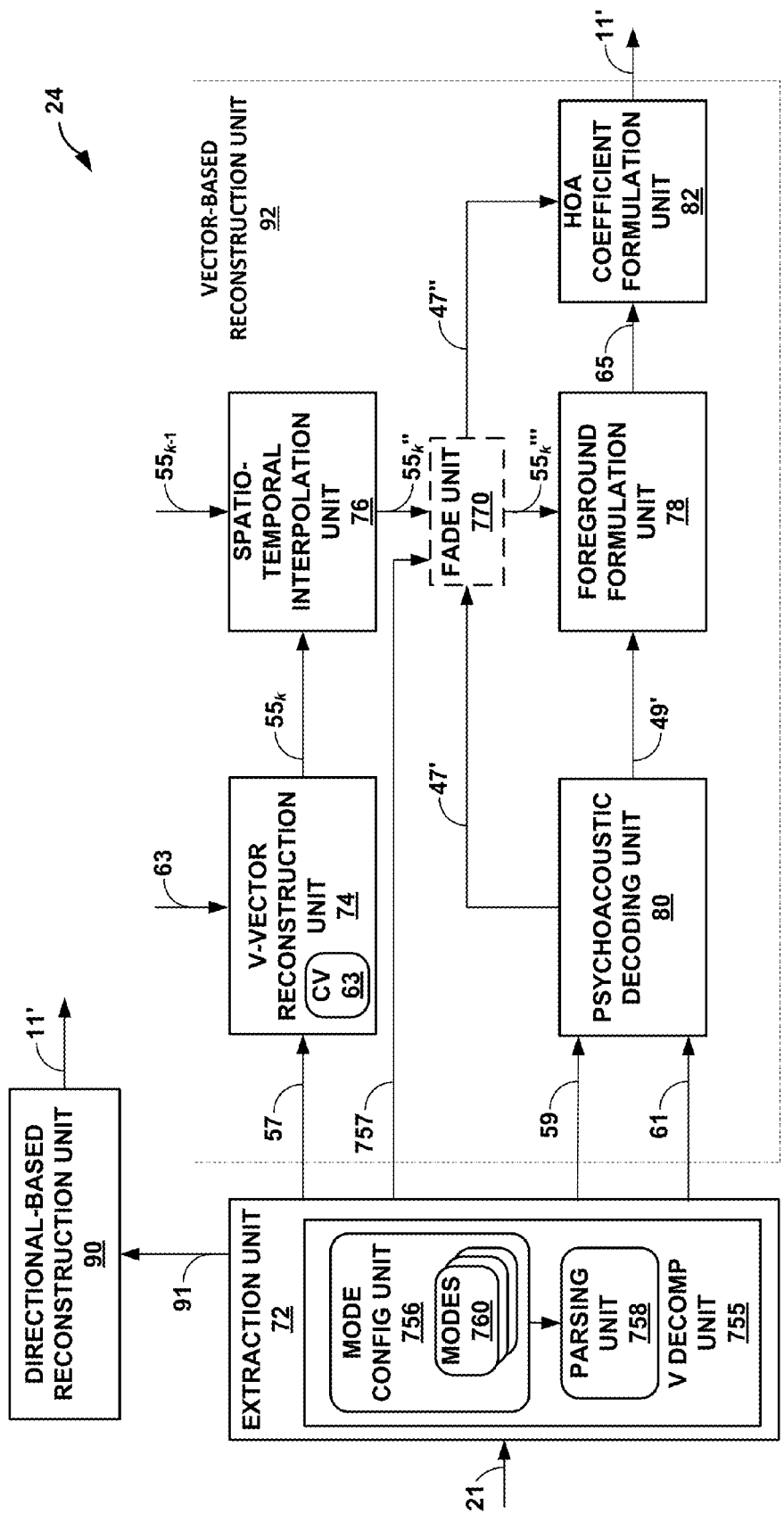
FIG. 4 is a block diagram illustrating the audio decoding device of FIG. 2 in more detail.

FIG. 4 is a block diagram illustrating the audio decoding device 24 of FIG. 2 in more detail. As shown in the example of FIG. 4 the audio decoding device 24 may include an extraction unit 72, a directional-based reconstruction unit 90 and a vector-based reconstruction unit 92. Although described below, more information regarding the audio decoding device 24 and the various aspects of decompressing or otherwise decoding HOA coefficients is available in International Patent Application Publication No. WO 2014/194099, entitled "INTERPOLATION FOR DECOMPOSED REPRESENTATIONS OF A SOUND FIELD," filed 29 May 2014.

The extraction unit 72 may represent a unit configured to receive the audio bitstream 21 and extract the various encoded versions (e.g., a directional-based encoded version or a vector-based encoded version) of the HOA coefficients 11. The extraction unit 72 may determine from the above noted syntax element indicative of whether the HOA coefficients 11 were encoded via the various direction-based or vector-based versions. When a directional-based encoding was performed, the extraction unit 72 may extract the directional-based version of the HOA coefficients 11 and the syntax elements associated with the encoded version (which is denoted as directional-based information 91 in the example of FIG. 4), passing the directional-based information 91 to the directional-based reconstruction unit 90. The directional-based reconstruction unit 90 may represent a unit configured to reconstruct the HOA coefficients in the form of HOA coefficients 11' based on the directional-based information 91. The bitstream and the arrangement of syntax elements within the bitstream is described below in more detail with respect to the example of FIGS. 7A-7J.

When the syntax element indicates that the HOA coefficients 11 were encoded using a vector-based synthesis, the extraction unit 72 may extract the coded foreground V[k] vectors 57 (which may include coded weights 57 and/or indices 63 or scalar quantized V-vectors), the encoded ambient HOA coefficients 59 and the corresponding audio objects 61 (which may also be referred to as the encoded nFG signals 61). The audio objects 61 each correspond to one of the vectors 57. The extraction unit 72 may pass the coded foreground V[k] vectors 57 to the V-vector reconstruction unit 74 and the encoded ambient HOA coefficients 59 along with the encoded nFG signals 61 to the psychoacoustic decoding unit 80.

The V-vector reconstruction unit 74 may represent a unit configured to reconstruct the V-vectors from the encoded foreground V[k] vectors 57. The V-vector reconstruction unit 74 may operate in a manner reciprocal to that of the quantization unit 52.

The psychoacoustic decoding unit 80 may operate in a manner reciprocal to the psychoacoustic audio coder unit 40 shown in the example of FIG. 3 so as to decode the encoded ambient HOA coefficients 59 and the encoded nFG signals 61 and thereby generate energy compensated ambient HOA coefficients 47' and the interpolated nFG signals 49' (which may also be referred to as interpolated nFG audio objects 49'). The psychoacoustic decoding unit 80 may pass the energy compensated ambient HOA coefficients 47' to the fade unit 770 and the nFG signals 49' to the foreground formulation unit 78.

The spatio-temporal interpolation unit 76 may operate in a manner similar to that described above with respect to the spatio-temporal interpolation unit 50. The spatio-temporal interpolation unit 76 may receive the reduced foreground V[k] vectors $55_k$ and perform the spatio-temporal interpolation with respect to the foreground V[k] vectors $55_k$ and the reduced foreground V[k−1] vectors $55_{k-1}$ to generate interpolated foreground V[k] vectors $55_k"$. The spatio-temporal interpolation unit 76 may forward the interpolated foreground V[k] vectors $55_k"$ to the fade unit 770.

The extraction unit 72 may also output a signal 757 indicative of when one of the ambient HOA coefficients is in transition to fade unit 770, which may then determine which of the $SHC_{BG}$ 47' (where the $SHC_{BG}$ 47' may also be denoted as "ambient HOA channels 47'" or "ambient HOA coefficients 47'") and the elements of the interpolated foreground V[k] vectors $55_k"$ are to be either faded-in or faded-out. In some examples, the fade unit 770 may operate opposite with respect to each of the ambient HOA coefficients 47' and the elements of the interpolated foreground V[k] vectors $55_k"$. That is, the fade unit 770 may perform a fade-in or fade-out, or both a fade-in or fade-out with respect to corresponding one of the ambient HOA coefficients 47', while performing a fade-in or fade-out or both a fade-in and a fade-out, with respect to the corresponding one of the elements of the interpolated foreground V[k] vectors $55_k"$. The fade unit 770 may output adjusted ambient HOA coefficients 47" to the HOA coefficient formulation unit 82 and adjusted foreground V[k] vectors $55_k"$ to the foreground formulation unit 78. In this respect, the fade unit 770 represents a unit configured to perform a fade operation with respect to various aspects of the HOA coefficients or derivatives thereof, e.g., in the form of the ambient HOA coefficients 47' and the elements of the interpolated foreground V[k] vectors $55_k"$.

The foreground formulation unit 78 may represent a unit configured to perform matrix multiplication with respect to the adjusted foreground V[k] vectors $55_k'''$ and the interpolated nFG signals 49' to generate the foreground HOA coefficients 65. In this respect, the foreground formulation unit 78 may combine the audio objects 49' (which is another way by which to denote the interpolated nFG signals 49') with the vectors $55_k'''$ to reconstruct the foreground or, in other words, predominant aspects of the HOA coefficients 11'. The foreground formulation unit 78 may perform a matrix multiplication of the interpolated nFG signals 49' by the adjusted foreground V[k] vectors $55_k'''$.

The HOA coefficient formulation unit 82 may represent a unit configured to combine the foreground HOA coefficients 65 to the adjusted ambient HOA coefficients 47" so as to obtain the HOA coefficients 11'. The prime notation reflects that the HOA coefficients 11' may be similar to but not the same as the HOA coefficients 11. The differences between the HOA coefficients 11 and 11' may result from loss due to transmission over a lossy transmission medium, quantization or other lossy operations.

Figure 5:
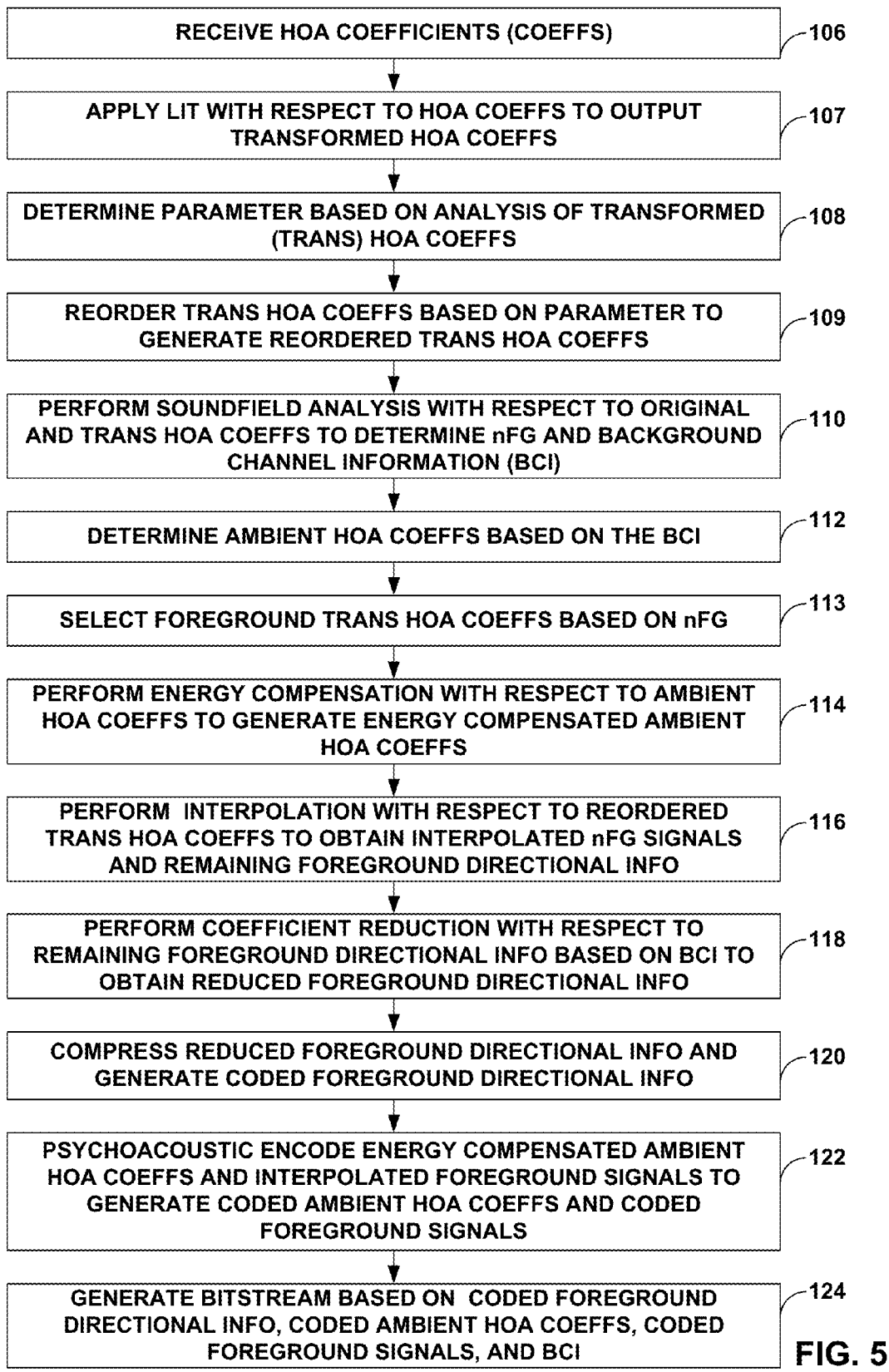
FIG. 5 is a flowchart illustrating exemplary operation of an audio encoding device in performing various aspects of the vector-based synthesis techniques described in this disclosure.

FIG. 5 is a flowchart illustrating exemplary operation of an audio encoding device, such as the audio encoding device 20 shown in the example of FIG. 3, in performing various aspects of the vector-based synthesis techniques described in this disclosure. Initially, the audio encoding device 20 receives the HOA coefficients 11 (106). The audio encoding device 20 may invoke the LIT unit 30, which may apply a LIT with respect to the HOA coefficients to output transformed HOA coefficients (e.g., in the case of SVD, the transformed HOA coefficients may comprise the US[k] vectors 33 and the V[k] vectors 35) (107).

The audio encoding device 20 may next invoke the parameter calculation unit 32 to perform the above described analysis with respect to any combination of the US[k] vectors 33, US[k−1] vectors 33, the V[k] and/or V[k−1] vectors 35 to identify various parameters in the manner described above. That is, the parameter calculation unit 32 may determine at least one parameter based on an analysis of the transformed HOA coefficients 33/35 (108).

The audio encoding device 20 may then invoke the reorder unit 34, which may reorder the transformed HOA coefficients (which, again in the context of SVD, may refer to the US[k] vectors 33 and the V[k] vectors 35) based on the parameter to generate reordered transformed HOA coefficients 33'/35' (or, in other words, the US[k] vectors 33' and the V[k] vectors 35'), as described above (109). The audio encoding device 20 may, during any of the foregoing operations or subsequent operations, also invoke the sound field analysis unit 44. The sound field analysis unit 44 may, as described above, perform a sound field analysis with respect to the HOA coefficients 11 and/or the transformed HOA coefficients 33/35 to determine the total number of foreground channels (nFG) 45, the order of the background sound field ($N_{BG}$) and the number (nBGa) and indices (i) of additional BG HOA channels to send (which may collectively be denoted as background channel information 43 in the example of FIG. 3) (109).

The audio encoding device 20 may also invoke the background selection unit 48. The background selection unit 48 may determine background or ambient HOA coefficients 47 based on the background channel information 43 (110). The audio encoding device 20 may further invoke the foreground selection unit 36, which may select the reordered US[k] vectors 33' and the reordered V[k] vectors 35' that represent foreground or distinct components of the sound field based on nFG 45 (which may represent a one or more indices identifying the foreground vectors) (112).

The audio encoding device 20 may invoke the energy compensation unit 38. The energy compensation unit 38 may perform energy compensation with respect to the ambient HOA coefficients 47 to compensate for energy loss due to removal of various ones of the HOA coefficients by the background selection unit 48 (114) and thereby generate energy compensated ambient HOA coefficients 47'.

The audio encoding device 20 may also invoke the spatio-temporal interpolation unit 50. The spatio-temporal interpolation unit 50 may perform spatio-temporal interpolation with respect to the reordered transformed HOA coefficients 33'/35' to obtain the interpolated foreground signals 49' (which may also be referred to as the "interpolated nFG signals 49'") and the remaining foreground directional information 53 (which may also be referred to as the "V[k] vectors 53") (116). The audio encoding device 20 may then invoke the coefficient reduction unit 46. The coefficient reduction unit 46 may perform coefficient reduction with respect to the remaining foreground V[k] vectors 53 based on the background channel information 43 to obtain reduced foreground directional information 55 (which may also be referred to as the reduced foreground V[k] vectors 55) (118).

The audio encoding device 20 may then invoke the quantization unit 52 to compress, in the manner described above, the reduced foreground V[k] vectors 55 and generate coded foreground V[k] vectors 57 (120).

The audio encoding device 20 may also invoke the psychoacoustic audio coder unit 40. The psychoacoustic audio coder unit 40 may psychoacoustic code each vector of the energy compensated ambient HOA coefficients 47' and the interpolated nFG signals 49' to generate encoded ambient HOA coefficients 59 and encoded nFG signals 61. The audio encoding device may then invoke the bitstream generation unit 42. The bitstream generation unit 42 may generate the audio bitstream 21 based on the coded foreground directional information 57, the coded ambient HOA coefficients 59, the coded nFG signals 61 and the background channel information 43.

Figure 6:
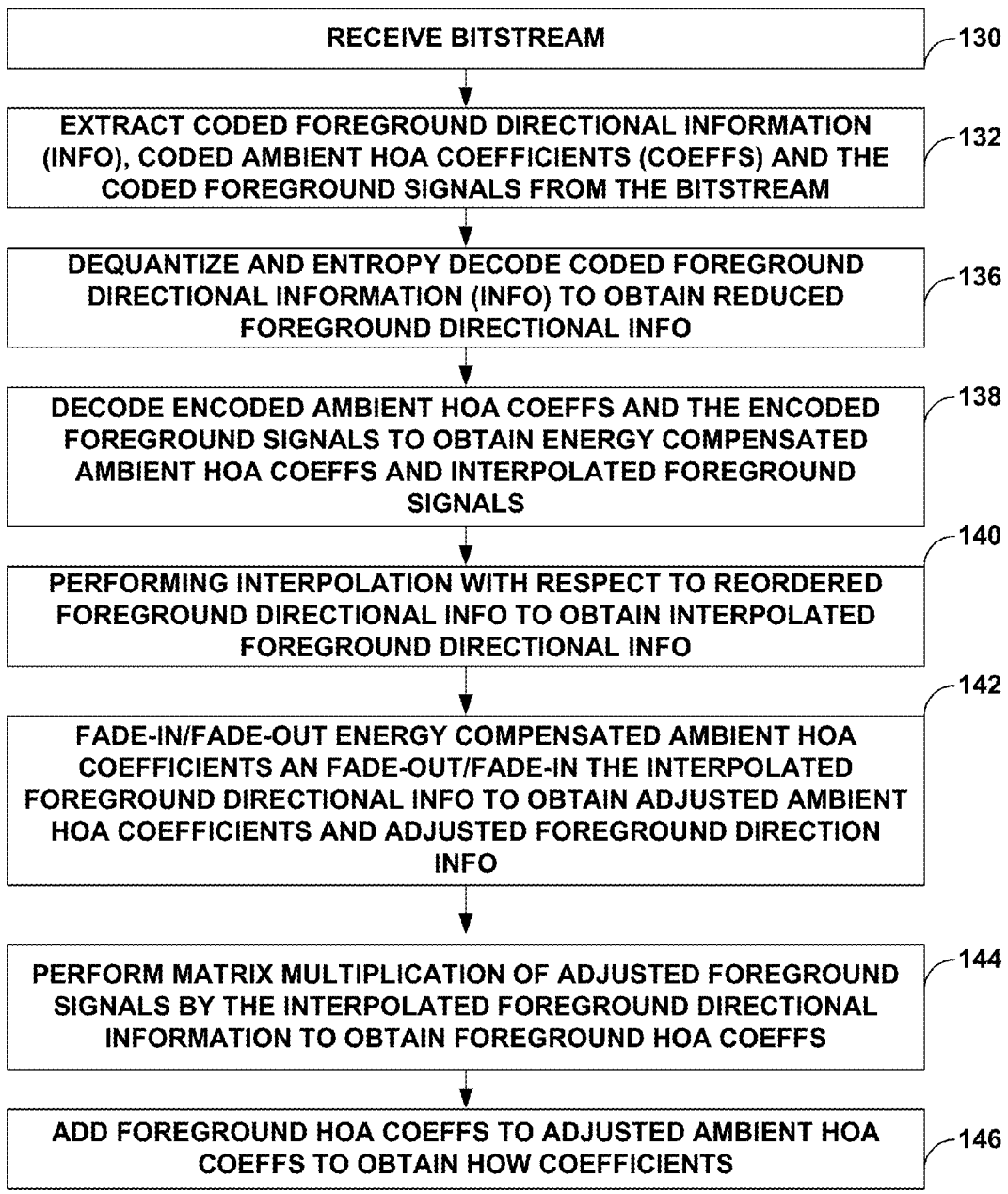
FIG. 6 is a flowchart illustrating exemplary operation of an audio decoding device in performing various aspects of the techniques described in this disclosure.

FIG. 6 is a flowchart illustrating exemplary operation of an audio decoding device, such as the audio decoding device 24 shown in FIG. 4, in performing various aspects of the techniques described in this disclosure. Initially, the audio decoding device 24 may receive the audio bitstream 21 (130). Upon receiving the bitstream, the audio decoding device 24 may invoke the extraction unit 72. Assuming for purposes of discussion that the audio bitstream 21 indicates that vector-based reconstruction is to be performed, the extraction unit 72 may parse the bitstream to retrieve the above noted information, passing the information to the vector-based reconstruction unit 92.

In other words, the extraction unit 72 may extract the coded foreground directional information 57 (which, again, may also be referred to as the coded foreground V[k] vectors 57), the coded ambient HOA coefficients 59 and the coded foreground signals (which may also be referred to as the coded foreground nFG signals 59 or the coded foreground audio objects 59) from the audio bitstream 21 in the manner described above (132).

The audio decoding device 24 may further invoke the dequantization unit 74. The dequantization unit 74 may entropy decode and dequantize the coded foreground directional information 57 to obtain reduced foreground directional information $55_k$ (136). The audio decoding device 24 may also invoke the psychoacoustic decoding unit 80. The psychoacoustic decoding unit 80 may decode the encoded ambient HOA coefficients 59 and the encoded foreground signals 61 to obtain energy compensated ambient HOA coefficients 47' and the interpolated foreground signals 49' (138). The psychoacoustic decoding unit 80 may pass the energy compensated ambient HOA coefficients 47' to the fade unit 770 and the nFG signals 49' to the foreground formulation unit 78.

The audio decoding device 24 may next invoke the spatio-temporal interpolation unit 76. The spatio-temporal interpolation unit 76 may receive the reordered foreground directional information $55_k'$ and perform the spatio-temporal interpolation with respect to the reduced foreground directional information $55_k/55_{k-1}$ to generate the interpolated foreground directional information $55_k''$ (140). The spatio-temporal interpolation unit 76 may forward the interpolated foreground V[k] vectors $55_k''$ to the fade unit 770.

The audio decoding device 24 may invoke the fade unit 770. The fade unit 770 may receive or otherwise obtain syntax elements (e.g., from the extraction unit 72) indicative of when the energy compensated ambient HOA coefficients 47' are in transition (e.g., the AmbCoeffTransition syntax element). The fade unit 770 may, based on the transition syntax elements and the maintained transition state information, fade-in or fade-out the energy compensated ambient HOA coefficients 47' outputting adjusted ambient HOA coefficients 47" to the HOA coefficient formulation unit 82. The fade unit 770 may also, based on the syntax elements and the maintained transition state information, and fade-out or fade-in the corresponding one or more elements of the interpolated foreground V[k] vectors $55_k''$ outputting the adjusted foreground V[k] vectors $55_k'''$ to the foreground formulation unit 78 (142).

The audio decoding device 24 may invoke the foreground formulation unit 78. The foreground formulation unit 78 may perform matrix multiplication the nFG signals 49' by the adjusted foreground directional information $55_k'''$ to obtain the foreground HOA coefficients 65 (144). The audio decoding device 24 may also invoke the HOA coefficient formulation unit 82. The HOA coefficient formulation unit 82 may add the foreground HOA coefficients 65 to adjusted ambient HOA coefficients 47'' so as to obtain the HOA coefficients 11' (146).

According to the techniques of this disclosure, audio decoding device 24 may compute an HOA effect matrix based on the production screen size and reproduction window size. The HOA effect matrix may then be multiplied with a given HOA rendering matrix R to create the screen-related HOA rendering matrix. In some implementations, the adaptation of the HOA rendering matrix may be done offline during, for example, an initialization phase of audio decoding device 24, such that run-time complexity does not increase.

One proposed technique of this disclosure uses nine-hundred (900) equally spaced sampling point on a sphere ($\Omega^{900}$) each of the sampling points defined with direction ($\theta$, $\phi$) as described in Annex F.9 of ISO/IEC DIS 23008-3, Information technology—High efficiency coding and media delivery in heterogeneous environments—Part 3: 3D audio (hereinafter "DIS 23008"). Based on those directions, the audio decoding device 24 may compute a mode matrix $\Psi^{900}$ as outlined in Annex F.1.5 of DIS 23008. The audio decoding device 24 may modify the directions of those 900 sampling points via the mapping function, and audio decoding device 24 may compute the modified mode matrix $\Psi_m^{900}$ accordingly. To avoid a mismatch between screen-related audio objects and screen-related HOA content, the audio decoding device 24 may use the same mapping functions already described in Clause 18.3 of DIS 23008. The audio decoding device 24 may compute the effect matrix F is then computed as:

$$F = \text{pinv}(\Psi^{900\,T}) \Psi_m^{900\,T} \quad (1)$$

The audio decoding device 24 may then compute the screen-related rendering matrix computed as:

$$D = RF \quad (2)$$

In some examples, the audio decoding device 24 may pre-compute and store the matrix pinv ($\Psi^{900\,T}$) to avoid repetition of one or more of the processing steps described above. The total number of remaining operations in equation (1) and (2) to generate D is $(900+M)*(N+1)^4$. For a rendering matrix with the order N=4 and M=22 speakers, the complexity is approximately 0.58 weighted MOPS. According to another proposed technique of this disclosure, the audio decoding device 24 may use a preliminary effect matrix and loudness compensation to generate a screen-related rendering matrix. When compared to using 900 equally spaced sampling points in the manner described above, using the preliminary effect matrix and loudness compensation may reduce processing complexity at the audio decoding device 24, while still achieving desirable quality. By computing an effect matrix without accounting for the rendering matrix, the audio decoding device 24 may increase computational complexity significantly, while providing little or no benefit in terms of sound quality for some speaker configurations, such as 5.1 or 7.1 speaker configurations, which tend to have all speakers located in the same plane. Additionally, by replacing certain HOA domain computations with loudspeaker domain computations, the audio decoding device 24 may reduce the overall computational complexity, as HOA domain computations tend to be relatively complex compared to loudspeaker domain computations.

The audio decoding device 24 may compute the mapping based on M equidistant spatial directions $\sim M > (N+1)^2$, where $N$ is the HOA order.

The audio decoding device 24 may compute the preliminary effect matrix $\tilde{F}$, which is in the loudspeaker feed domain from the HOA coefficients associated with these directions rendered with the original rendering matrix R as follows:

$$\tilde{F} = (\Psi^M R^1)\dagger (\Psi_m^M R^1).$$

In another example in accordance with aspects of this disclosure, the audio decoding device 24 may compute the preliminary effect matrix $\tilde{F}$, which is in the loudspeaker feed domain, from the HOA coefficients associated with these directions rendered with the original rendering matrix R as follows:

$$\tilde{F} = (\Psi^{(O,M)^T} R^T)\dagger \Psi^{(O,M)^T} R^T).$$

where $\Psi^{(O,M)} := [S_1^0 \ S_2^0 \ldots S_M^0] \in \mathbb{R}^{O \times M}$ as described in DIS, Annex F.1.5

In other examples in accordance with aspects of this disclosure, the audio decoding device 24 may compute the preliminary effect matrix $\tilde{F}$ without using the rendering matrix R. According to these examples, the audio decoding device 24 may compute the preliminary effect matrix $\tilde{F}$ which is in the HOA domain, from the HOA coefficients associated with these directions rendered with the original rendering matrix R as follows:

$$\tilde{F} = (\Psi^{(O,M)^T})\dagger \Psi^{(O,M)^T}).$$

where $\Psi^{(O,M)} := [S_1^0 \ S_2^0 \ldots S_M^0] \in \mathbb{R}^{O \times M}$ as described in DIS, Annex F.1.5

According to some examples in accordance with this disclosure, the audio decoding device 24 may apply loudness compensation for each spatial direction l for the final matrix F, which is in the loudspeaker feed domain, as follows:

$$A(l) = \sqrt{\frac{\Sigma(\Psi_m^M(l)R')2}{\Sigma(\Psi^M(l)R'\tilde{F})2}}$$

$$F = (\Psi^M R')^\wedge \dagger \text{diag}(A) \ (\Psi_m^M R').$$

In examples in accordance with aspects of this disclosure, the audio decoding device 24 may apply loudness compensation for each spatial direction l for the final matrix F, which is in the loudspeaker feed domain, as follows:

$$A(l) = \sqrt{\frac{(RS_{ml}^O)^T(RS_{ml}^O)}{(\tilde{F}RS_l^O)^T(\tilde{F}RS_l^O)}}$$

$$F = (\Psi^{(O,M)^T} R^T)^\wedge \dagger \text{diag}(A) \ (\Psi_m^{(O,M)^T} R^T).$$

In other examples of this disclosure in which the preliminary effect matrix $\tilde{F}$ (e.g., in the HOA domain) is computed without using the rendering matrix R, the audio decoding device 24 may apply loudness compensation for each spatial direction l for the final matrix F (e.g., in the HOA domain) as follows:

$$A(l) = \sqrt{\frac{(RS_{ml}^O)^T(RS_{ml}^O)}{(R\tilde{F}S_l^O)^T(R\tilde{F}S_l^O)}}$$

$$F = \left(\Psi^{(O,M)T}\right)^{\wedge} \dagger \text{diag}(A) \left(\Psi_m^{(O,M)T}\right).$$

In some examples, the audio decoding device 24 may implement the techniques of this disclosure to dynamically generate a mode matrix $\Psi^{(O,M)}$ to accommodate perspective changes affecting the corresponding video data. It will be appreciated that the audio decoding device 24 may implement the techniques to manipulate the mode matrix $\Psi^{(O,M)}$ based on any one or more of a variety of perspective parameters discussed herein. By way of example, the dynamic perspective-based updating of the mode matrix $\Psi^{(O,M)}$ is described below with respect to zooming information of the video data. During a dynamic zooming event, the audio decoding device 24 may compute a new effect matrix F using the dynamically-updated mode matrix $\Psi^{(O,M)}$. Upon detecting an end to the dynamic zooming event (e.g., detecting that the zooming status is now static), the audio decoding device 24 may revert to the mode matrix $\Psi_m^{900}$ where the number of spatial sampling points used ('M') is 900. As described in further detail below, the audio decoding device 24 may implement the screen-based adaptation techniques of this disclosure to accommodate dynamic zooming events while conserving computing resource usage.

An example of the screen-based adaption techniques of this disclosure that the audio decoding device 24 may implement to accommodate dynamic zoom events may be performed (e.g., by various combinations of the components of the audio decoding device 24) using the steps outlined below. First, the audio decoding device 24 may generate a mode matrix $\Psi^{(O,M)}$ as outlined in Annex F.1.5 of DIS 23008. If the audio decoding device 24 detects that the perspective of the corresponding video content is static (e.g., no zoom event is occurring currently), then the audio decoding device 24 may set the value of 'M' to be 900 (nine hundred). In other words, in the case of a static perspective, the audio decoding device 24 may generate the mode matrix $\Psi^{(O,M)}$ using a total of 900 sampling points. However, if the audio decoding device 24 detects that the video data is currently undergoing a zooming event (either a zoom-in or a zoom-out), then the audio decoding device 24 may dynamically generate the number of sample points.

According to some aspects of this disclosure, during an ongoing zooming event, the audio decoding device 24 may compute the mode matrix $\Psi^{(O,M)}$ using the HOA order of the audio data as a computational parameter. For instance, the audio decoding device 24 may compute the number of sampling points according to the formula:

$$M=(N+2)^2$$

In this example, 'M' denotes the number of sampling points, and 'N' denotes the order of the ambitions coefficients. Thus, according to these examples of the dynamic zoom accommodation in screen-based adaptation, the audio decoding device 24 would use 36 sampling points to generate the mode matrix if the highest order coefficients are of the fourth (4th) order. More specifically, in this particular example, 'N'=4, yielding a value of 36 for 'M' when solving the above equation. Applying this equation to other use case scenarios, the audio decoding device 24 would use 49 sampling points to generate the mode matrix if the highest order coefficients are of the fifth (5th) order, or the audio decoding device 24 would use 64 sampling points to generate the mode matrix if the highest order coefficients are of the sixth (6th) order. As defined in Annex F.9 of DIS 23008, the directions of the 'M' sampling points are given by (θ, φ).

Second, the audio decoding device 24 may modify the directions of the M sampling points, using the mapping function defined in Clause 18.3 of DIS 23008. Based on the computation of 'M' and the modified directions, the audio decoding device 24 may compute the mode matrix $\Psi^{(O,M)}$. As described above, the mode matrix $\Psi^{(O,M)}:=[S_1^0 \ S_2^0 \ \ldots \ S_M^0] \in \mathbb{R}^{O \times M}$ according to Annex F.1.5 of DIS 23008.

Third, the audio decoding device 24 may compute or generate a preliminary effects matrix $\tilde{F}$ (e.g., in the HOA domain) as follows:

$$\tilde{F}=\Psi_m^{(O,M)}\Psi^{(O,M)\dagger}$$

where $\Psi^{(O,M)\dagger}$ denotes the pseudo-inverse of the mode matrix $\Psi_m^{(O,M)}$.

Fourth, the audio decoding device 24 may compute a loudness value by using the HOA rendering matrix R for each spatial direction. More specifically, according to the example workflow described herein, the audio decoding device 24 may use the HOA rendering matrix R as defined in clause 12.4.3.2 of DIS. The spatial directions are denoted herein as l=1 . . . M. For instance, the audio decoding device 24 may compute the loudness correction value according to the following formula:

$$A(l) = \sqrt{\frac{(RS_{m,l}^O)^T(RS_{m,l}^O)}{(R\tilde{F}S_l^O)^T(R\tilde{F}S_l^O)}}$$

Fifth, the audio decoding device 24 may compute the final effect matrix using the mode matrix computed as described above. For instance, the audio decoding device 24 may compute the final effect matrix F, which in the HOA domain, according to the following formula:

$$F=\Psi_m^{(O,M)}\text{diag}(A)\Psi^{(O,M)\dagger}$$

where diag(A) denotes a diagonal matrix including the vector A.

Sixth, the audio decoding device 24 may compute the new rendering matrix, according to the formula D=RF. According to the zoom-dependent adaptation techniques of this disclosure, if no local zoom information is available to the audio decoding device 24, then the audio decoding device 24 may not apply any zooming-based adaption to the generation of the mode matrix $\Psi^{(O,M)}$ or, as a result, the final effect matrix $\tilde{F}$. Thus, according to the dynamic zoom accommodation techniques of this disclosure, the audio decoding device 24 may apply the same algorithmic principles as described for the screen-related processing for Higher Order Ambitions, but the audio decoding device 24 may adapt the rendering matrix at runtime according to the data provided by the LocalZoomAreaSize( ) interface. Upon detecting that that the dynamic zooming event has concluded (e.g., the perspective of the screen content is now static), the audio decoding device 24 may revert to using a value of 900 for 'M'. In other words, the audio decoding device 24 may revert to using 900 sampling points in generating the mode matrix.

During a dynamic zooming event, the audio decoding device 24 may compute the new effect matrix F based on a mode matrix $\Psi^{(O,M)}$ with $M=(N+2)^2$ equally-spaced sampling points for which directions are given in Annex F.2 to F.9 of DIS. Once the audio decoding device 24 detects that the zoom is stationary, the audio decoding device 24 may compute the new effect matrix F based on a mode matrix $\Psi^{(O,M)}$ with M=900 spatial sampling points as described above. While zoom events are described herein with pinch or pinch-out gestures supplied by way of an input device (e.g., mouse and/or keyboard) or an input/output device (e.g., a touchscreen or capacitive stylus-operated screen), it will be appreciated that zoom events may be triggered in response to other stimuli (e.g., other types of user input) as well.

The dynamic zoom adjustment of this disclosure may provide one or more potential advantages and improvements over existing techniques. For instance, by reducing the number of sampling points used in computing the mode matrix during a dynamic zoom event, the audio decoding device 24 may implement the techniques of this disclosure to reduce the computational complexity and resource expenditure in addressing screen-based adaptation during rendering of audio feeds. As described above, in some scenarios, the audio decoding device 24 may reduce the sampling points from 900 to 36 during the zoom event. By reducing the computational complexity during mode matrix computation, the audio decoding device 24 may implement the techniques of this disclosure to more efficiently perform screen-based adaptation, while delivering audio feeds of reduced quality only during the zoom event. In turn, the audio decoding device 24 may restore the audio feed quality once the zoom is complete.

In some examples, the audio decoding device 24 may perform the screen-related adaptation techniques of this disclosure only if a particular syntax element is enabled. For instance, in these examples, the audio decoding device 24 may perform screen-related adaption of the mode matrix only if the isScreenRelative flag in the HOAConfig( ) section of Table 119 of DIS is signaled in an enabled state (e.g., set to a value of 1). Said another way, in these examples, the audio decoding device 24 may perform screen-related adaption of the mode matrix only if the audio decoding device 24 receives, in a bitstream, the isScreenRelative flag in an enabled state (e.g., set to the value of 1).

Additionally, in accordance with one or more aspects of this disclosure, the audio decoding device 24 may only compute the HOA rendering matrix during the initialization phase. For instance, the audio decoding device 24 may limit the HOA rendering matrix computation to the initialization phase because the screen-related adaptation techniques of this disclosure modify the HOA rendering matrix that is used for a sound field. If no local screen size information is available to the audio decoding device 24, then the audio decoding device 24 may not apply any screen-related adaptation. In some examples, in instances where the audio decoding device 24 only has access to the azimuth screen size information, the audio decoding device 24 may not apply any screen-related adaptation in the vertical dimension.

By performing loudness compensation, the audio decoding device 24 may, for example, compensate for the effects of mapping. In the example above, l is a spatial direction from 1 to capital M, and A(l) is a vector with A1 to Am entries. "diag(A)" represents a matrix with diagonal entries corresponding to A(l), and other locations in the matrix equal to 0. The above described techniques include a loudness compensation step that the audio decoding device 24 may use to equalize the undesired direction-dependent loudness differences caused by the spatial stretching and/or squeezing of the effect matrix. The preliminary effect matrix and the resulting effect matrix F are in the loudspeaker signal domain.

The audio decoding device 24 may then compute the screen-related rendering matrix as:

$$D=FR.$$

Figure 7B:
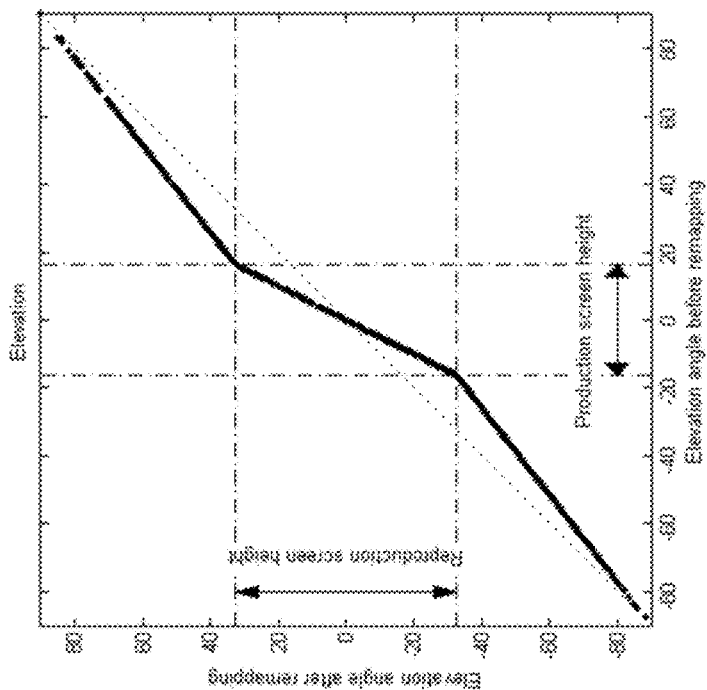
FIG. 7B shows an example mapping function that may be used to map original elevation angles to modified elevation angles based on a reference screen size and a viewing window size.
Figure 7A:
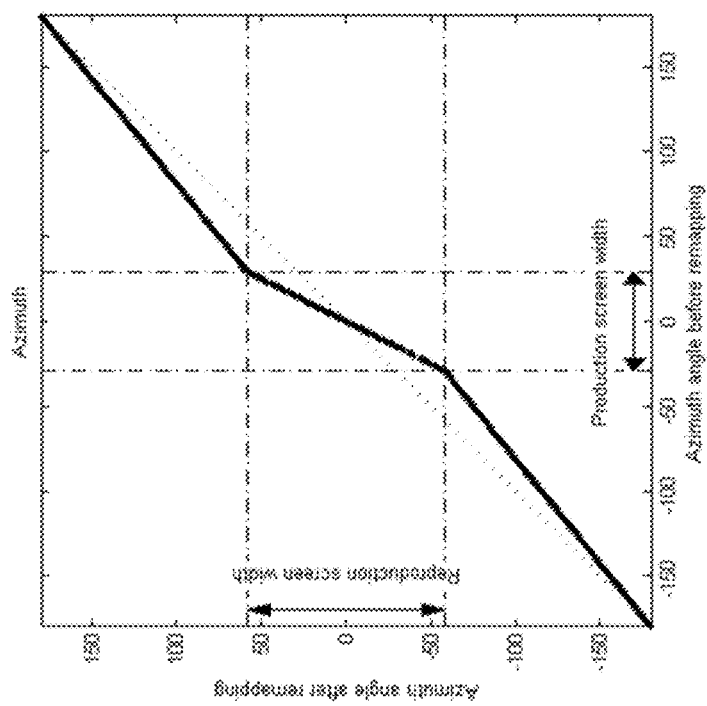
FIG. 7A shows an example mapping function that may be used to map original azimuth angles to modified azimuth angles based on a reference screen size and a viewing window size.

A first example of the screen-based adaptation techniques of this disclosure will now be described with references to FIGS. 7-11. FIG. 7A shows an example of a mapping function that may be used map an azimuth angle for a reference screen to an azimuth angle for a viewing window. FIG. 7B shows an example of mapping function that may be used map an elevation angle for a reference screen to an elevation angle for a viewing window. In the example of FIGS. 7A and 7B, the angles of the reference screen are 29 to −29 degrees azimuth and 16.3 to −16.3 degrees elevation, and the angles of the viewing window are 58 to −58 degrees azimuth and 32.6 to −32.6 degrees elevation. Thus, in the example of FIGS. 7A and 7B, the viewing window is twice as large as reference screen.

As used in this disclosure, a viewing window may refer to all or part of a screen used for reproducing video. A television that can be used in accordance with the aspects of this disclosure may, in various examples, represent an integrated device, such as a device that includes one or more speakers and/or a display. In various examples, the television may be a so-called "smart" television or smart TV, in that the television can process audiovisual bitstreams received over wired and/or wireless (e.g., Ethernet® or WiFi®) connections. A smart television or "smart TV" may include a communication interface (e.g., an Ethernet® card or WiFi® card), along with memory device(s) and one or more processors. When playing back a movie in a full screen mode on a television, tablet, phone or other such device, the viewing window may correspond to the entire screen of the device. In other examples, however, a viewing window may correspond to less than the entire screen of the device. For example, a device playing back four sporting events simultaneously may include four distinct viewing windows on one screen, or a device may have a single viewing window for playing back video and use the remaining screen area for displaying other content. The field of view of a viewing window may be determined based on such parameters as a physical size of the viewing window and/or a distance (either measured or assumed) from the viewing window to a viewing location. The field of view may, for example, be described by azimuth angles and elevation angles.

As used in this disclosure, a reference screen refers to a field of view corresponding to the sound field of HOA audio data. For example, HOA audio data may be generated or captured with respect to a certain field of view (i.e. a reference screen) but may be reproduced with respect to a different field of view (e.g. the field of view of a viewing window). As explained in this disclosure, the reference screen provides a reference by which an audio decoder may adapt the HOA audio data for local playback on a screen that differs in size, location, or some other such characteristic from the reference screen. For purposes of explanation, certain techniques in this disclosure may be described with reference to a production screen and reproduction screen. It should be understood that these same techniques are applicable to reference screens and viewing windows.

Figure 8:
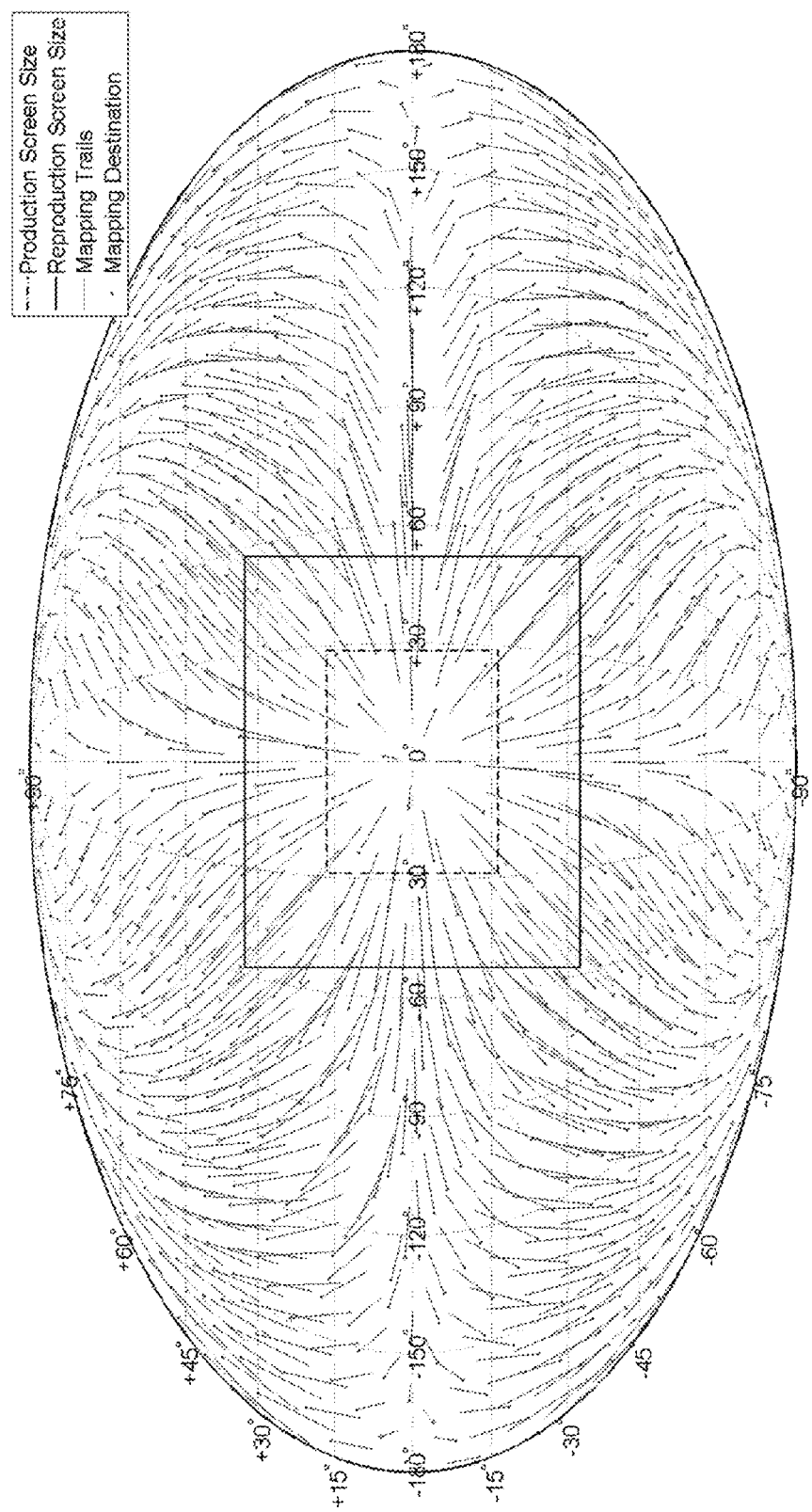
FIG. 8 shows a vector field for a desired screen-related expansion effect of the sound field as an effect of reference screen and viewing window for the first example.

FIG. 8 shows a vector field for a desired screen-related expansion effect of the sound field as an effect of reference screen and viewing window for the first example. In FIG. 8, the dots correspond to a mapping destination, while the lines going into the dots correspond mapping trails. The dashed-lined rectangle corresponds to a reference screen size, and the solid-lined rectangle corresponds to a viewing window size.

Figure 9B:
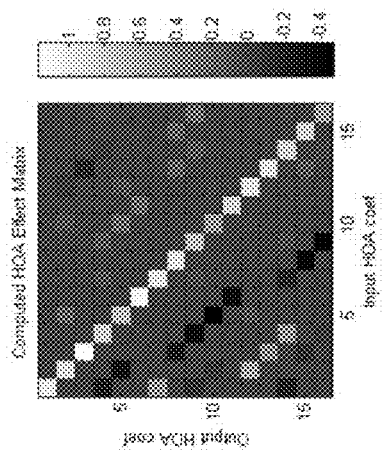
FIGS. 9A and 9B show examples of computed HOA effect matrices.
Figure 9A:
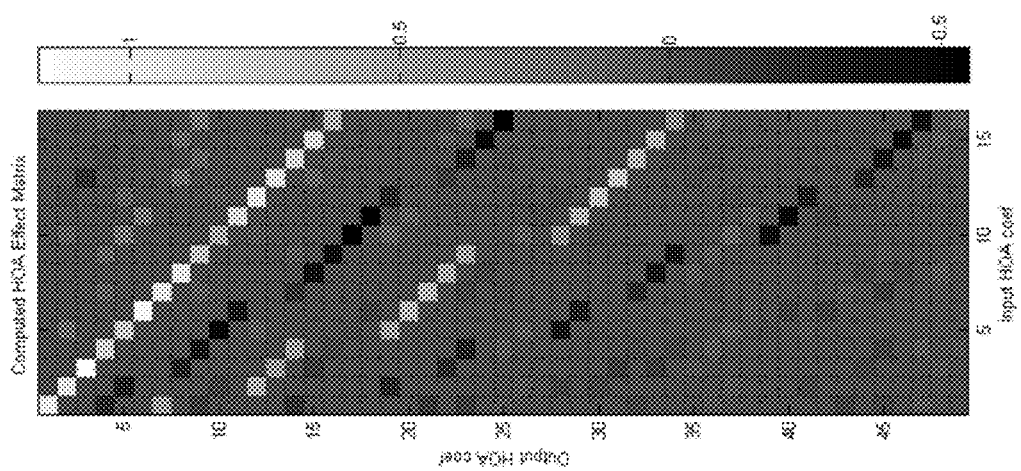

FIG. 9 shows an example of how the screen-related effect may cause an increase of the HOA order of the content. In the example of FIG. 9, the effect matrix is computed to create 49 HOA coefficients ($6^{th}$ order) from a $3^{rd}$ order input material. However, satisfactory results may also be achieved if the matrix is computed as square matrix with $(N+1)^2 \times (N+1)^2$ elements.

Figure 10:
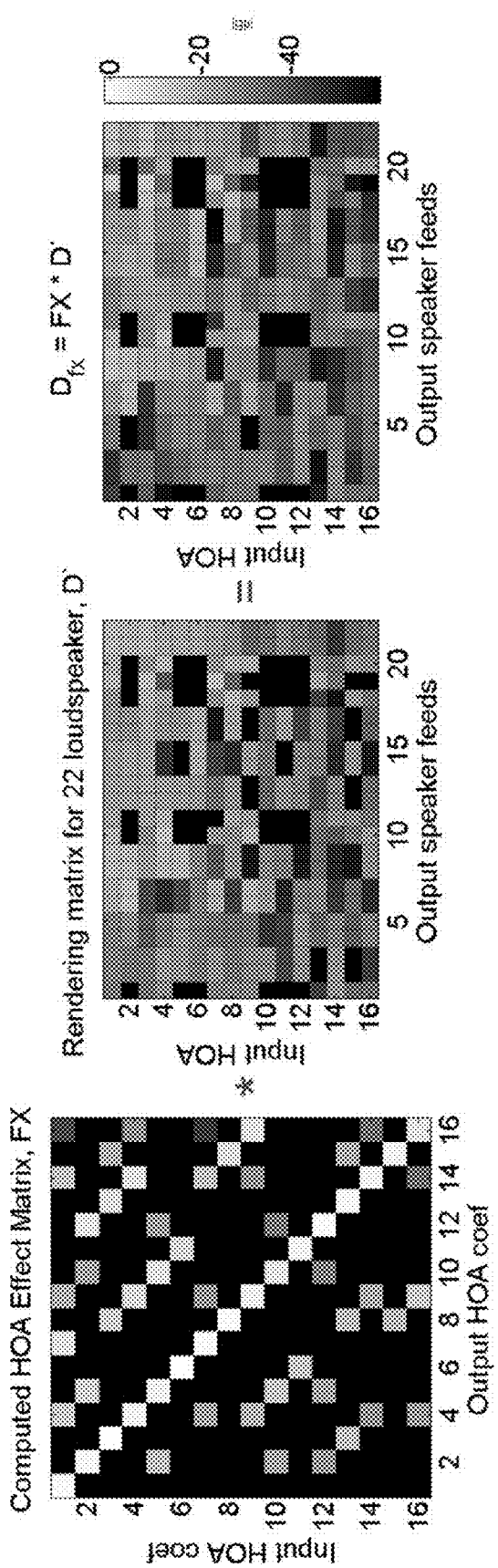
FIG. 10 shows an example of how an effect matrix may be pre-rendered and applied to the loudspeaker rendering matrix.

FIG. 10 shows an example of how the effect matrix may be pre-rendered and applied to the loudspeaker rendering matrix, thus requiring no extra computation at runtime.

Figure 11:
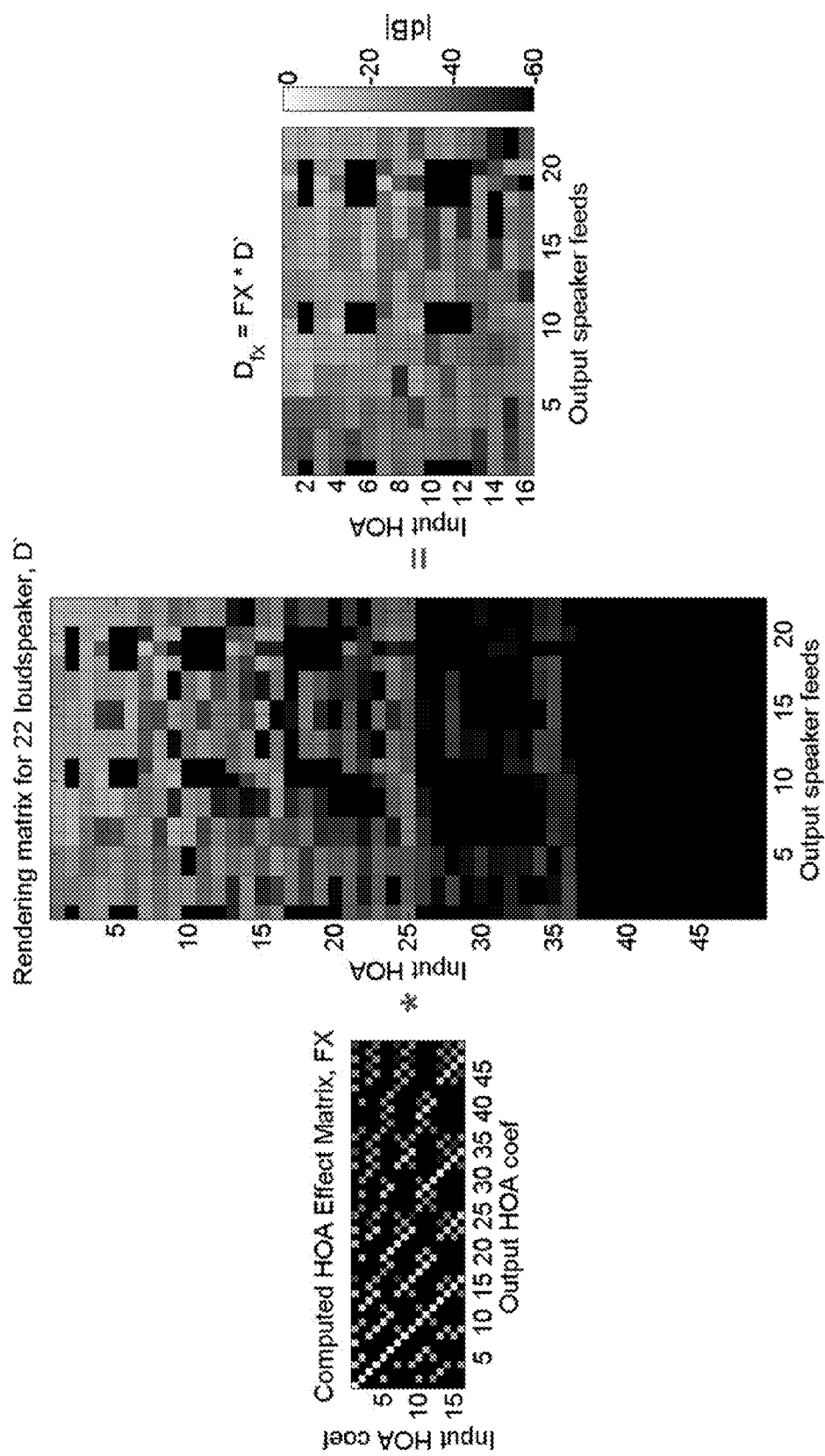
FIG. 11 shows an example of how if the effect matrix may result in a higher order content (e.g., $6^{th}$ order), a rendering matrix in this order may be multiplied to pre-compute the final rendering matrix in the original order (here $3^{rd}$ order).

FIG. 11 shows an example of how if the effect matrix may result in a higher order content (e.g., $6^{th}$ order), a rendering matrix in this order may be multiplied to pre-compute the final rendering matrix in the original order (here $3^{rd}$ order).

Figure 12C:
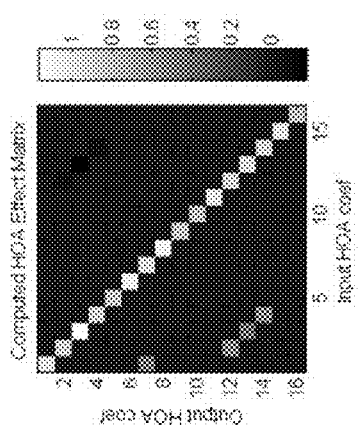
FIG. 12C shows a computed HOA effect matrix.
Figure 12B:
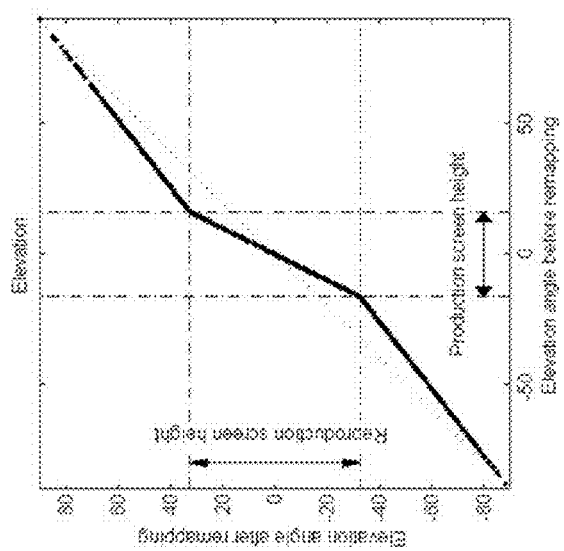
FIG. 12B show an examples mapping function that may be used to map original elevation angles to modified elevation angles based on a reference screen size and a viewing window size.
Figure 12A:
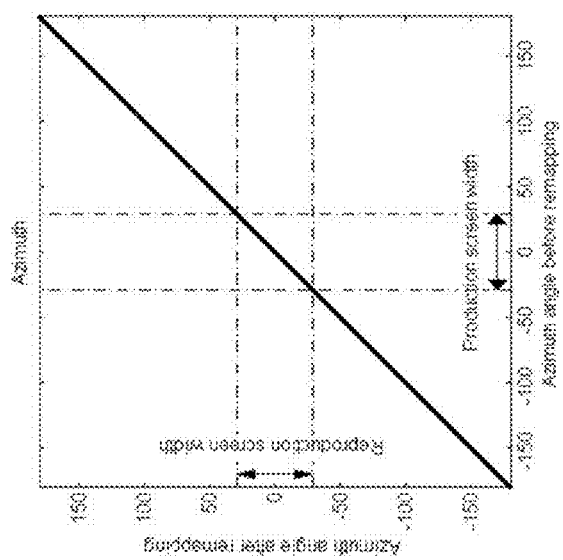
FIG. 12A show an example mapping function that may be used to map original azimuth angles to modified azimuth angles based on a reference screen size and a viewing window size.

A second example of the screen-based adaptation techniques of this disclosure will now be described with references to FIGS. 12-13. FIG. 12A shows an example of a mapping function that may be used map an azimuth angle for a reference screen to an azimuth angle for a viewing window. FIG. 12B shows an example of mapping function that may be used map an elevation angle for a reference screen to an elevation angle for a viewing window. In the example of FIGS. 12A and 12B, the angles of the reference screen are 29 to −29 degrees azimuth and 16.3 to −16.3 degrees elevation, and the angles of the viewing window are 29 to −29 degrees azimuth and 32.6 to −32.6 degrees elevation. Thus, in the example of FIGS. 12A and 12B, the viewing window is twice as tall but with the same width as the reference screen. FIG. 12C shows a computed HOA effect matrix for the second example.

Figure 13:
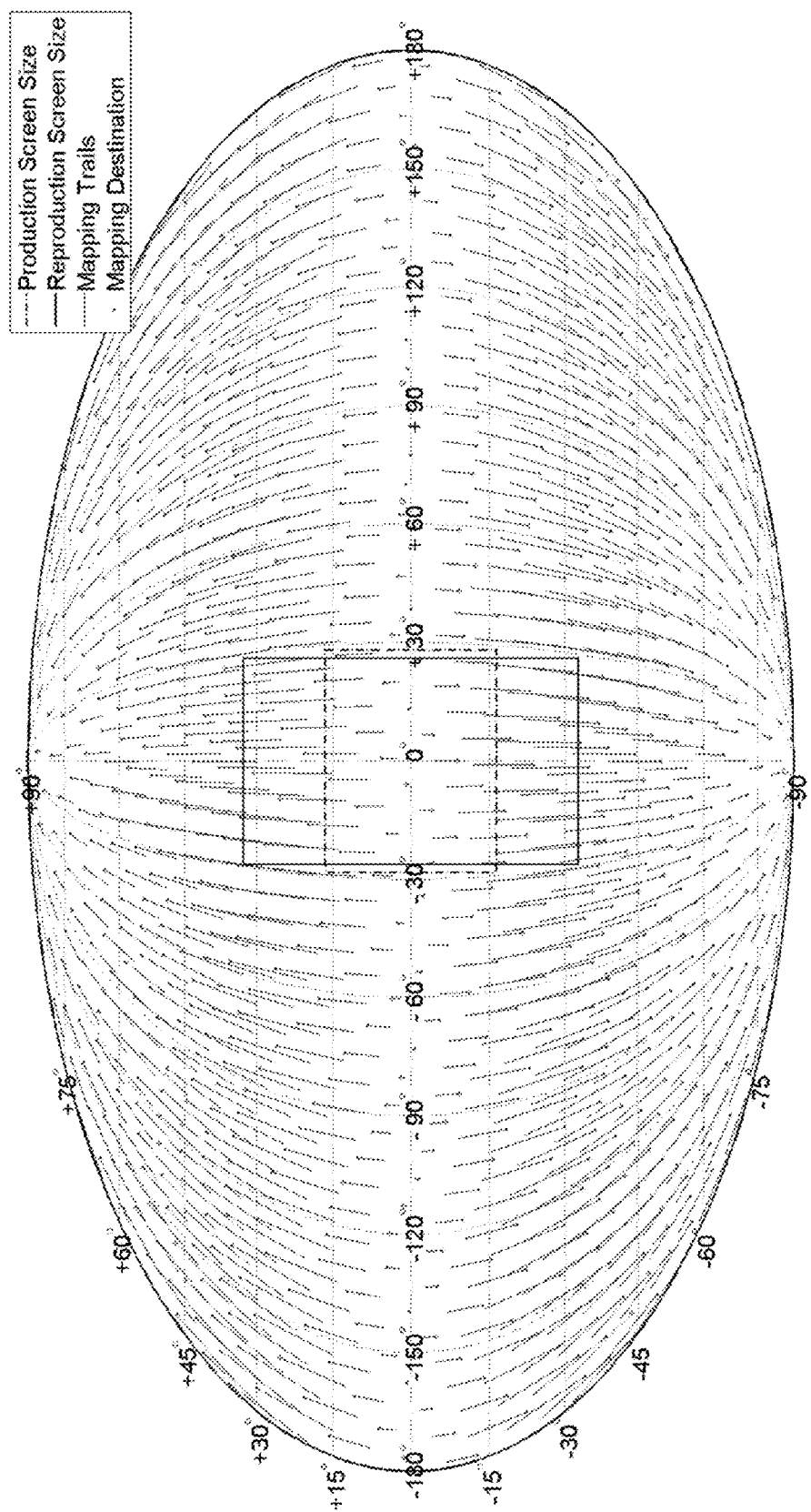
FIG. 13 shows a vector field for a desired screen-related expansion effect of the sound field as an effect of reference screen and viewing window.

FIG. 13 shows a vector field for a desired screen-related expansion effect of the sound field as an effect of reference screen and viewing window for the second example. In FIG. 13, the dots correspond to a mapping destination, while the lines going into the dots correspond mapping trails. The dashed-lined rectangle corresponds to a reference screen size, and the solid-lined rectangle corresponds to a viewing window size.

Figure 14C:
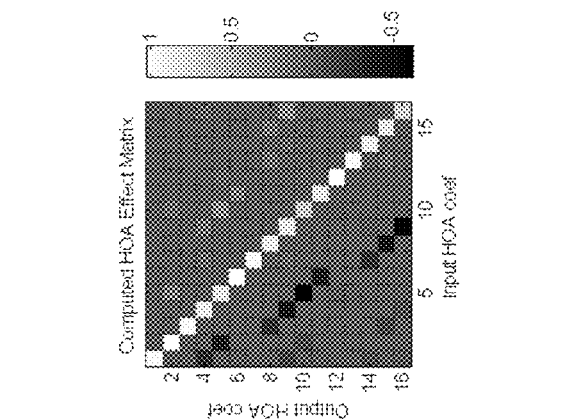
FIG. 14C shows a computed HOA effect matrix.
Figure 14B:
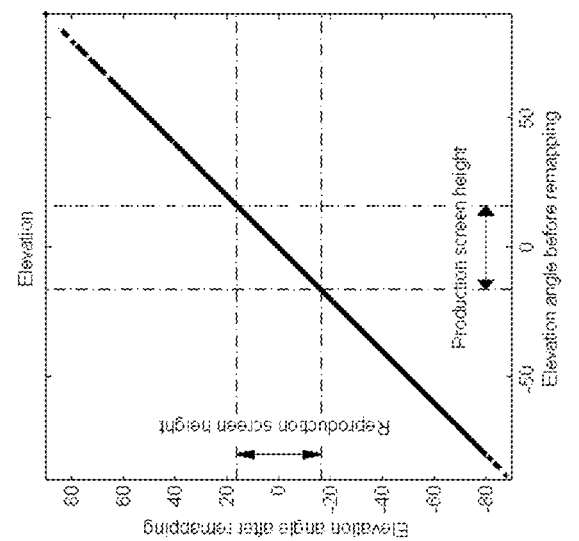
FIG. 14B show an examples mapping function that may be used to map original elevation angles to modified elevation angles based on a reference screen size and a viewing window size.
Figure 14A:
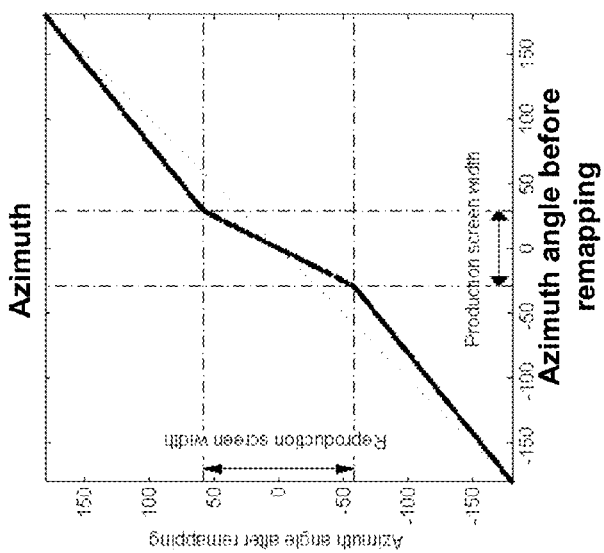
FIG. 14A show an example mapping function that may be used to map original azimuth angles to modified azimuth angles based on a reference screen size and a viewing window size.

A third example of the screen-based adaptation techniques of this disclosure will now be described with references to FIGS. 14-15. FIG. 14A shows an example of a mapping function that may be used to map an azimuth angle for a reference screen to an azimuth angle for a viewing window. FIG. 14B shows an example of mapping function that may be used map an elevation angle for a reference screen to an elevation angle for a viewing window. In the example of FIGS. 14A and 14B, the angles of the reference screen are 29 to −29 degrees azimuth and 16.3 to −16.3 degrees elevation, and the angles of the viewing window are 58 to −58 degrees azimuth and 16.3 to −16.3 degrees elevation. Thus, in the example of FIGS. 14A and 14B, the viewing window is twice as wide as the reference screen but with the same height as the reference screen. FIG. 14C shows a computed HOA effect matrix for the third example.

Figure 15:
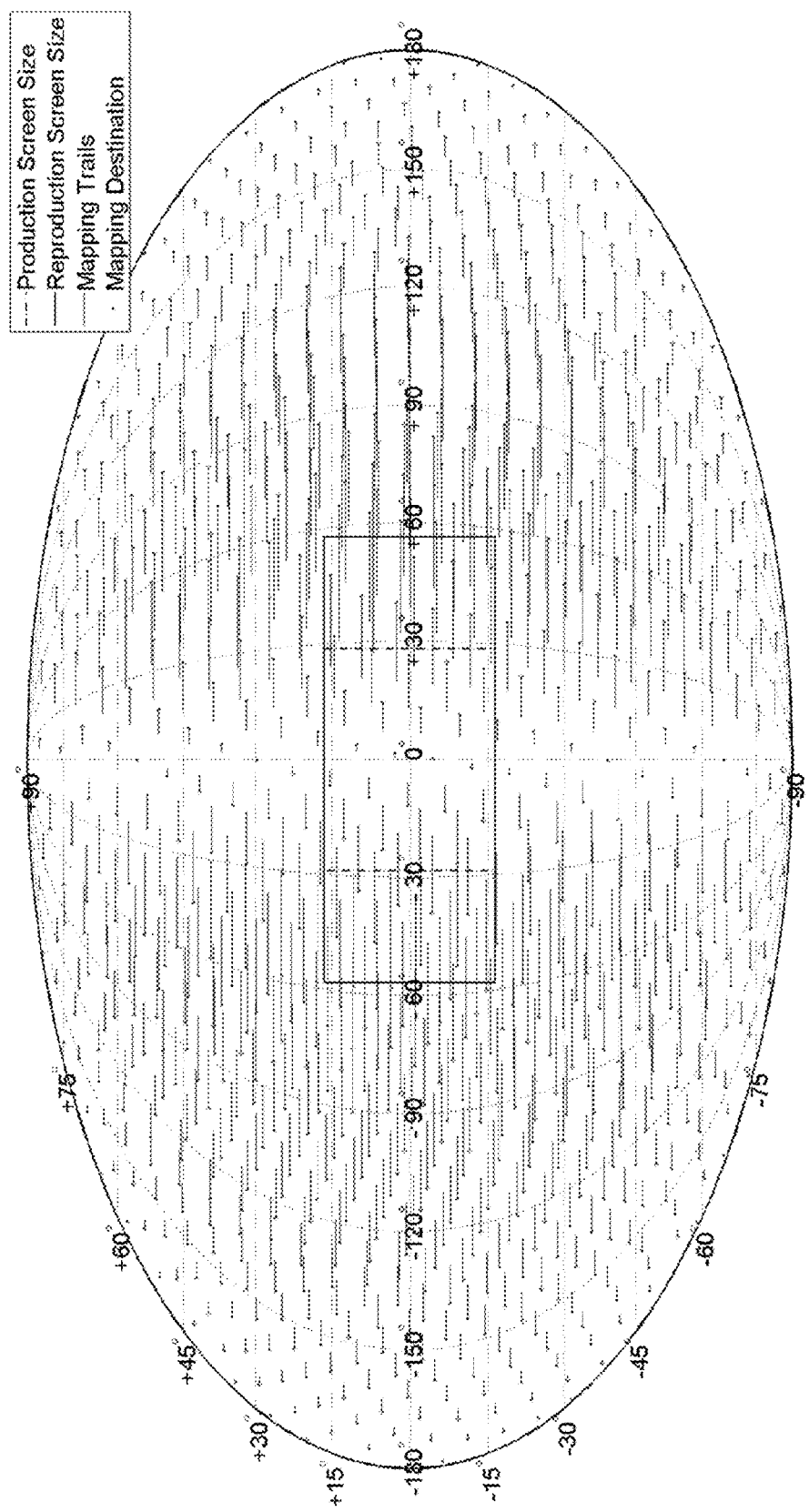
FIG. 15 shows a vector field for a desired screen-related expansion effect of the sound field as an effect of reference screen and viewing window.

FIG. 15 shows a vector field for a desired screen-related expansion effect of the sound field as an effect of reference screen and viewing window for the third example. In FIG. 15, the dots correspond to a mapping destination, while the lines going into the dots correspond mapping trails. The dashed-lined rectangle corresponds to a reference screen size, and the solid-lined rectangle corresponds to a viewing window size.

Figure 16C:
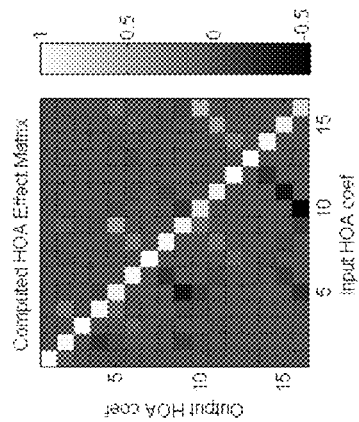
FIG. 16C shows a computed HOA effect matrix.
Figure 16B:
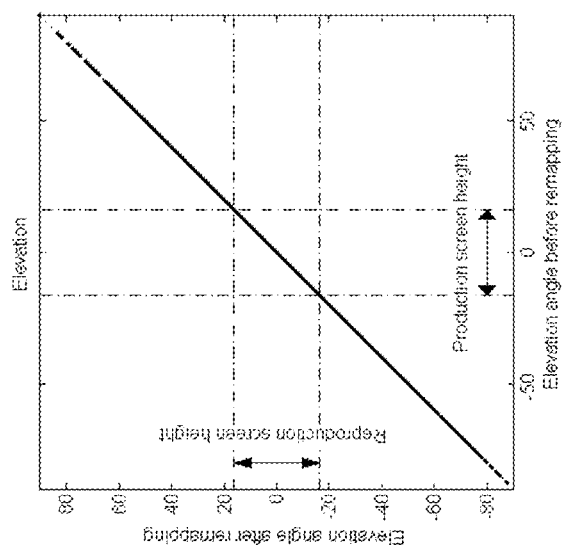
FIG. 16B show an examples mapping function that may be used to map original elevation angles to modified elevation angles based on a reference screen size and a viewing window size.
Figure 16A:
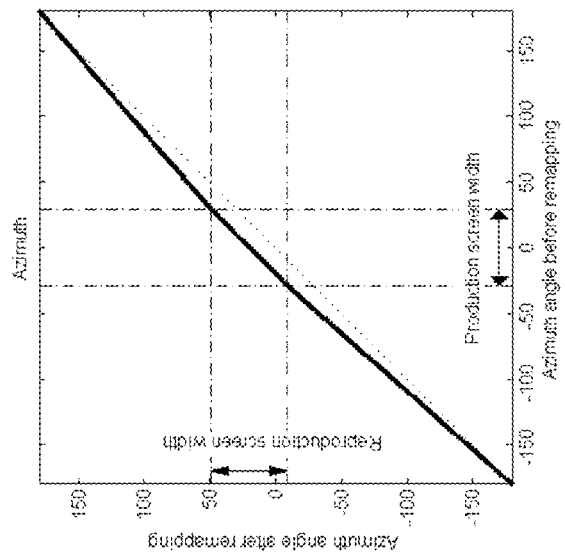
FIG. 16A show an example mapping function that may be used to map original azimuth angles to modified azimuth angles based on a reference screen size and a viewing window size.

A fourth example of the screen-based adaptation techniques of this disclosure will now be described with references to FIGS. 16-17. FIG. 16A shows an example of a mapping function that may be used map an azimuth angle for a reference screen to an azimuth angle for a viewing window. FIG. 16B shows an example of mapping function that may be used map an elevation angle for a reference screen to an elevation angle for a viewing window. In the example of FIGS. 16A and 16B, the angles of the reference screen are 29 to −29 degrees azimuth and 16.3 to −16.3 degrees elevation, and the angles of the viewing window are 49 to −9 degrees azimuth and 16.3 to −16.3 degrees elevation. Thus, in the example of FIGS. 14A and 14B, the viewing window is twice as wide as the reference screen but with the same height as the reference screen. FIG. 16C shows a computed HOA effect matrix for the third example.

Figure 17:
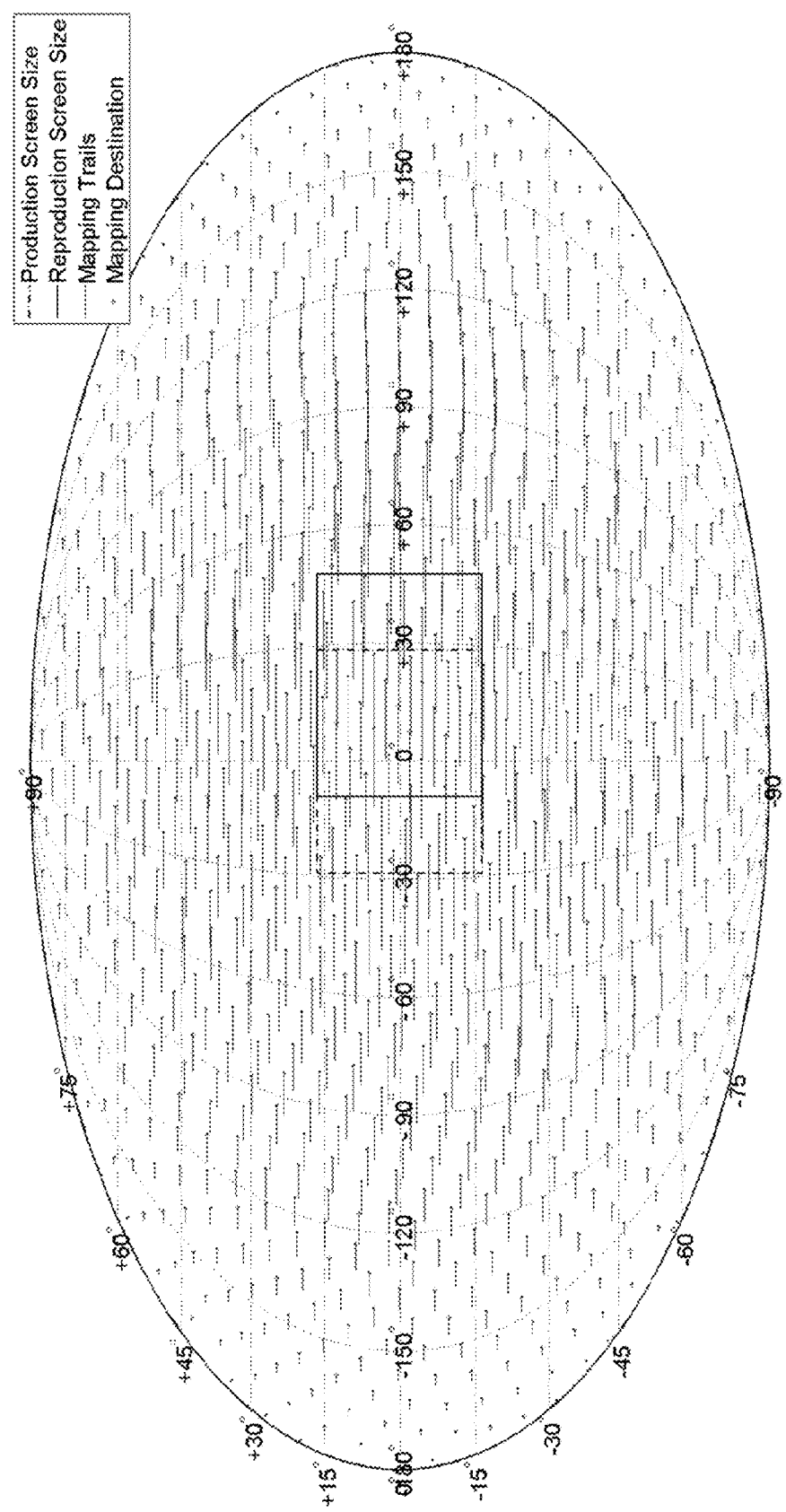
FIG. 17 shows a vector field for a desired screen-related expansion effect of the sound field as an effect of reference screen and viewing window.

FIG. 17 shows a vector field for a desired screen-related expansion effect of the sound field as an effect of reference screen and viewing window for the fourth example. In FIG. 17, the dots correspond to a mapping destination, while the lines going into the dots correspond mapping trails. The dashed-lined rectangle corresponds to a reference screen size, and the solid-lined rectangle corresponds to a viewing window size.

Figure 18C:
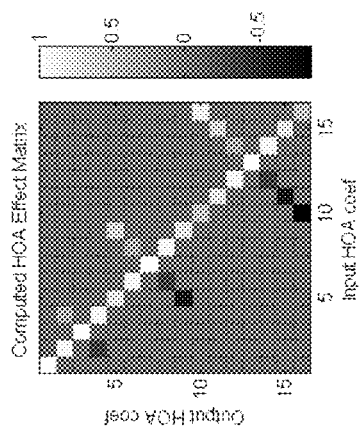
FIG. 18C shows a computed HOA effect matrix.
Figure 18B:
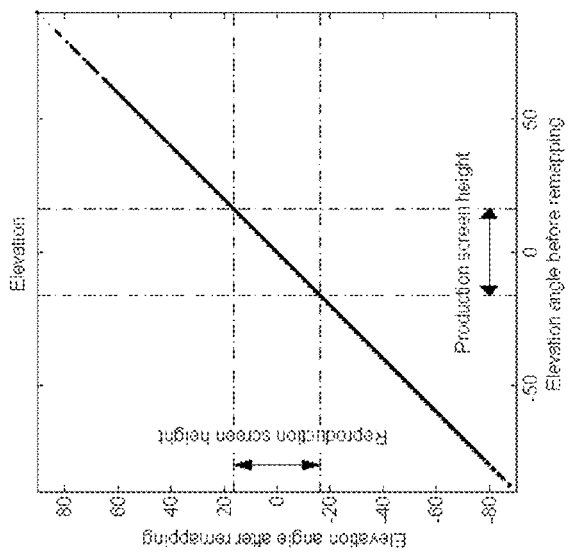
FIG. 18B show an examples mapping function that may be used to map original elevation angles to modified elevation angles based on a reference screen size and a viewing window size.
Figure 18A:
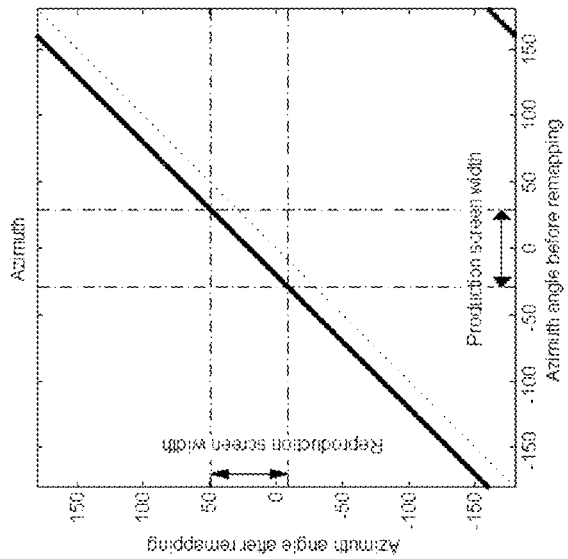
FIG. 18A show an example mapping function that may be used to map original azimuth angles to modified azimuth angles based on a reference screen size and a viewing window size.

A fifth example of the screen-based adaptation techniques of this disclosure will now be described with references to FIGS. 18-19. FIG. 18A shows an example of a mapping function that may be used map an azimuth angle for a reference screen to an azimuth angle for a viewing window. FIG. 18B shows an example of mapping function that may be used map an elevation angle for a reference screen to an elevation angle for a viewing window. In the example of FIGS. 18A and 18B, the angles of the reference screen are 29 to −29 degrees azimuth and 16.3 to −16.3 degrees elevation, and the angles of the viewing window are 49 to −9 degrees azimuth and 16.3 to −16.3 degrees elevation. Thus, in the example of FIGS. 18A and 18B, the viewing window is shifted in the azimuth location relative to the reference screen. FIG. 18C shows a computed HOA effect matrix for the fifth example.

Figure 19:
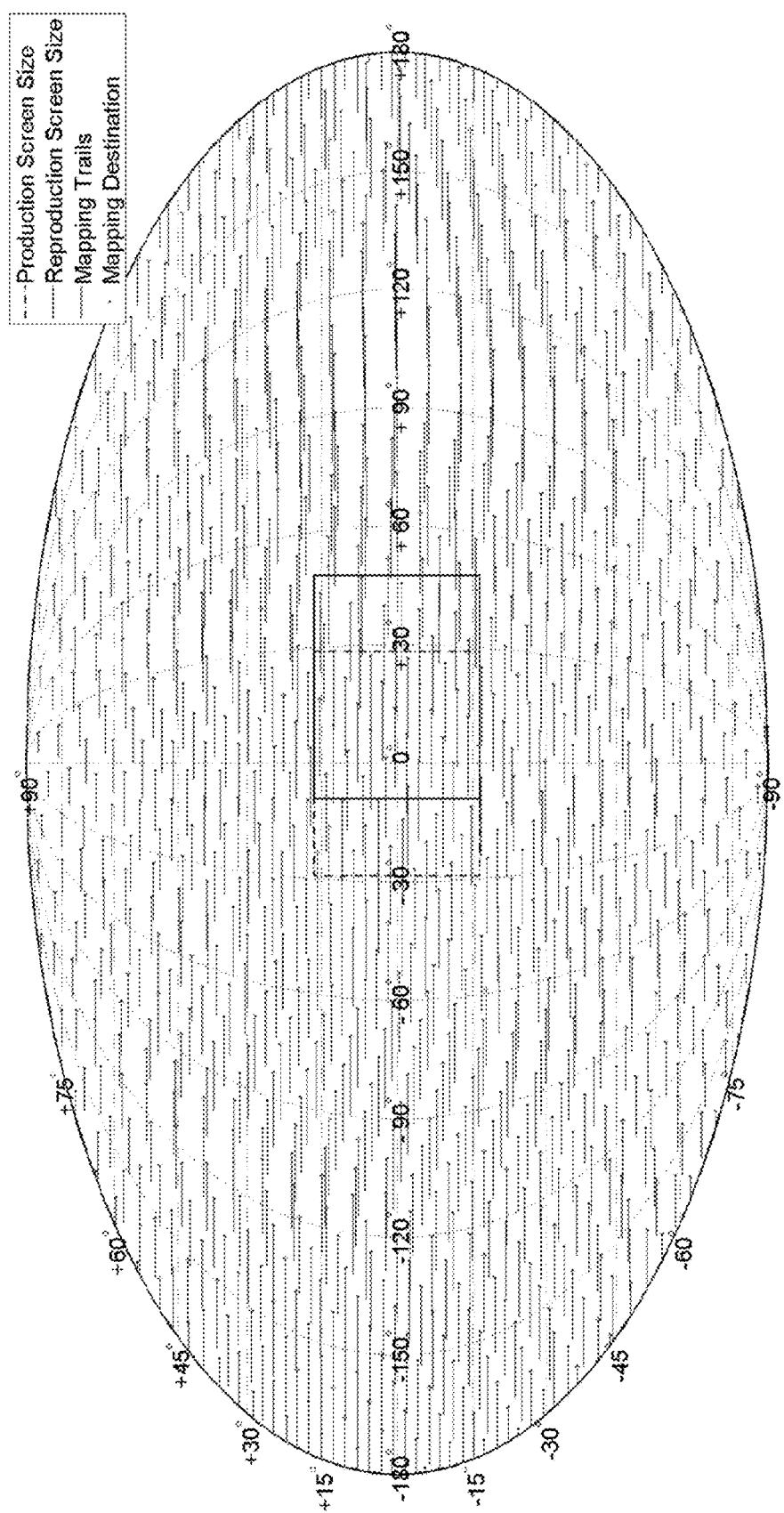
FIG. 19 shows a vector field for a desired screen-related expansion effect of the sound field as an effect of reference screen and viewing window.

FIG. 19 shows a vector field for a desired screen-related expansion effect of the sound field as an effect of reference screen and viewing window for the fourth example. In FIG. 19, the dots correspond to a mapping destination, while the lines going into the dots correspond mapping trails. The dashed-lined rectangle corresponds to a reference screen size, and the solid-lined rectangle corresponds to a viewing window size.

FIGS. 20A-20F are block diagrams illustrating another example of an audio decoding device 900 that may implement various aspects of the techniques for screen-based adaptation of audio described in this disclosure. For simplicity, not all aspects of audio decoding device 900 are shown in FIGS. 20A-20F. It is contemplated that the features and functions of audio decoding device 900 may be implemented in conjunction with the features and functions of other audio decoding devices described in this disclosure, such as audio decoding device 24 described above with respect to FIGS. 2 and 4.

Audio decoding device 900 includes USAC decoder 902, HOA decoder 904, local rendering matrix generator 906, signaled/local rendering matrix decider 908, and loudspeaker renderer 910. Audio decoding device 900 receives an encoded bitstream (e.g. an MPEG-H 3D audio bitstream).

USAC decoder 902 and HOA decoder 904 decode the bitstream using the USAC and HOA audio decoding techniques described above. Local rendering matrix generator 906 generates one or more rendering matrices based at least in part on the local loudspeaker configuration of the system which will be playing back the decoded audio. The bitstream may also include one or more rendering matrices which may be decoded from the encoded bitstream. Local/Signaled Rendering matrix decider 908 determines which of the locally generated or signaled rendering matrices to use when playing back the audio data. Loudspeaker renderer 910 outputs audio to one or more speakers based on the chosen rendering matrix.

Figure 20A:
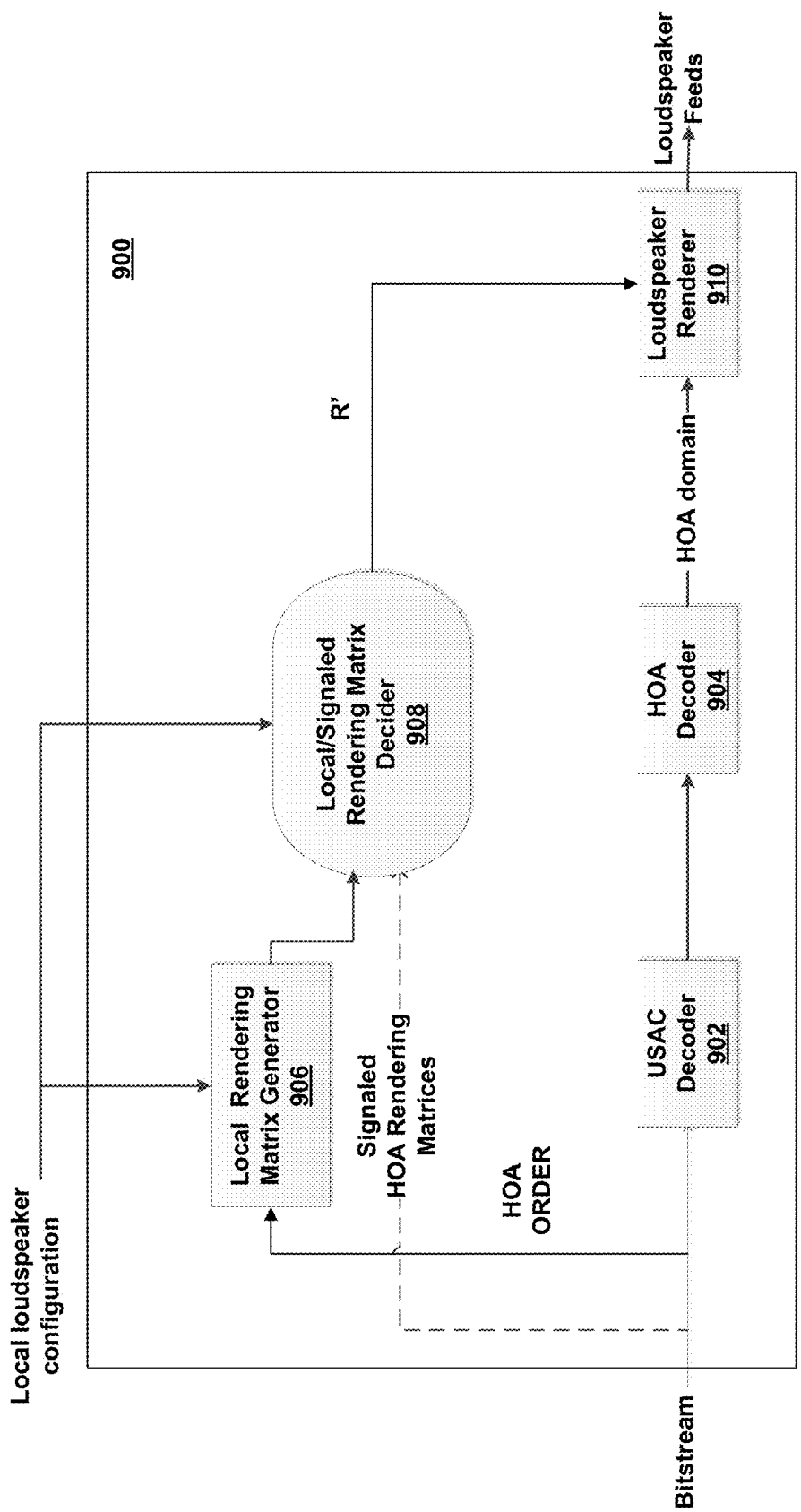
FIGS. 20A-20F are block diagrams illustrating example implementations of audio rendering devices configured to implement the techniques of this disclosure.
Figure 20B:
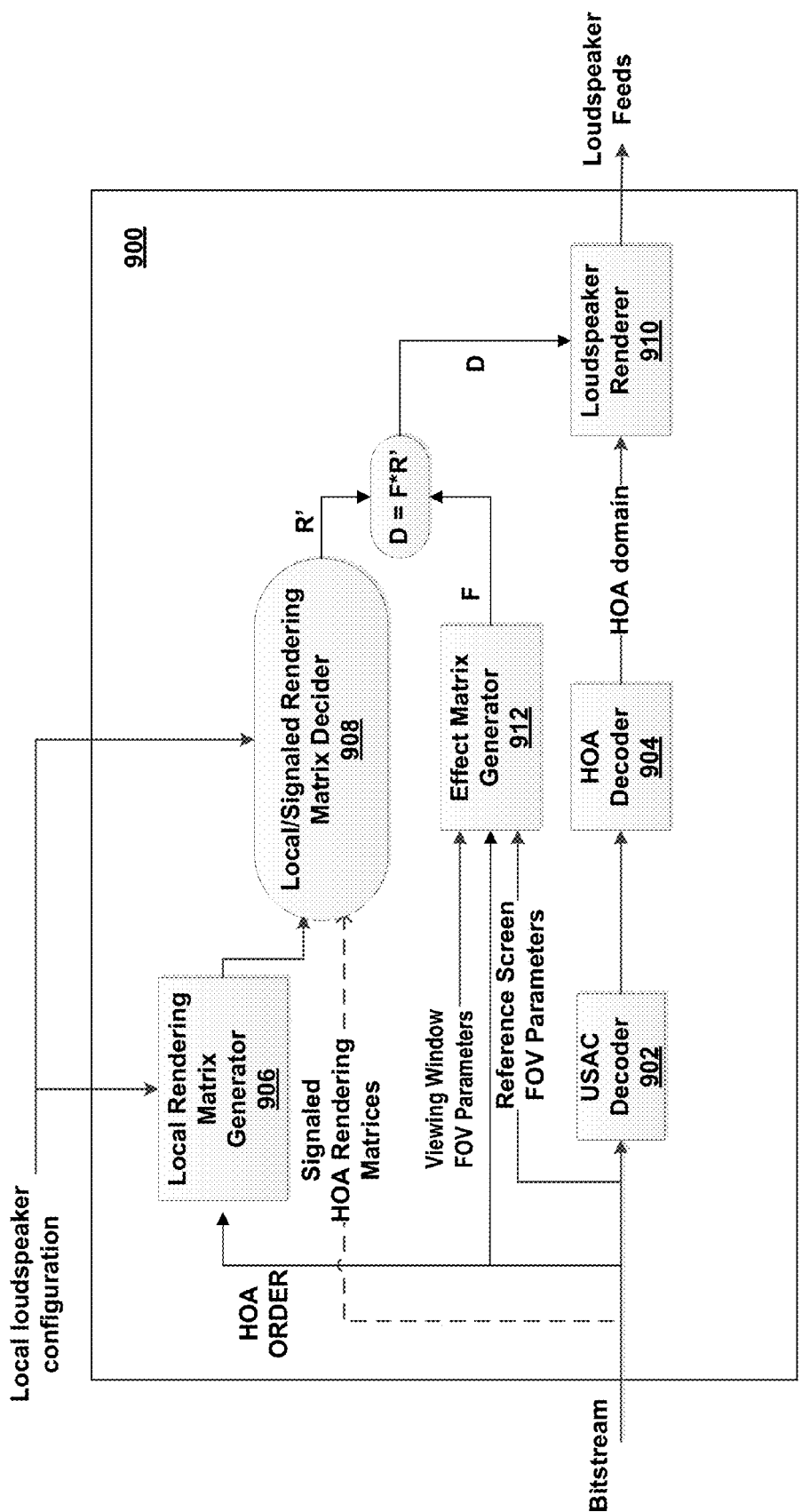

FIG. 20B is a block diagram illustrating another example of audio decoding device 900. In the example of FIG. 20B, audio decoding device 900 further includes effect matrix generator 912. Effect matrix generator 912 may determine from the bitstream a reference screen size and determine, based on the system being used to display corresponding video data, a viewing window size. Based on the reference screen size and the viewing window size, effect matrix generator 912 may generate an effect matrix (F) for modifying the rendering matrix (R') selected by local/signaled rendering matrix decider 908. In the example of FIG. 20B, loudspeaker renderer 910 may output audio to the one or more speakers based on the modified rendering matrix (D). In the example, of FIG. 20C, audio decoding device 900 may be configured to only render the effect if in HOADecoderConfig( ) the flag isScreenRelative flag==1.

According to the techniques of this disclosure effect matrix generator 912 may also generate an effect matrix in response to screen rotation. Effect matrix generator 912 may, for example, generate an effect matrix according to the following algorithm. An example algorithm for the new mapping function, in pseudocode, is:

%1. compute relative screen mapping parameter
originalWidth=originalAngles.azi(1)−originalAngles.azi(2);
original Height=original Angles.ele(1)−originalAngles.ele(2);
newWidth=newAngles.azi(1)−newAngles.azi(2);
newHeight=newAngles.ele(1)−newAngles.ele(2);
%2. find center of reference screen and center of viewing window
originalCenter.azi=originalAngles.azi(1)−originalWidth*0.5;
originalCenter.ele=originalAngles.ele(1)−originalHeight*0.5;
newCenter.azi=newAngles.azi(1)−newWidth*0.5;
newCenter.ele=newAngles.ele(1)−newHeight*0.5;
%3. do relative screen related mapping
heightRatio=newHeight/originalHeight;
widthRatio=newWidth/originalWidth;
Mapping of equally distributed spatial positions using MPEG-H screen related mapping function using heightRatio and widthRatio, rather than the absolute positions of production and viewing window.
%4. rotate soundfield
rotating the spatial position processed in (3.) from originalCenter to newCenter.
%5. computing HOA effect matrix
using original spatial positions and processed spatial positions (from 4.)

According to the techniques of this disclosure effect matrix generator 912 may also generate an effect matrix in response to screen rotation. Effect matrix generator 912 may, for example, generate an effect matrix according to the following algorithm.

1. Compute relative screen mapping parameter:
widthRatio=localWidth/productionWidth;
heightRatio=localHeight/productionHeight;
with:
productionWidth=production_Azi_L−production_Azi_R;
productionHeight=production_Ele_Top−production_Ele_Down;
local Width=local_Azi_L−local_Azi_R;
localHeight=local_Ele_Top−local_Ele_Down;

2. Compute center coordinates of normative production screen and center of local reproduction screen:
productionCenter_Azi=production_Azi_L−productioWidth/2;
productionCenter_Ele=production_Ele_Top−productionHeight/2;
localCenter_Azi=local_Azi_L−localWidth/2;
localCenter_Ele=local_Ele_Top−localHeight/2;

3. Screen-related mapping:
Mapping of $\Omega^{900}$ with screen-related mapping function using heightRatio and widthRatio to $\Omega_m^{900}$.

4. Rotate positions:
Rotating the spatial position $\Omega_M^{900}$ from productionCenter coordinate to localCenter coordinate, using rotation kernel R, resulting in $\Omega_{mr}^{900}$ $$R(\theta, \phi) = \begin{bmatrix} \cos\theta & 0 & \sin\theta \\ 0 & 1 & 0 \\ -\sin\theta & 0 & \cos\theta \end{bmatrix} \begin{bmatrix} \cos\phi & -\sin\phi & 0 \\ \sin\phi & \cos\phi & 0 \\ 0 & 0 & 1 \end{bmatrix}. \quad (3)$$

y-axis rotation (pitch) z-axis rotation (yaw)

5. Computing HOA effect matrix:

$$F=\text{pinv}(\Psi^{900T})\Psi_{mr}^{900T}. \quad (4)$$

with $\Psi_{mr}^{900}$ being the mode matrix created from $\Omega_{mr}^{900}$.

Figure 20C:
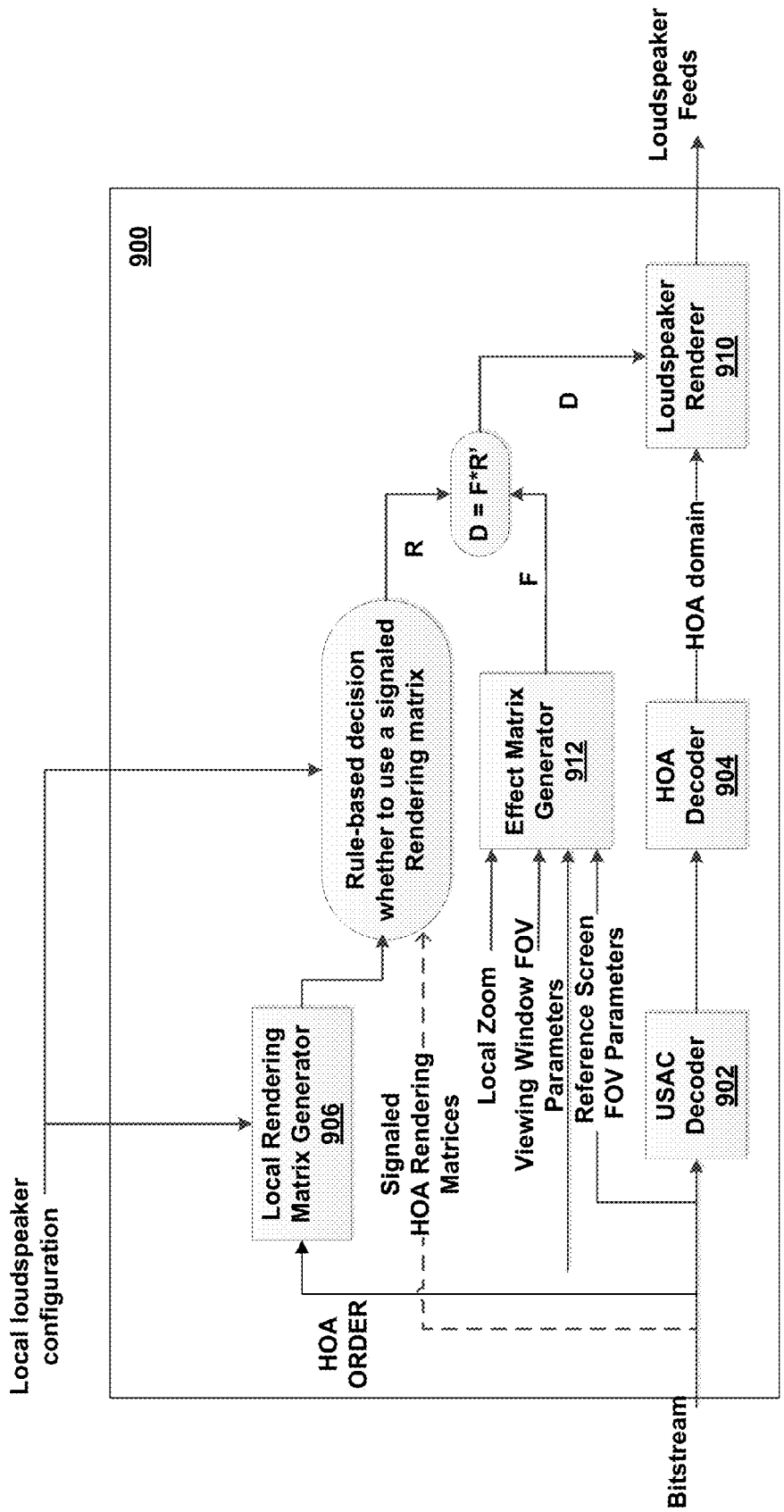

FIG. 20C is a block diagram illustrating another example of audio decoding device 900. In the example of FIG. 20C, audio decoding device 900 generally operates in the same manner described above for the example of FIG. 20B, but in the example of FIG. 20C, effect matrix generator 912 is further configured to determine a scaling factor for a zoom operation, and based on the scaling information, the reference screen size, and the viewing window size, generate an effect matrix (F) for modifying the rendering matrix (R') selected by local/signaled rendering matrix decider 908. In the example of FIG. 20C, loudspeaker renderer 910 may output audio to the one or more speakers based on the modified rendering matrix (D). In the example, of FIG. 20C, audio decoding device 900 may be configured to only render the effect if in HOADecoderConfig( ) the flag isScreenRelativeHOA flag==1.

The flag isScreenRelativeHOA in the HOADecoderConfig( ) syntax table (shown below as Table 1) is sufficient to enable the adaptation of screen-related HOA content to the reproduction window size (which may also be referred to as a "reproduction screen size"). Information on the nominal production screen may be signaled separately as part of a metadata audio element.

TABLE 1

Syntax of HOADecoderConfig( ), Table 120 in DIS 23008

| Syntax | No. of bits | Mnemonic |
|---|---|---|
| HOADecoderConfig(numHOATransportChannels) | | |
| { | | |
|   MinAmbHoaOrder = escapedValue(3,5,0) − 1; | 3, 8 | uimsbf |
|   isScreenRelativeHOA; | 1 | uimsbf |
|   MaxNoOfDirSigsForPrediction = | 2 | uimsbf |
|   MaxNoOfDirSigsForPrediction + 1; | | |
|   NoOfBitsPerScalefactor = | 4 | uimsbf |
|   NoOfBitsPerScalefactor + 1; | | |
|   CodedSpatialInterpolationTime; | 3 | uimsbf |
|   SpatialInterpolationMethod; | 1 | bslbf |
|   CodedVVecLength; | 2 | uimsbf |
|   MaxGainCorrAmpExp; | 3 | uimsbf |
|   } | | |
| } | | |

NOTE:
MinAmbHoaOrder = 30 . . . 37 are reserved.

Figure 20D:
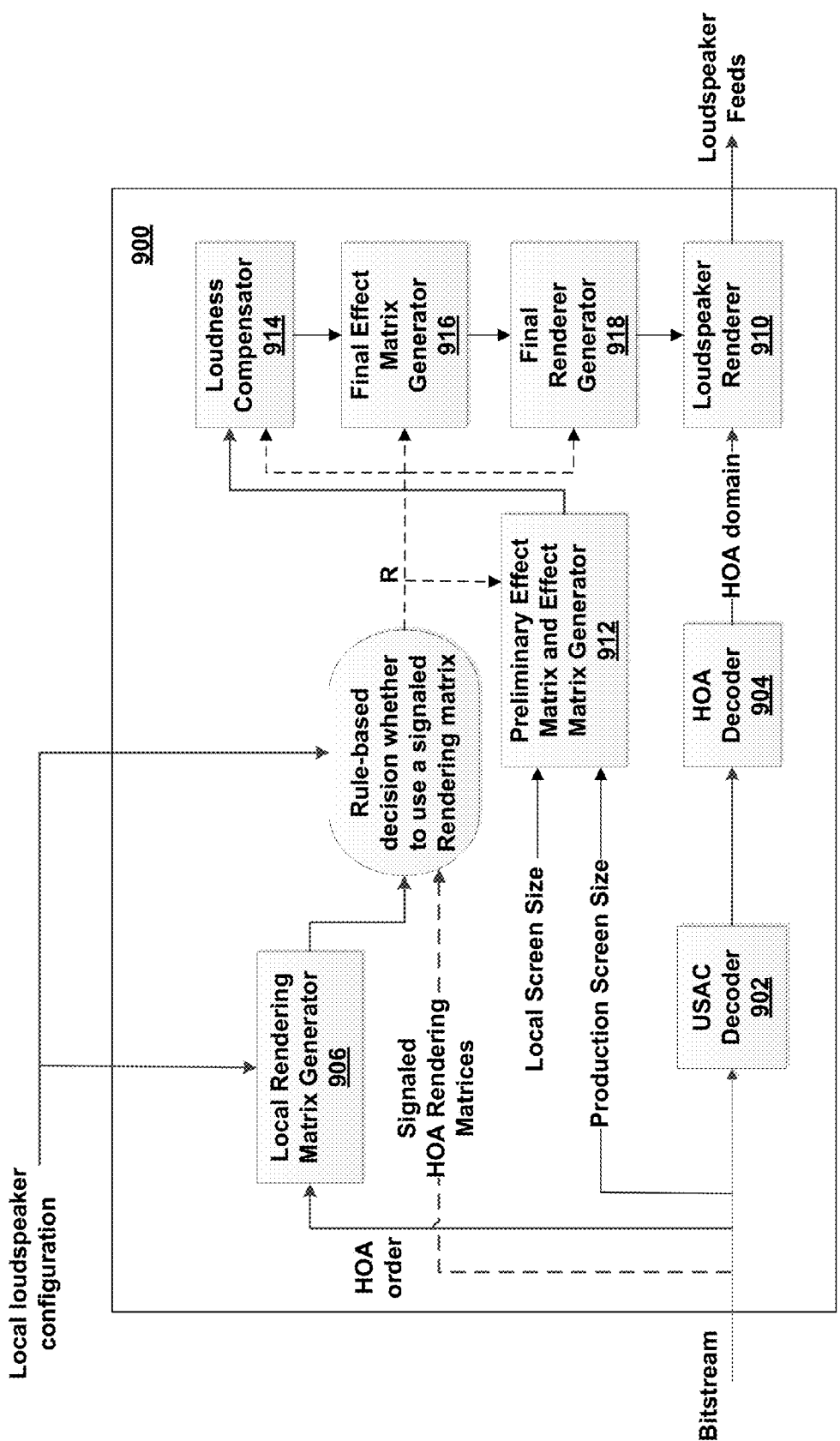

FIG. 20D is a block diagram illustrating another example of audio decoding device 900. In the example of FIG. 20D, audio decoding device 900 further includes loudness compensator 914, final effect matrix generator 916, and final renderer generator 918. Loudness compensator 914 performs loudness compensation as described above. Loudness compensator 914, for example, performs loudness compensation for each spatial direction l applied for the final matrix F, as described above. Final Effect Matrix generator 916 generates the final effect matrix as described above. Final renderer generator 918 creates the final rendering matrix, for example, by performing the D=FRY computation described above.

Figure 20E:
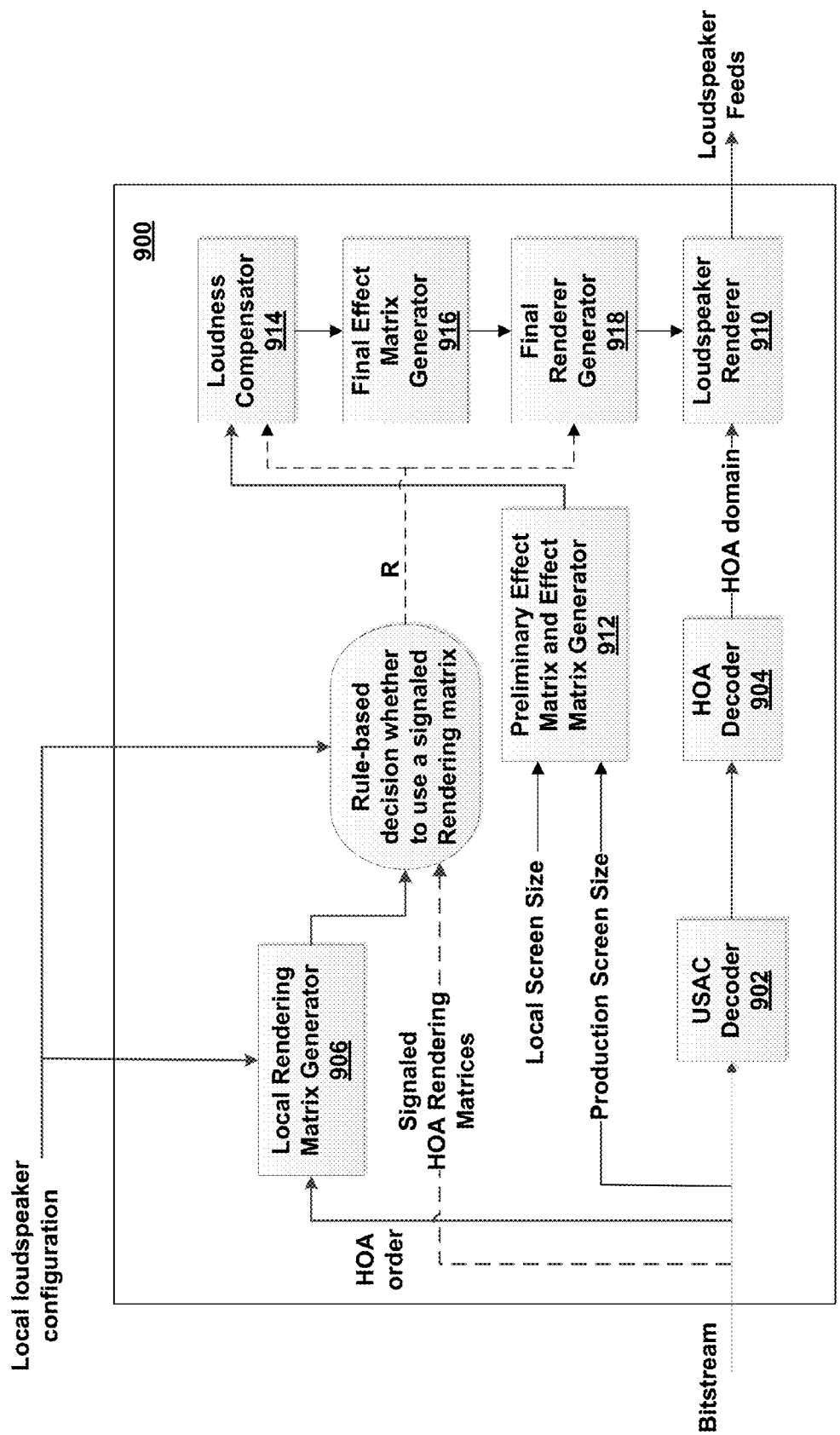

FIG. 20E is a block diagram illustrating another example of audio decoding device 900. In the example of FIG. 20E, the preliminary effect matrix and effect matrix generator 912 may not use the original rendering matrix R as an input in generating the preliminary effect matrix F.

Figure 20F:
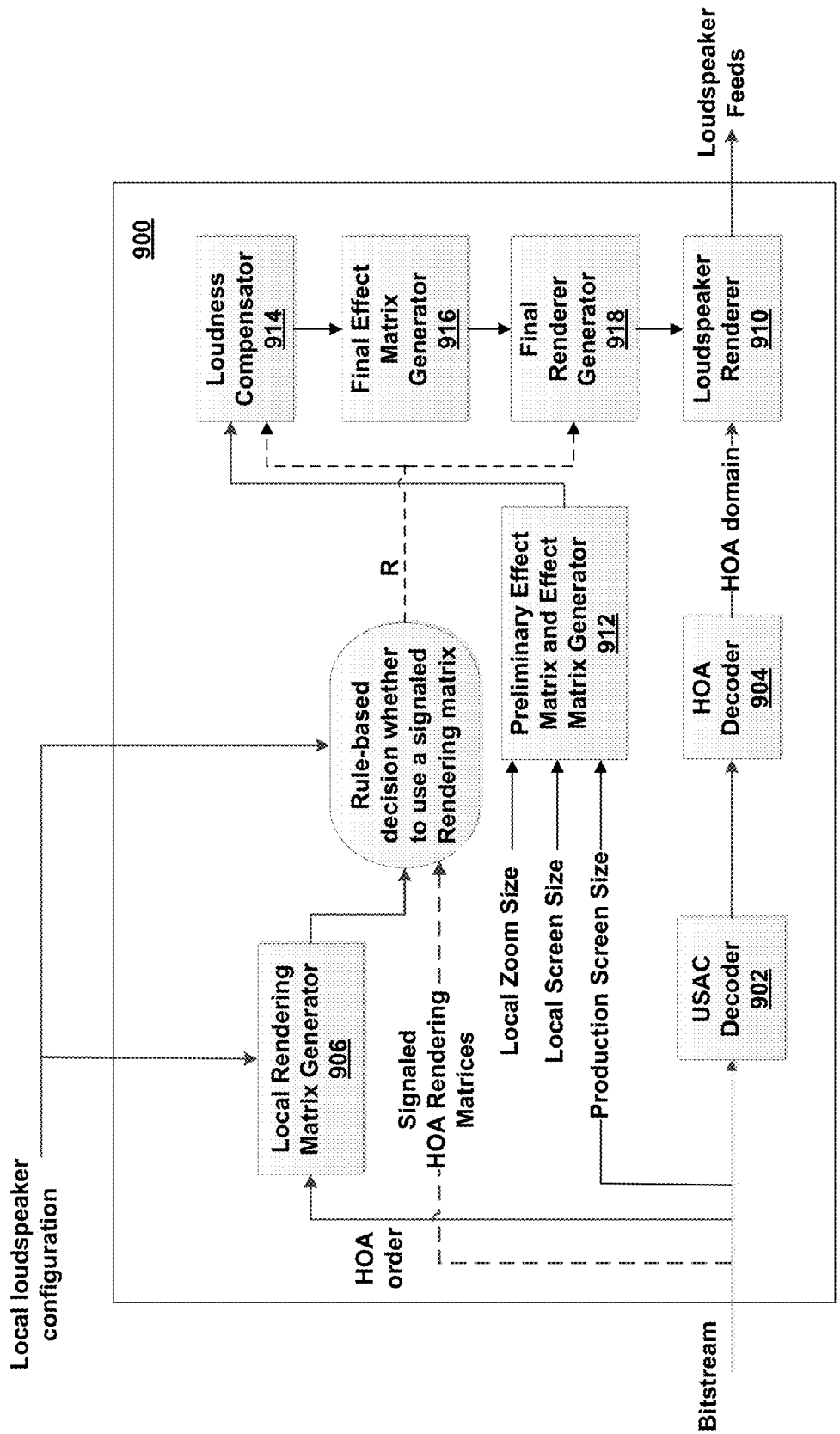

FIG. 20F is a block diagram illustrating another example of audio decoding device 900. In the example of FIG. 20F, the preliminary effect matrix and effect matrix generator 912 may use a local zoom size as an additional parameter in generating the mode matrix. In some examples, the preliminary effect matrix and effect matrix generator 912 use the local zoom size of a zoomed window (e.g., a window that is zoomed-in or zoomed-out in comparison to a reference window) as a parameter in generating the mode matrix. For instance, the preliminary effect matrix and effect matrix generator 912 may detect a user-initiated zoom command, such as by processing data received from other components of the audio decoding device 24. In turn, the preliminary effect matrix and effect matrix generator 912 may obtain FOV parameters (e.g., one or more of modified azimuth and/or modified elevation angle information) based on parameters of the particular zooming operation that exhibits zooming characteristics provided by way of the user-initiated zoom command. The preliminary effect matrix and effect matrix generator 912 may incorporate the FOV parameters corresponding to the zooming operation in generating the mode matrix. As such, FIG. 20F illustrates an example implementation of the audio decoding device 900 that is configured to perform the dynamic zoom adaptation techniques described above.

An audio playback system of the present disclosure, such as audio playback system 16, may be configured to generate a preliminary effect matrix based on a rendering matrix and render the HOA audio signal based on the preliminary effect matrix. Audio playback system 16 may, for example, be configured to determine the rendering matrix based on a speaker configuration. Audio playback system 16 may generate a final rendering matrix based on the preliminary effect matrix and render the HOA audio signal based on the preliminary effect matrix. Audio playback system 16 may, for example, generate the preliminary effect matrix based on one or more field of view (FOV) parameters of a reference screen and one or more FOV parameters of a viewing window. To generate the preliminary effect matrix, audio playback system 16 may be configured to perform a mapping of spatial directions in response to a screen related adaptation and compute the preliminary effect matrix based on HOA coefficients associated with the spatial directions. In such examples, the preliminary effect matrix may be a locally generated preliminary effect matrix. Audio playback system 16 may be further configured to compensate for loudness for a plurality of spatial directions based on the rendering matrix.

An audio playback system of the present disclosure, such as audio playback system 16, may additionally or alternatively be configured to perform a loudness compensation process as part of generating an effect matrix and render the HOA audio signal based on the effect matrix. To perform the loudness compensation process, audio playback system 16 may compensate for loudness for a plurality of spatial directions based on a rendering matrix. To perform the loudness compensation process, audio playback system 16 may compensate for loudness for a plurality of spatial directions based on a rendering matrix. To perform the loudness compensation process, audio playback system 16 may be configured to compensate for loudness for a plurality of spatial directions based on a mapping function. To perform the loudness compensation process, audio playback system 16 may be configured to determine a minimum error between a plurality of original sound locations and a plurality of corresponding mapped destinations (e.g. the mapping destinations in FIGS. 15-19). To perform the loudness compensation process, audio playback system 16 may be configured to determine an energy normalization between a plurality of original sound locations and a plurality of corresponding mapped destinations.

An audio playback system of the present disclosure, such as audio playback system 16, may be configured to render an HOA audio signal by rendering the HOA audio signal over one or more speakers (e.g. speakers 3) based on one or more FOV parameters of a reference screen (e.g. FOV parameters 13') and one or more FOV parameters of a viewing window. The rendering may, for example, be further based on a scaling factor obtained in response to a user initiated zoom operation. In some examples, the one or more FOV parameters for the reference screen may include a location of a center of the reference screen and a location of a center of the viewing window.

Audio playback system 16 may, for example, receive a bitstream of encoded audio data comprising the HOA audio signal. The encoded audio data may be associated with corresponding video data. Audio playback system 16 may obtain from the bitstream the one or more FOV parameters (e.g. FOV parameters 13') of the reference screen for the corresponding video data.

Audio playback system 16 may also obtain the one or more FOV parameters of the viewing window for displaying the corresponding video data. The FOV parameters of the viewing window may be determined locally based on any combination of user input, automated measurements, default values, or the like.

Audio playback system 16 may determine a renderer, from audio renderers 22, for the encoded audio data, based on the one or more FOV parameters of the viewing window and the one or more FOV parameters of the reference screen, modify one of audio renderers 22, and based on the modified renderer and the encoded audio data, render the HOA audio signal over the one or more speakers. Audio playback system 16 may modify one of audio renderers 22 further based on the scaling factor when a zoom operation is performed.

Audio playback system 16 may, for example, determine the renderer for the encoded audio data based on a speaker configuration, including but not necessarily limited to a spatial geometry of one or more speakers and/or a number of speakers available for playback.

Audio renders 22 may, for example, include an algorithm for converting the encoded audio data to a reproduction format and/or utilize a rendering format. The rendering format may, for example, include any of a matrix, a ray, a line, or a vector. Audio renderers 22 may be signaled in the bitstream or determined based on a playback environment.

The one or more FOV parameters for the reference screen may include one or more azimuth angles for the reference screen. The one or more azimuth angles for the reference screen may include a left azimuth angle for the reference screen and a right azimuth angle for the reference screen. The one or more FOV parameters for the reference screen may alternatively or additionally include one or more elevation angles for the reference screen. The one or more elevation angles for the reference screen may include an upper elevation angle for the reference screen and a lower elevation angle for the reference screen.

The one or more FOV parameters for the viewing window may include one or more azimuth angles for the viewing window. The one or more azimuth angles for the viewing window may include a left azimuth angle for the viewing window and a right azimuth angle for the viewing window. The one or more FOV parameters for the viewing window may include one or more azimuth angles for the viewing window. The one or more elevation angles for the viewing window may include an upper elevation angle for the viewing window and a lower elevation angle for the viewing window.

Audio playback system 16 may modify one or more of audio renderers 22 by determining an azimuth angle mapping function for modifying an azimuth angle of a speaker based on the one or more FOV parameters of the reference screen and the one or more FOV parameters of the viewing window and modifying an azimuth angle for a first speaker of the one or more speakers to generate a modified azimuth angle for the first speaker based on the azimuth angle mapping function.

The azimuth angle mapping function comprises:

$$\varphi' = \begin{cases} \dfrac{\varphi_{right}^{repro} + 180°}{\varphi_{right}^{nominal} + 180°} \cdot (\varphi + 180°) - 180° & \text{for } -180° \le \varphi < \varphi_{right}^{nominal} \\ \dfrac{\varphi_{left}^{repro} - \varphi_{right}^{repro}}{\varphi_{left}^{nominal} - \varphi_{right}^{nominal}} \cdot (\varphi - \varphi_{right}^{nominal}) + \varphi_{right}^{repro} & \text{for } \varphi_{right}^{nominal} \le \varphi < \varphi_{left}^{nominal} \\ \dfrac{180° - \varphi_{left}^{repro}}{180° - \varphi_{left}^{nominal}} \cdot (\varphi - \varphi_{left}^{nominal}) + \varphi_{left}^{repro} & \text{for } \varphi_{left}^{nominal} \le \varphi < 180° \end{cases}$$

wherein $\varphi'$ represents the modified azimuth angle for the first speaker;

$\varphi$ represents the azimuth angle for the first speaker;

$\varphi_{left}^{nominal}$ represents a left azimuth angle of the reference screen;

$\varphi_{right}^{nominal}$ represents a right azimuth angle of the reference screen;

$\varphi_{left}^{repro}$ represents a left azimuth angle of the viewing window; and, $\varphi_{right}^{repro}$ represents a right azimuth angle of the viewing window.

Audio playback system 16 may modify the renderer by determining an elevation angle mapping function for modifying an elevation angle of a speaker based on the one or more FOV parameters of the reference screen and the one or more FOV parameters of the viewing window and modifying an elevation angle for a first speaker of the one or more speakers based on the elevation angle mapping function.

The elevation angle mapping function comprises:

$$\theta' = \begin{cases} \dfrac{\theta_{bottom}^{repro} + 90°}{\theta_{bottom}^{nominal} + 90°} \cdot (\theta + 90°) - 90° & \text{for } -90° \le \theta < \theta_{bottom}^{nominal} \\ \dfrac{\theta_{top}^{repro} - \theta_{bottom}^{repro}}{\theta_{top}^{nominal} - \theta_{bottom}^{nominal}} \cdot (\theta - \theta_{bottom}^{nominal}) + \theta_{bottom}^{repro} & \text{for } \theta_{bottom}^{nominal} \le \theta < \theta_{top}^{nominal} \\ \dfrac{90° - \theta_{top}^{repro}}{90° - \theta_{top}^{nominal}} \cdot (\theta - \theta_{top}^{nominal}) + \theta_{top}^{repro} & \text{for } \theta_{top}^{nominal} \le \theta < 90° \end{cases}$$

wherein $\theta'$ represents the modified elevation angle for the first speaker;

$\theta$ represents the elevation angle for the first speaker;

$\theta_{top}^{nominal}$ represents a top elevation angle of the reference screen;

$\theta_{bottom}^{nominal}$ represents a bottom elevation angle of the reference screen;

$\theta_{top}^{repro}$ represents a top elevation angle of the viewing window; and, $\theta_{bottom}^{repro}$ represents a bottom elevation angle of the viewing window.

Audio playback system 16 may modify the renderer in response to a user initiated zoom function at the viewing window. For example, in response to a user initiated zoom function, Audio playback system 16 may determine one or more FOV parameters of a zoomed viewing window and, based on the one or more FOV parameters of the reference screen and the one or more FOV parameters of the zoomed viewing window, modify the renderer. Audio playback system 16 may also modify the renderer by determining one or more FOV parameters of a zoomed viewing window based on the scaling factor and the one or more FOV parameters of the viewing window, determining an azimuth angle mapping function for modifying an angle, such as an azimuth angle of a speaker, based on the one or more FOV parameters of the zoomed viewing window and the one or more FOV parameters of the reference screen, and modifying an angle (e.g., an azimuth angle) for a first speaker of the one or more speakers to generate a modified angle (e.g., a modified azimuth angle) for the first speaker based on the azimuth angle mapping function.

The azimuth angle mapping function comprises:

$$\varphi' = \begin{cases} \dfrac{\varphi_{right}^{repro} + 180°}{\varphi_{right}^{nominal} + 180°} \cdot (\varphi + 180°) - 180° & \text{for } -180° \leq \varphi < \varphi_{right}^{nominal} \\ \dfrac{\varphi_{left}^{repro} - \varphi_{right}^{repro}}{\varphi_{left}^{nominal} - \varphi_{right}^{nominal}} \cdot (\varphi - \varphi_{right}^{nominal}) + \varphi_{right}^{repro} & \text{for } \varphi_{right}^{nominal} \leq \varphi < \varphi_{left}^{nominal} \\ \dfrac{180° - \varphi_{left}^{repro}}{180° - \varphi_{left}^{nominal}} \cdot (\varphi - \varphi_{left}^{nominal}) + \varphi_{left}^{repro} & \text{for } \varphi_{left}^{nominal} \leq \varphi < 180° \end{cases}$$

wherein $\varphi'$ represents the modified azimuth angle for the first speaker;

$\varphi$ represents the azimuth angle for the first speaker;

$\varphi_{left}^{nominal}$ represents a left azimuth angle of the reference screen;

$\varphi_{right}^{nominal}$ represents a right azimuth angle of the reference screen;

$\varphi_{left}^{repro}$ represents a left azimuth angle of the zoomed viewing window; and, $\varphi_{right}^{repro}$ represents a right azimuth angle of the zoomed viewing window.

Audio playback system 16 may modify the renderer by determining one or more FOV parameters of a zoomed viewing window based on the scaling factor and the one or more FOV parameters of the viewing window, determining an elevation angle mapping function for modifying an elevation angle of a speaker based on the one or more FOV parameters of the zoomed viewing window and the one or more FOV parameters of the reference screen, and modifying an elevation angle for a first speaker of the one or more speakers to generate a modified elevation angle for the first speaker based on the elevation angle mapping function.

The elevation angle mapping function comprises:

$$\theta' = \begin{cases} \dfrac{\theta_{bottom}^{repro} + 90°}{\theta_{bottom}^{nominal} + 90°} \cdot (\theta + 90°) - 90° & \text{for } -90° \leq \theta < \theta_{bottom}^{nominal} \\ \dfrac{\theta_{top}^{repro} - \theta_{bottom}^{repro}}{\theta_{top}^{nominal} - \theta_{bottom}^{nominal}} \cdot (\theta - \theta_{bottom}^{nominal}) + \theta_{bottom}^{repro} & \text{for } \theta_{bottom}^{nominal} \leq \theta < \theta_{top}^{nominal} \\ \dfrac{90° - \theta_{top}^{repro}}{90° - \theta_{top}^{nominal}} \cdot (\theta - \theta_{top}^{nominal}) + \theta_{top}^{repro} & \text{for } \theta_{top}^{nominal} \leq \theta < 90° \end{cases}$$

wherein $\theta'$ represents the modified elevation angle for the first speaker;

$\theta$ represents the elevation angle for the first speaker;

$\theta_{top}^{nominal}$ represents a top elevation angle of the reference screen;

$\theta_{bottom}^{nominal}$ represents a bottom elevation angle of the reference screen;

$\theta_{top}^{repro}$ represents a top elevation angle of the zoomed viewing window; and, $\theta_{bottom}^{repro}$ represents a bottom elevation angle of the zoomed viewing window.

Audio playback system 16 may determine the one or more FOV parameters of the zoomed viewing window by determining one or more azimuth angles for the zoomed viewing window based on one or more azimuth angles for the viewing window and the scaling factor. Audio playback system 16 may determine the one or more FOV parameters of the zoomed viewing window by determining one or more elevation angles for the zoomed viewing window based on one or more elevation angles for the viewing window and the scaling factor. Audio playback system 16 may determine the center of the reference screen based on the one or more FOV parameters of the reference screen and determine the center of the viewing window based on the one or more FOV parameters of the viewing window.

Audio playback system 16 may be configured to determine a renderer for the encoded audio data, modify the renderer based on the center of the viewing window and the center of the reference screen, and render the HOA audio signal over the one or more speakers based on the modified renderer and the encoded audio data.

Audio playback system 16 may determine the center of the viewing window according to the following algorithm:
originalWidth=originalAngles.azi(1)−originalAngles.azi(2);
originalHeight=originalAngles.ele(1)−originalAngles.ele(2);
newWidth=newAngles.azi(1)−newAngles.azi(2)
newHeight=newAngles.ele(1)−newAngles.ele(2);
originalCenter.azi=originalAngles.azi(1)−originalWidth*0.5;
originalCenter.ele=originalAngles.ele(1)−originalHeight*0.5;
newCenter.azi=newAngles.azi(1)−newWidth*0.5;
newCenter.ele=newAngles.ele(1)−newHeight*0.5,
wherein "originalWidth" represents a width of the reference screen; "originalHeight" represents a height of the reference screen; "originalAngles.azi(1)" represents a first azimuth angle of the reference screen: "originalAngles.azi(2)" represents a second azimuth angle of the reference screen; "originalAngles.ele(1)" represents a first elevation angle of the reference screen; "originalAngles.ele(2)" represents a second elevation angle of the reference screen; "newWidth" represents a width of the viewing window; "newHeight" represents a height of the viewing window; "newAngles.azi(1)" represents a first azimuth angle of the viewing window; "newAngles.azi(2)" represents a second azimuth angle of the viewing window; "newAngles.ele(1)" represents a first elevation angle of the viewing window; "newAngles.ele(2)" represents a second elevation angle of the viewing window; "originalCenter.azi" represents the azimuth angle of the center of the reference screen; "originalCenter.ele" represents the elevation angle of the center of the reference screen; "newCenter.azi" represents the azimuth angle of the center of the viewing window; "newCenter.ele" represents the elevation angle of the center of the viewing window.

Audio playback system 16 may rotate the sound field from the center of the reference screen to the center of the viewing window.

The HOA audio signal may be part of an MPEG-H 3D compliant bitstream. The viewing window may, for example, be a reproduction screen or a portion of a reproduction screen. The viewing window may also correspond to a local screen. The reference screen may, for example, be a production screen.

Audio playback system 16 may be configured to receive a syntax element indicating values for the one or more FOV parameters of the reference screen correspond to default values and/or receive a syntax element indicating values for the one or more FOV parameters of the reference screen correspond to signaled values included in a bitstream comprising the HOA audio signal.

A matrix, including a preliminary effect matrix, effect matrix, rendering matrix, final rendering matrix, or other type of matrix described in this disclosure may be processed in various ways. For example, a matrix may be processed (e.g., stored, added, multiplied, retrieved, etc.) as rows, columns, vectors, or in other ways. It should be understood that, as used in this disclosure, the term matrix may refer to a data structure associated with matrix data.

Figure 21:
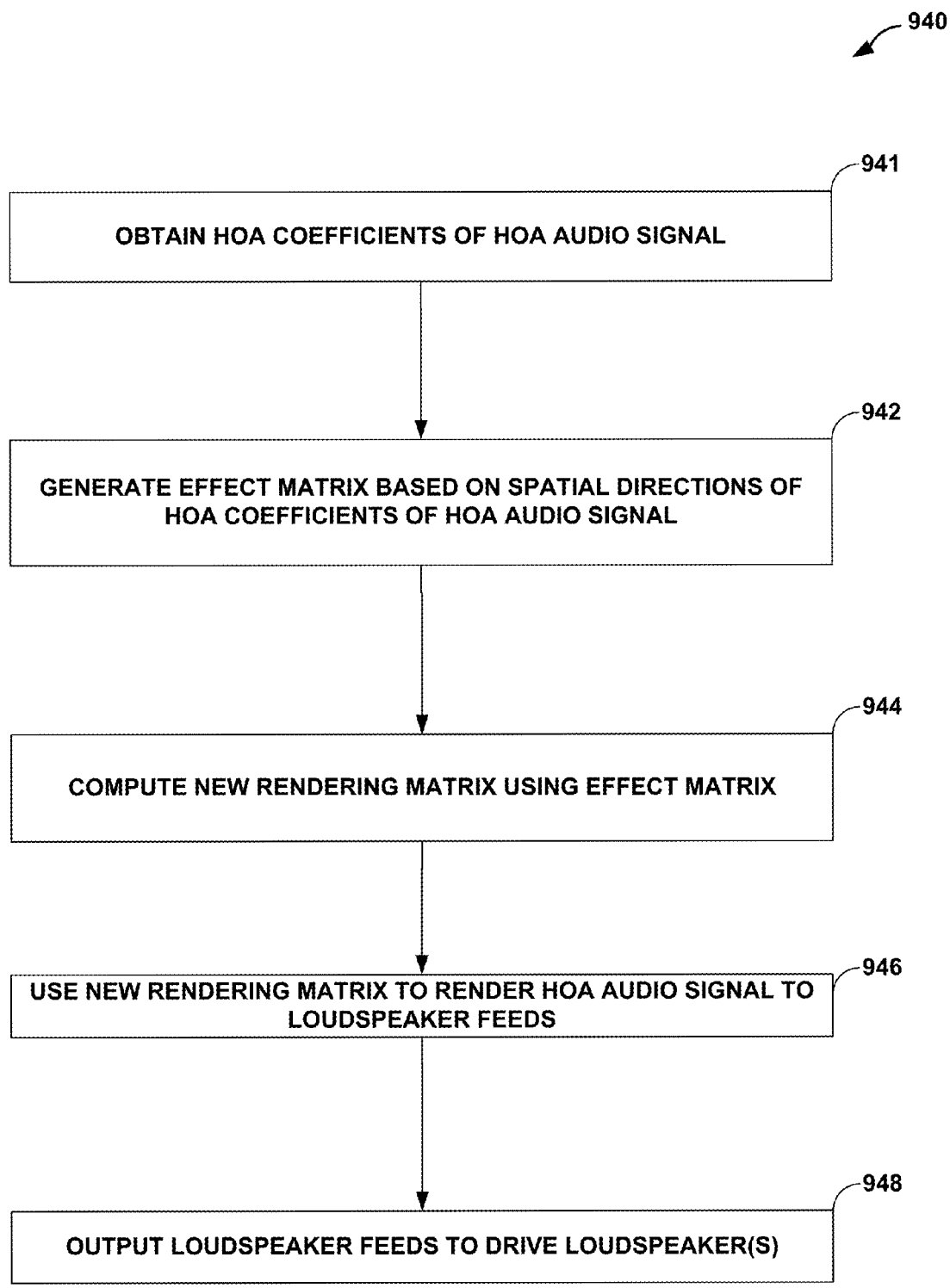
FIG. 21 is a flowchart illustrating an example process that a system may perform to implement one or more techniques of this disclosure.

FIG. 21 is a flowchart illustrating an example process 940 that a system may perform to implement one or more techniques of this disclosure. It will be appreciated that process 940 may performed by a variety of systems and/or devices, in accordance with the various aspects of this disclosure. For ease of discussion, however, process 940 is described herein as being performed by the audio playback system and/or various components thereof. Process 940 may begin when the audio playback system 16 obtains HOA coefficients of an HOA audio signal (941). For instance, the audio decoding device 24 of the audio playback system 16 may obtain HOA coefficients 11' from the audio bitstream 21. In turn, the audio playback system 16 may generate an effect matrix based on spatial directions of the HOA coefficients 11' (942). For instance, the audio playback system 16 may generate a preliminary effect matrix $\tilde{F}$ based on the spatial directions of the HOA coefficients 11', and use the preliminary effect matrix $\tilde{F}$ to generate the effect matrix (or "final" effect matrix) F.

The audio playback system 16 may compute a new rendering matrix using the effect matrix F (944). For instance, the audio playback system 16 may compute the new rendering matrix (denoted by the symbol 'D'), according to the formula D=FRY, where 'R' denotes an original rendering matrix. The audio playback system 16 may use the new rendering matrix D to render the HOA signal to loudspeaker feeds (946). For instance, the audio playback system 16 may use the new rendering matrix D to render the HOA coefficients 11' to one or more of the loudspeaker feeds 25 to be played back via one or more of speakers 3. In turn, the audio playback system 16 may output the loudspeaker feeds 25 to drive one or more loudspeakers, such as one or more of speakers 3 (948).

Figure 22:
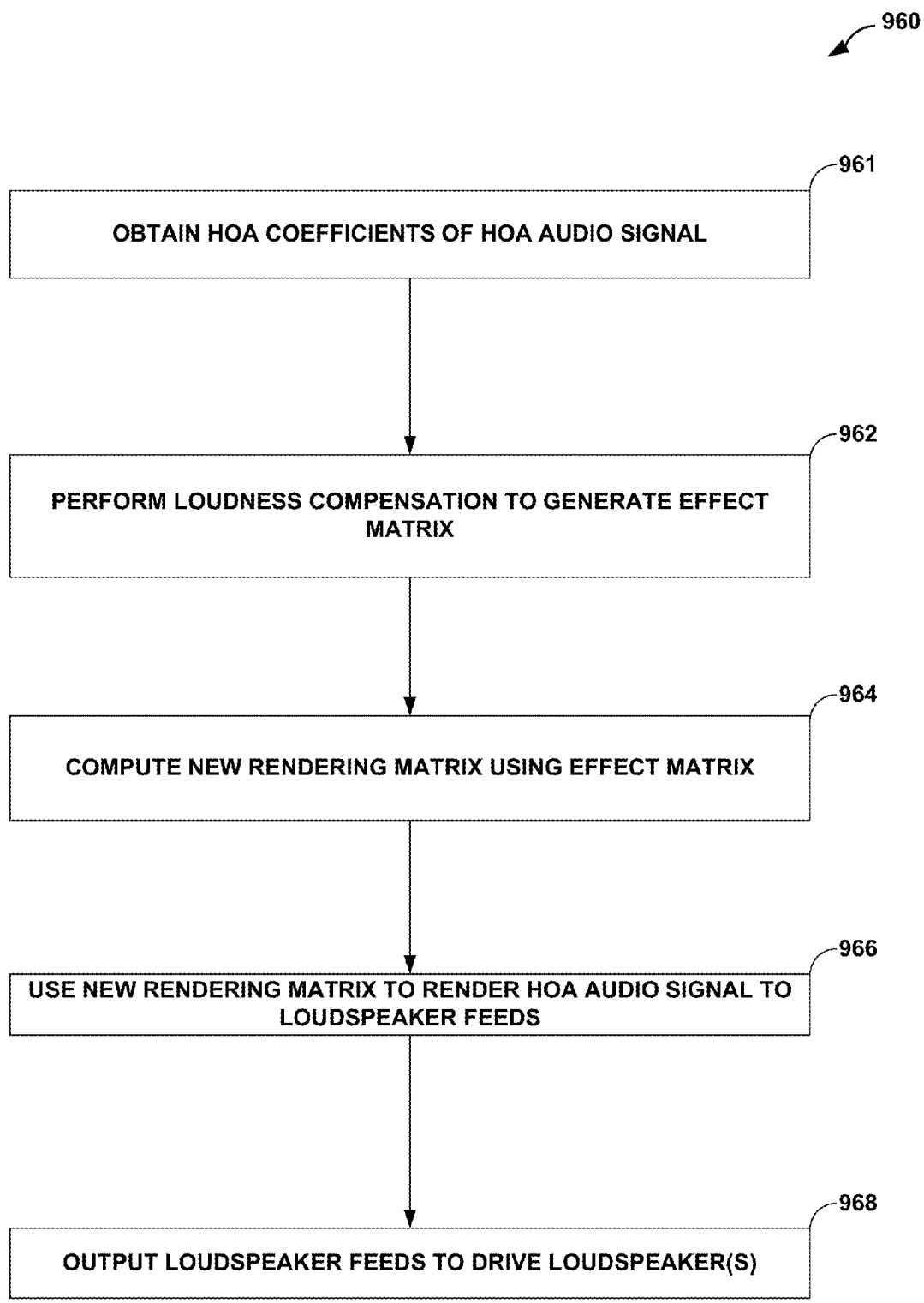
FIG. 22 is a flowchart illustrating an example process that a system may perform to implement one or more techniques of this disclosure.

FIG. 22 is a flowchart illustrating an example process 960 that a system may perform to implement one or more techniques of this disclosure. It will be appreciated that process 960 may performed by a variety of systems and/or devices, in accordance with the various aspects of this disclosure. For ease of discussion, however, process 960 is described herein as being performed by the audio playback system and/or various components thereof. Process 960 may begin when the audio playback system 16 obtains HOA coefficients of an HOA audio signal (961). For instance, the audio decoding device 24 of the audio playback system 16 may obtain HOA coefficients 11' from the audio bitstream 21.

In turn, the audio playback system 16 may perform loudness compensation to generate an effect matrix (962). For instance, the audio playback system 16 may perform loudness compensation to compensate for one or more effects of mapping. The audio playback system 16 may perform loudness compensation to equalize one or more undesired direction-dependent loudness differences caused by the spatial stretching and/or squeezing of the effect matrix, as may be caused by the mapping. The audio playback system 16 may compute a new rendering matrix using the effect matrix (964). For instance, the audio playback system 16 may compute the new rendering matrix (denoted by the symbol 'D'), according to the formula D=FRY, where 'R' denotes an original rendering matrix, and 'F' denotes the effect matrix generated using loudness compensation.

The audio playback system 16 may use the new rendering matrix D to render the HOA signal to loudspeaker feeds (966). For instance, the audio playback system 16 may use the new rendering matrix D to render the HOA coefficients 11' to one or more of the loudspeaker feeds 25 to be played back via one or more of speakers 3. In turn, the audio playback system 16 may output the loudspeaker feeds 25 to drive one or more loudspeakers, such as one or more of speakers 3 (968).

Figure 23:
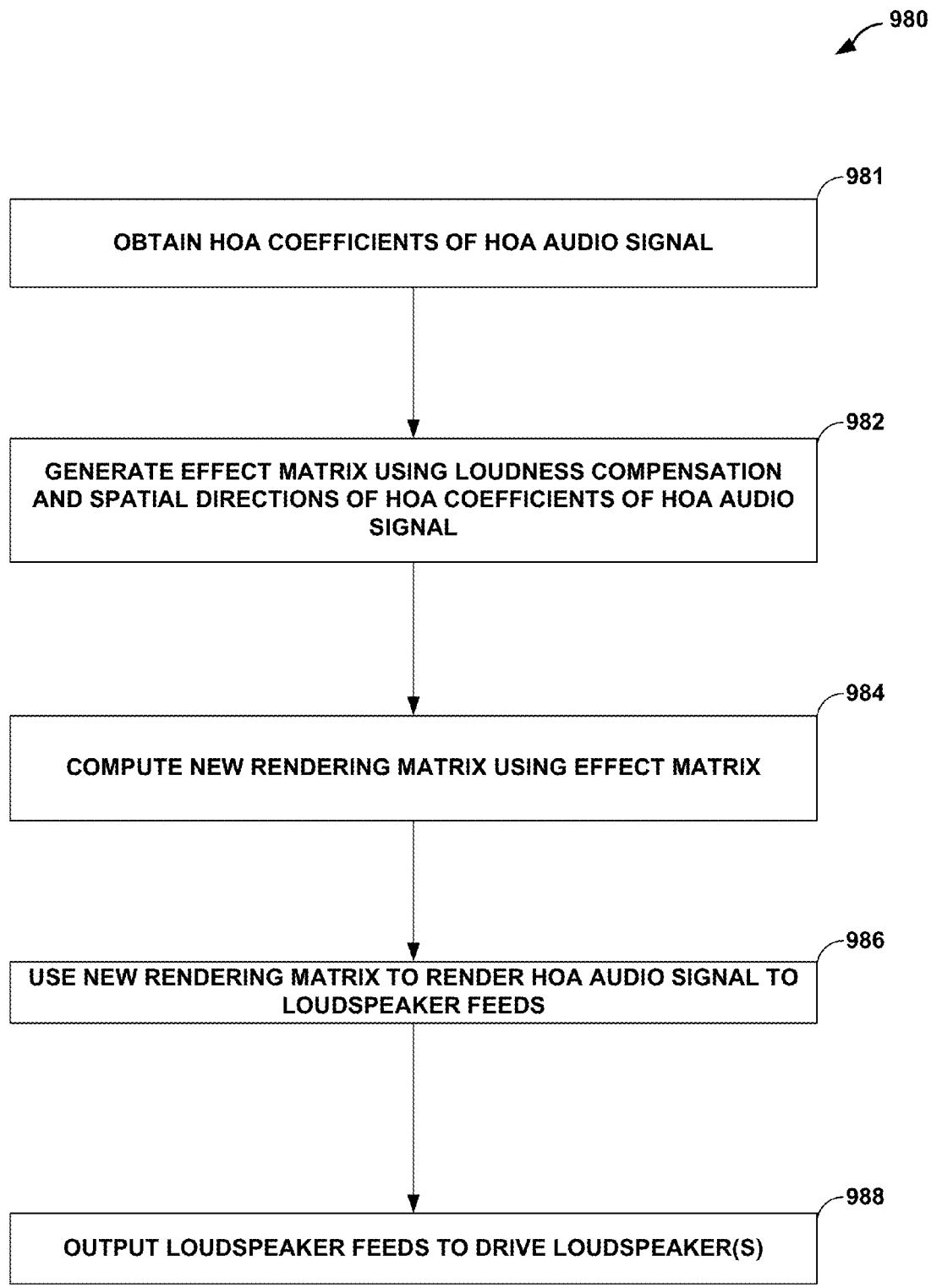
FIG. 23 is a flowchart illustrating an example process that a system may perform to implement one or more techniques of this disclosure.

FIG. 23 is a flowchart illustrating an example process 980 that a system may perform to implement one or more techniques of this disclosure. It will be appreciated that process 980 may performed by a variety of systems and/or devices, in accordance with the various aspects of this disclosure. For ease of discussion, however, process 980 is described herein as being performed by the audio playback system and/or various components thereof. Process 980 may begin when the audio playback system 16 obtains HOA coefficients of an HOA audio signal (981). For instance, the audio decoding device 24 of the audio playback system 16 may obtain HOA coefficients 11' from the audio bitstream 21.

In turn, the audio playback system 16 may generate an effect matrix using loudness compensation and using spatial directions of the HOA coefficients 11' (982). For instance, the audio playback system 16 may compute or generate a preliminary effects matrix $\tilde{F}$ according to one or more of the formulas described above. Additionally, the audio playback system 16 may compute a loudness value by using an HOA rendering matrix R for each spatial direction of the HOA coefficients 11'. In turn, the audio playback system 16 may compute the final effect matrix using the mode matrix computed as described above.

The audio playback system 16 may compute a new rendering matrix using the effect matrix (984). For instance, the audio playback system 16 may compute the new rendering matrix (denoted by the symbol 'D'), according to the formula D=FRY, where 'R' denotes an original rendering matrix, and 'F' denotes the effect matrix generated using loudness compensation and the spatial directions of the HOA coefficients 11'.

The audio playback system 16 may use the new rendering matrix D to render the HOA signal to loudspeaker feeds (986). For instance, the audio playback system 16 may use the new rendering matrix D to render the HOA coefficients 11' to one or more of the loudspeaker feeds 25 to be played back via one or more of speakers 3. In turn, the audio playback system 16 may output the loudspeaker feeds 25 to drive one or more loudspeakers, such as one or more of speakers 3 (988).

The foregoing techniques may be performed with respect to any number of different contexts and audio ecosystems. A number of example contexts are described below, although the techniques should be limited to the example contexts. One example audio ecosystem may include audio content, movie studios, music studios, gaming audio studios, channel based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel based audio content (e.g., in 2.0, 5.1, and 7.1) such as by using a digital audio workstation (DAW). The music studios may output channel based audio content (e.g., in 2.0, and 5.1) such as by using a DAW. In either case, the coding engines may receive and encode the channel based audio content based one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel based audio content for output by the delivery systems. Another example context in which the techniques may be performed comprises an audio ecosystem that may include broadcast recording audio objects, professional audio systems, consumer on-device capture, HOA audio format, on-device rendering, consumer audio, TV, and accessories, and car audio systems.

The broadcast recording audio objects, the professional audio systems, and the consumer on-device capture may all code their output using HOA audio format. In this way, the audio content may be coded using the HOA audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.), such as audio playback system 16.

Other examples of context in which the techniques may be performed include an audio ecosystem that may include acquisition elements, and playback elements. The acquisition elements may include wired and/or wireless acquisition devices (e.g., Eigen microphones), on-device surround sound capture, and mobile devices (e.g., smartphones and tablets). In some examples, wired and/or wireless acquisition devices may be coupled to mobile device via wired and/or wireless communication channel(s). As used herein, the term "coupled" may include various types of connections. For instance, memory device components of a device may be "coupled" to one or more processors (e.g. processing circuitry) if the memory devices are communicatively connected, such as by way of a bus.

In accordance with one or more techniques of this disclosure, the mobile device may be used to acquire a sound field. For instance, the mobile device may acquire a sound field via the wired and/or wireless acquisition devices and/or the on-device surround sound capture (e.g., a plurality of microphones integrated into the mobile device). The mobile device may then code the acquired sound field into the HOA coefficients for playback by one or more of the playback elements. For instance, a user of the mobile device may record (acquire a sound field of) a live event (e.g., a meeting, a conference, a play, a concert, etc.), and code the recording into HOA coefficients.

The mobile device may also utilize one or more of the playback elements to playback the HOA coded sound field. For instance, the mobile device may decode the HOA coded sound field and output a signal to one or more of the playback elements that causes the one or more of the playback elements to recreate the sound field. As one example, the mobile device may utilize the wireless and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a set of headphones, e.g., to create realistic binaural sound.

In some examples, a particular mobile device may both acquire a 3D sound field and playback the same 3D sound field at a later time. In some examples, the mobile device may acquire a 3D sound field, encode the 3D sound field into HOA, and transmit the encoded 3D sound field to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of HOA signals. For instance, the one or more DAWs may include HOA plugins and/or tools which may be configured to operate with (e.g., work with) one or more game audio systems. In some examples, the game studios may output new stem formats that support HOA. In any case, the game studios may output coded audio content to the rendering engines which may render a sound field for playback by the delivery systems.

The techniques may also be performed with respect to exemplary audio acquisition devices. For example, the techniques may be performed with respect to an Eigen microphone which may include a plurality of microphones that are collectively configured to record a 3D sound field. In some examples, the plurality of microphones of Eigen microphone may be located on the surface of a substantially spherical ball with a radius of approximately 4 cm. In some examples, the audio encoding device 20 may be integrated into the Eigen microphone so as to output audio bitstream 21 directly from the microphone.

Another exemplary audio acquisition context may include a production truck which may be configured to receive a signal from one or more microphones, such as one or more Eigen microphones. The production truck may also include an audio encoder, such as audio encoding device 20 of FIG. 3.

The mobile device may also, in some instances, include a plurality of microphones that are collectively configured to record a 3D sound field. In other words, the plurality of microphone may have X, Y, Z diversity. In some examples, the mobile device may include a microphone which may be rotated to provide X, Y, Z diversity with respect to one or more other microphones of the mobile device. The mobile device may also include an audio encoder, such as audio encoding device 20 of FIG. 3.

A ruggedized video capture device may further be configured to record a 3D sound field. In some examples, the ruggedized video capture device may be attached to a helmet of a user engaged in an activity. For instance, the ruggedized video capture device may be attached to a helmet of a user whitewater rafting. In this way, the ruggedized video capture device may capture a 3D sound field that represents the action all around the user (e.g., water crashing behind the user, another rafter speaking in front of the user, etc.).

The techniques may also be performed with respect to an accessory enhanced mobile device, which may be configured to record a 3D sound field. In some examples, the mobile device may be similar to the mobile devices discussed above, with the addition of one or more accessories. For instance, an Eigen microphone may be attached to the above noted mobile device to form an accessory enhanced mobile device. In this way, the accessory enhanced mobile device may capture a higher quality version of the 3D sound field than just using sound capture components integral to the accessory enhanced mobile device.

Example audio playback devices that may perform various aspects of the techniques described in this disclosure are further discussed below. In accordance with one or more techniques of this disclosure, speakers and/or sound bars may be arranged in any arbitrary configuration while still playing back a 3D sound field. Moreover, in some examples, headphone playback devices may be coupled to audio decoding device 24 via either a wired or a wireless connection. In accordance with one or more techniques of this disclosure, a single generic representation of a sound field may be utilized to render the sound field on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a sound field may be utilized to render the sound field on any of the foregoing playback environments. Additionally, the techniques of this disclosure enable a renderer to render a sound field from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a render to compensate with the other 6 speakers such that playback may be achieved on a 6.1 speaker playback environment.

Moreover, a user may watch a sports game while wearing headphones. In accordance with one or more techniques of this disclosure, the 3D sound field of the sports game may be acquired (e.g., one or more Eigen microphones may be placed in and/or around the baseball stadium), HOA coefficients corresponding to the 3D sound field may be obtained and transmitted to a decoder, the decoder may reconstruct the 3D sound field based on the HOA coefficients and output the reconstructed 3D sound field to a renderer, the renderer may obtain an indication as to the type of playback environment (e.g., headphones), and render the reconstructed 3D sound field into signals that cause the headphones to output a representation of the 3D sound field of the sports game.

In each of the various instances described above, it should be understood that the audio encoding device 20 may perform a method or otherwise comprise means to perform each step of the method for which the audio encoding device 20 is configured to perform. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the audio encoding device 20 has been configured to perform.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

Likewise, in each of the various instances described above, it should be understood that the audio decoding device 24 may perform a method or otherwise comprise means to perform each step of the method for which the audio decoding device 24 is configured to perform. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the audio decoding device 24 has been configured to perform.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), processing circuitry (such as programmable processing circuitry, fixed function circuitry, or a combination of programmable processing circuitry and fixed function circuitry), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the techniques have been described. These and other aspects of the techniques are within the scope of the following claims.

What is claimed is:

1. A device for rendering a higher order ambisonic (HOA) audio signal, the device comprising:
a memory configured to store the HOA audio signal; and
one or more processors, coupled to the memory, the one or more processors being configured to:
perform a loudness compensation process for a plurality of spatial directions based on a mapping function, as part of generating an effect matrix; and
render the HOA audio signal based on the effect matrix.

2. The device of claim 1, wherein the one or more processors are configured to compensate for the loudness for the plurality of spatial directions further based on a rendering matrix.

3. The device of claim 1, wherein the one or more processors are configured to:
determine a renderer for encoded audio data;
modify the renderer based on one or more field of view (FOV) parameters of a viewing window and one or more FOV parameters of a reference screen; and
use both of the effect matrix and the modified renderer to render the HOA audio signal.

4. The device of claim 1, wherein the one or more processors are configured to determine, based on a production screen size and a reproduction screen size with respect to video data associated with the HOA audio signal, a minimum error between a plurality of original sound locations associated with objects of the HOA audio signal and a plurality of corresponding mapped destinations associated with the objects of the HOA audio signal.

5. The device of claim 1, wherein the one or more processors are configured to determine, using a production screen size and a reproduction screen size with respect to video data associated with the HOA audio signal, an energy normalization between respective energies associated with a plurality of original sound locations associated with objects of the HOA audio signal and respective energies associated with a plurality of corresponding mapped destinations associated with the objects of the HOA audio signal.

6. A device configured to render a higher order ambisonic (HOA) audio signal, the device comprising:
a memory configured to store the HOA audio signal; and
one or more processors, coupled to the memory, the one or more processors being configured to:
perform a loudness compensation process as part of generating an effect matrix;
determine a renderer for encoded audio data;
modify the renderer based on one or more field of view (FOV) parameters of a viewing window and one or more FOV parameters of a reference screen; and
render the HOA audio signal using both of the effect matrix and the modified renderer.

7. The device of claim 6, further comprising one or more speakers, wherein the one or more processors are configured to determine the renderer based on a speaker configuration associated with the one or more speakers of the device.

8. The device of claim 6, wherein the renderer comprises one or more of a rendering format or an algorithm for converting the encoded audio data to a reproduction format.

9. The device of claim 6, wherein the one or more processors are further configured to:
based on the one or more FOV parameters of the reference screen and the one or more FOV parameters of the viewing window, determine an angle mapping function for modifying an angle of a speaker;
based on the angle mapping function, modify an angle for a first speaker of one or more speakers to generate a modified angle for the first speaker; and
use the modified angle for the first speaker to modify the renderer.

10. The device of claim 6, further comprising a display configured to output one or both of the viewing window or a zoomed viewing window that is based on the viewing window,
wherein the display is coupled to the one or more processors,
wherein the one or more processors are further configured to determine, in response to a user initiated zoom function, one or more FOV parameters of the zoomed viewing window, and
wherein the one or more processors are configured to modify the renderer based on the one or more FOV parameters of the reference screen and the one or more FOV parameters of the zoomed viewing window.

11. The device of claim 10, wherein the one or more processors are configured to:
obtain a scaling factor in response to a user initiated zoom operation;
based on the scaling factor and the one or more FOV parameters of the viewing window, determine one or more FOV parameters of a zoomed viewing window;
based on the one or more FOV parameters of the zoomed viewing window and the one or more FOV parameters of the reference screen, determine an angle mapping function for modifying an angle of a speaker; and
based on the angle mapping function, modify an angle for a first speaker of the one or more speakers to generate a modified angle for the first speaker.

12. The device of claim 10, further comprising a display for displaying one or more of the viewing window or the zoomed viewing window, wherein the display is coupled to the one or more processors, and
wherein the one or more processors are configured to:
determine one or more azimuth angles for the zoomed viewing window based on a scaling factor and one or more azimuth angles for the viewing window that is output via the display; and
determine the one or more FOV parameters of the zoomed viewing window that is output via the display,
wherein the one or more processors are further configured to determine one or more elevation angles for the zoomed viewing window based on one or more elevation angles for the viewing window and the scaling factor.

13. The device of claim 10, wherein the one or more FOV parameters for the reference screen comprise at least one of one or more azimuth angles for the reference screen or one or more elevation angles for the reference screen.

14. The device of claim 10, wherein the one or more FOV parameters for the viewing window comprise at least one of one or more azimuth angles for the viewing window or one or more elevation angles for the viewing window.

15. The device of claim 10, wherein the one or more processors are configured to render the HOA audio signal based on a scaling factor obtained in response to a user initiated zoom operation and on the effect matrix.

16. The device of claim 10, wherein the one or more FOV parameters for the reference screen comprise a location of a center of the reference screen and a location of a center of the viewing window.

17. The device of claim 16, wherein the one or more processors are further configured to:
determine the center of the reference screen based on the one or more FOV parameters of the reference screen; and
determine the center of the viewing window based on the one or more FOV parameters of the viewing window.

18. The device of claim 16, further comprising:
a display configured to output one or both of the reference screen or the viewing window; and
one or more loudspeakers,
wherein the one or more processors are coupled to the one or more loudspeakers,
wherein the one or more processors are coupled to the display, and
wherein the one or more processors are configured to:
determine a renderer for the encoded audio data;
modify the renderer based on the center of the viewing window and the center of the reference screen; and
render, for playback via the one or more loudspeakers, the HOA audio signal based on the effect matrix and the modified renderer.

19. The device of claim 16, wherein the one or more processors are further configured to:
rotate a soundfield of the HOA audio signal from the center of the reference screen to the center of the viewing window that is output via the display.

20. The device of claim 10, wherein the one or more processors are further configured receive a syntax element indicating whether rendering of the HOA audio signal based on the one or more field of view (FOV) parameters of the reference screen and the one or more FOV parameters of the viewing window is enabled.

21. The device of claim 1, wherein the device further comprises at least one speaker coupled to the one or more processors, and wherein the one or more processors are configured to generate a loudspeaker feed to drive the at least one speaker.

22. The device of claim 1, wherein the device further comprises a display for displaying a viewing window, wherein the one or more processors are coupled to the display, and wherein the one or more processors are configured to determine one or more field of view (FOV) parameters of a viewing window that is output via the display.

23. The device of claim 1, wherein the one or more processors are further configured to decode the HOA audio signal to determine a plurality of HOA coefficients, and
wherein the one or more processors are configured to render the HOA coefficients as part of rendering the HOA audio signal.

24. The device of claim 6, wherein the one or more processors are further configured to:
generate a mode matrix for nine-hundred sampling points of a sphere;
modify the mode matrix based on the one or more FOV parameters of the reference screen and the one or more FOV parameters of the viewing window to generate an effect matrix; and
render HOA coefficients of the HOA audio signal based on the effect matrix.

25. The device of claim 1, further comprising a television that includes:
the memory;
the one or more processors;
a communication interface configured to receive audio data and video data;
one or more speakers for outputting the rendered audio signal; and
a display configured to output at least a portion of the video data.

26. The device of claim 1, further comprising a receiver device that includes the memory and the one or more processors, wherein the receiver device is communicatively coupled to one or more speakers.

27. A method for rendering a higher order ambisonic (HOA) audio signal, the method comprising:
performing a loudness compensation process by compensating for loudness for a plurality of spatial directions based on a mapping function, as part of generating an effect matrix; and
rendering the HOA audio signal based on the effect matrix.

28. The method of claim 27, wherein performing the loudness compensation process comprises compensating for the loudness for the plurality of spatial directions further based on a rendering matrix.

29. The method of claim 27, further comprising: determining a renderer for encoded audio data;
modifying the renderer based on one or more field of view (FOV) parameters of a viewing window and one or more FOV parameters of a reference screen; and
using both of the effect matrix and the modified renderer to render the HOA audio signal.

30. The method of claim 27, wherein performing the loudness compensation process comprises determining, using a production screen size and a reproduction screen size with respect to video data associated with the HOA audio signal, a minimum error between a plurality of original sound locations associated with objects of the HOA audio signal and a plurality of corresponding mapped destinations associated with the objects of the HOA audio signal.

31. The method of claim 27, wherein performing the loudness compensation process comprises determining, using a production screen size and a reproduction screen size with respect to video data associated with the HOA audio signal, an energy normalization between respective energies associated with a plurality of original sound locations associated with objects of the HOA audio signal and respective energies associated with a plurality of corresponding mapped destinations associated with the objects of the HOA audio signal.

32. An apparatus for rendering a higher order ambisonic (HOA) audio signal, the apparatus comprising:
means for performing a loudness compensation process for loudness for a plurality of spatial directions based on a mapping function, as part of generating an effect matrix; and
means for rendering the HOA audio signal using the effect matrix.

33. A device for rendering a higher order ambisonic (HOA) audio signal, the device comprising:
a memory configured to store audio data associated with the HOA audio signal; and
one or more processors coupled to the memory, the one or more processors being configured to:
detect a zooming event with respect to video data associated with the HOA audio signal based on a production screen size and a reproduction screen size with respect to the video data associated with the HOA audio data;

in response to the detection of the zooming event, generate a mode matrix based on an order of the HOA signal; and render the HOA audio signal based on the mode matrix.

34. The device of claim 33, wherein the one or more processors are further configured to:

locally generate a preliminary effect matrix based on the mode matrix and spatial directions of HOA coefficients of the HOA audio signal; and render the HOA signal based on the locally generated preliminary effect matrix.

35. The device of claim 34, wherein the one or more processors are further configured to:

generate a rendering matrix using the preliminary effect matrix; and render the HOA signal based on the rendering matrix.

36. The device of claim 33, further comprising a television that includes:

the memory;

the one or more processors;

one or more speakers for outputting the rendered audio signal; and a display configured to output video data.

37. The device of claim 33, wherein to generate the mode matrix based on the order of the HOA signal, the one or more processors are configured to apply the formula $M=(N+2)^2$, wherein N denotes the order of the HOA signal, and wherein M denotes a number of sampling points used in generating the mode matrix.

38. The device of claim 33, further comprising a receiver device that includes the memory and the one or more processors, wherein the receiver device is communicatively coupled to one or more speakers.

39. The device of claim 1, wherein the one or more processors are configured to:

compute a loudness correction value by applying a rendering matrix to a plurality of spatial directions of the HOA signal stored to the memory;

compute a final effect matrix based on the loudness correction values; and modify the rendering matrix using the final effect matrix to obtain a new rendering matrix.

40. The device of claim 39, wherein to compute the final effect matrix based on the loudness correction values, the one or more processors are configured to:

apply the loudness correction values to modify a mode matrix that includes one or more spatial directions of the plurality of spatial directions of the HOA signal stored to the memory.

41. The device of claim 40, wherein to apply the loudness correction values to modify the mode matrix, the one or more processors are configured to:

perform matrix multiplication of a diagonal matrix of the loudness correction values with a product of the mode matrix and a transpose of the mode matrix.

42. The device of claim 33, wherein the one or more processors are configured to:

compute a loudness correction value by applying a rendering matrix to a plurality of spatial directions of the HOA signal stored to the memory;

compute a final effect matrix based on the loudness correction values; and modify the rendering matrix using the final effect matrix to obtain a new rendering matrix.

43. The device of claim 42, wherein to compute the final effect matrix based on the loudness correction values, the one or more processors are configured to:

apply the loudness correction values to modify the mode matrix, wherein the mode matrix includes one or more spatial directions of the plurality of spatial directions of the HOA signal stored to the memory.

44. The device of claim 43, wherein to apply the loudness correction values to modify the mode matrix, the one or more processors are configured to:

perform matrix multiplication of a diagonal matrix of the loudness correction values with a product of the mode matrix and a transpose of the mode matrix.

* * * * *